United States Patent
Ito et al.

(10) Patent No.: US 10,693,198 B2
(45) Date of Patent: Jun. 23, 2020

(54) CONTROLLER, ENERGY STORAGE APPARATUS, ENERGY STORAGE SYSTEM, MOVING OBJECT, BACKUP POWER SUPPLY, AND CONTROLLER METHOD

(71) Applicant: GS Yuasa International Ltd., Kyoto (JP)

(72) Inventors: Hirokazu Ito, Kyoto (JP); Hiroaki Sone, Kyoto (JP); Tatsuya Inoue, Kyoto (JP); Yasutaka Miyawaki, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 30 days.

(21) Appl. No.: 15/738,073

(22) PCT Filed: Jun. 2, 2016

(86) PCT No.: PCT/JP2016/066502
§ 371 (c)(1),
(2) Date: Dec. 19, 2017

(87) PCT Pub. No.: WO2017/002526
PCT Pub. Date: Jan. 5, 2017

(65) Prior Publication Data
US 2018/0309172 A1 Oct. 25, 2018

(30) Foreign Application Priority Data

Jun. 30, 2015 (JP) .................................. 2015-132235
Nov. 9, 2015 (JP) .................................. 2015-219940

(51) Int. Cl.
*H02J 7/00* (2006.01)
*H01M 10/44* (2006.01)
(Continued)

(52) U.S. Cl.
CPC ......... *H01M 10/441* (2013.01); *H01M 10/44* (2013.01); *H01M 10/443* (2013.01);
(Continued)

(58) Field of Classification Search
CPC .. H01M 10/441; H01M 10/44; H01M 10/443; H01M 10/48; H02J 7/00; H02J 7/0032; H02J 7/0063; H02J 7/02
(Continued)

(56) References Cited

U.S. PATENT DOCUMENTS

2006/0284597 A1 12/2006 Takahashi
2007/0188140 A1* 8/2007 Chen .................... H02J 7/0013
320/128
(Continued)

FOREIGN PATENT DOCUMENTS

EP 2610993 A1 * 7/2013 ............ H01M 10/44
EP 2610993 A1 7/2013
(Continued)

OTHER PUBLICATIONS

European Patent Office, Extended European Search Report for Application No. 16817635.2, dated Mar. 20, 2018, 8 pages, Germany.
(Continued)

*Primary Examiner* — Zixuan Zhou
(74) *Attorney, Agent, or Firm* — Alston & Bird LLP

(57) ABSTRACT

A control device (90) equipped with: switches (91) provided in each charging or discharging current path in each of one or more power storage units (40); a control unit (92) that supplies a control signal to the switch (91); and an external input terminal (83) that supplies an external input signal to the switch (91). Each switch (91) has a function for turning off when the control signal and/or the external input signal is a signal for turning off that switch, or a function for
(Continued)

turning on when both the control signal and the external input signal are a signal for turning on that switch.

5 Claims, 30 Drawing Sheets

(51) Int. Cl.
  *H01M 10/48* (2006.01)
  *H02J 7/02* (2016.01)
(52) U.S. Cl.
  CPC ............... *H01M 10/48* (2013.01); *H02J 7/00* (2013.01); *H02J 7/0032* (2013.01); *H02J 7/0063* (2013.01); *H02J 7/02* (2013.01); *H01M 2220/20* (2013.01)
(58) Field of Classification Search
  USPC .................. 320/116, 117, 118, 119, 126, 134
  See application file for complete search history.

(56) References Cited

U.S. PATENT DOCUMENTS

| | | | |
|---|---|---|---|
| 2008/0174274 | A1 | 7/2008 | Kosaka et al. |
| 2013/0141828 | A1* | 6/2013 | Yamaguchi ........... H01M 10/44 361/86 |
| 2015/0069976 | A1 | 3/2015 | Yamanaka |
| 2015/0116168 | A1 | 4/2015 | Yosui |
| 2015/0180136 | A1 | 6/2015 | Yosui |
| 2016/0049813 | A1 | 2/2016 | Takizawa et al. |

FOREIGN PATENT DOCUMENTS

| | | |
|---|---|---|
| EP | 2629392 A1 | 8/2013 |
| JP | 2006-246595 A | 9/2006 |
| JP | 2006-345660 A | 12/2006 |
| JP | 2008-178220 A | 7/2008 |
| JP | 2010-057267 A | 3/2010 |
| JP | 2010-220280 A | 9/2010 |
| JP | 2013-126331 A | 6/2013 |
| JP | 2013-215095 A | 10/2013 |
| JP | 2013-240142 A | 11/2013 |
| JP | 2014-030108 A | 2/2014 |
| JP | 2014-106157 A | 6/2014 |
| JP | 2014-239539 A | 12/2014 |
| JP | 2015-053812 A | 3/2015 |
| WO | WO 2010/103816 A | 9/2010 |
| WO | WO 2013/076877 A | 5/2013 |
| WO | WO 2014/155986 A | 10/2014 |

OTHER PUBLICATIONS

International Examining Authority, International Preliminary Report on Patentability, including Applicant's Article 34 Amendment, for International Application No. PCT/JP2016/066502, dated Nov. 16, 2016, 22 pages, Japan Patent Office, Japan.

International Examining Authority, International Search Report (ISR) and Written Opinion for International Application No. PCT/JP2016/066502, dated Jun. 28, 2016, 10 pages, Japan Patent Office.

* cited by examiner

CONTROLLER, ENERGY STORAGE APPARATUS, ENERGY STORAGE SYSTEM, MOVING OBJECT, BACKUP POWER SUPPLY, AND CONTROLLER METHOD

CROSS REFERENCE TO RELATED APPLICATIONS

This application is a national stage application, filed under 35 U.S.C. § 371, of International Application No. PCT/JP2016/066502, filed Jun. 2, 2016, which claims priority to Japanese Application No. 2015-132235, filed Jun. 30, 2015, and Japanese Application No. 2015-219940, filed Nov. 9, 2015, the contents of all of which as are hereby incorporated by reference in their entirety.

BACKGROUND

Technical Field

The present invention relates to a controller and the like, which control charge or discharge of one or more energy storage units including energy storage devices.

Description of Related Art

Heretofore, in an energy storage apparatus including a plurality of energy storage devices, a configuration in which the plurality of energy storage devices are connected in parallel to one another has been known (see, for example, Patent Document 1). In this energy storage apparatus, a switch is provided for each of a plurality of charge paths (charge or discharge current paths) formed of a plurality of energy storage devices connected in parallel to one another.

Patent Document

Patent Document 1: JP-A-2006-246595

BRIEF SUMMARY

However, in the above-described conventional configuration, at the beginning of charge or discharge, only some of the energy storage devices may be charged or discharged, and other energy storage devices may be disconnected from a power supply or a load. In this case, an overcurrent will flow to some of the energy storage devices, which may cause a malfunction.

The present invention has been made to solve the above-described problem, and it is an object of the present invention to provide a controller and the like, which are capable of suppressing an occurrence of the malfunction of the energy storage units due to the overcurrent.

In order to achieve the above object, a controller according to one aspect of the present invention is a controller that controls charge or discharge of one or more energy storage units each of which includes an energy storage device, the controller including: a switch provided in a charge or discharge current path of each of the one or more energy storage units; a control part that supplies a control signal to the switch; and an external input terminal that supplies an external input signal to the switch, wherein each of the switches has at least one of an OFF function to turn off the switch when at least one of the control signal and the external input signal is a signal for turning off the switch and an ON function to turn on the switch when both of the control signal and the external input signal are signals for turning on the switch.

According to the present invention, it is possible to provide the controller and the like, which are capable of suppressing the occurrence of the malfunction of the energy storage units due to the overcurrent.

DETAILED DESCRIPTION OF VARIOUS EMBODIMENTS

Figure 1:
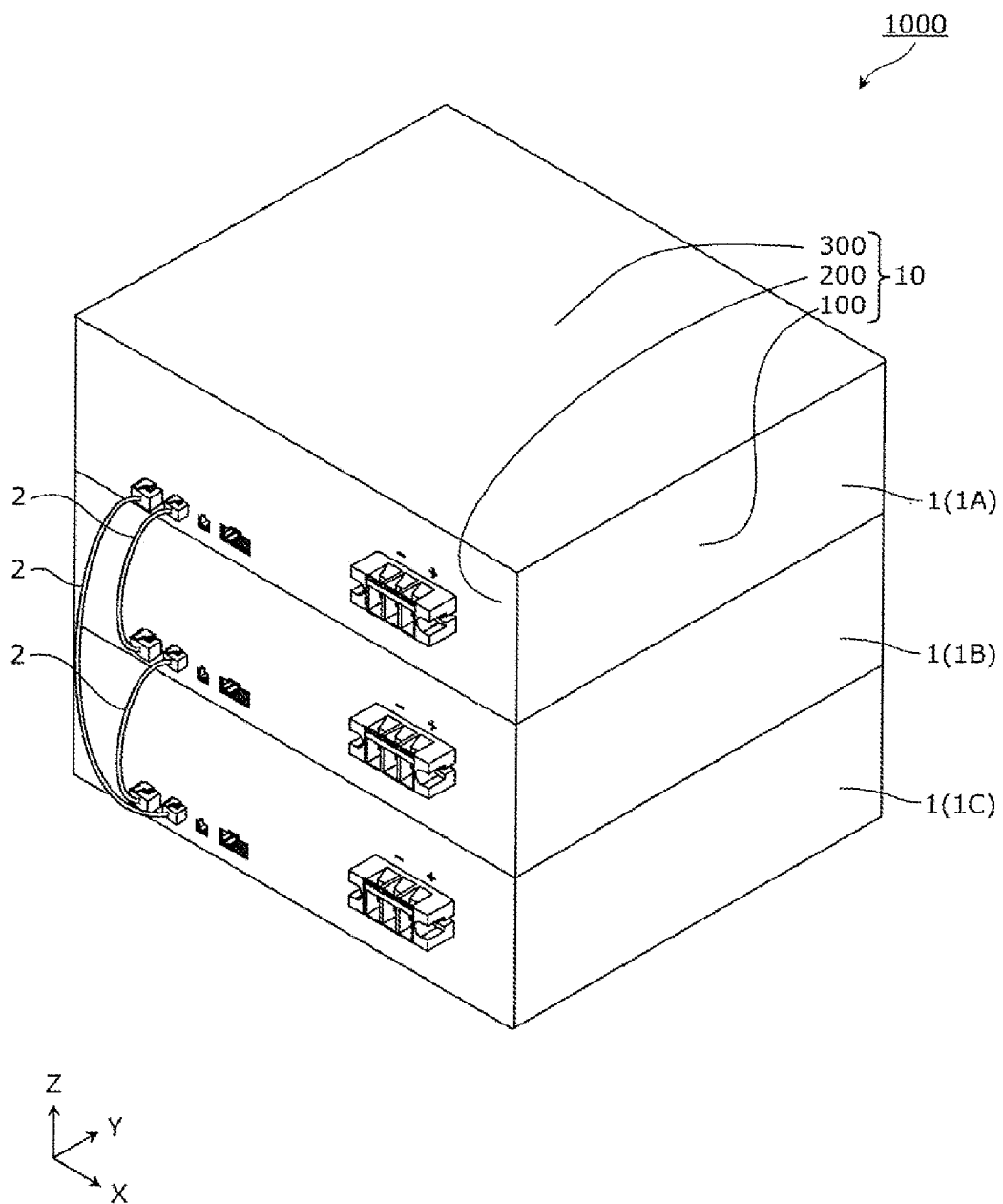
FIG. 1 is a perspective view showing an overall external view of an energy storage system according to a first embodiment.

With the above-described conventional configuration, at the beginning of the charge or the discharge, only some of the energy storage devices may be charged or discharged, and other energy storage devices may be disconnected from the power supply or the load. In this case, an overcurrent will flow to some of the energy storage devices, which may cause a malfunction.

The present invention has been made to solve the above-described problem, and it is an object of the present invention to provide a controller and the like, which are capable of suppressing an occurrence of the malfunction of the energy storage units due to the overcurrent.

In order to achieve the above object, a controller according to one aspect of the present invention is a controller that controls charge or discharge of one or more energy storage units each of which includes an energy storage device, the controller including: a switch provided in a charge or discharge current path of each of the one or more energy storage units; a control part that supplies a control signal to the switch; and an external input terminal that supplies an external input signal to the switch, wherein each of the switches has at least one of an OFF function to turn off the switch when at least one of the control signal and the external input signal is a signal for turning off the switch and an ON function to turn on the switch when both of the control signal and the external input signal are signals for turning on the switch.

Accordingly, the switches provided in the respective charge or discharge current paths are turned off all at once by the external input signal or are turned on all at once by the external input signal. Therefore, all the energy storage units start or stop charge or discharge all at once, and accordingly, it is possible to reduce the occurrence of the malfunction of the energy storage units.

Further, the above-described controller may control the charge or discharge of one of the energy storage units, and the controller may further include an external output terminal that outputs an external output signal to another switch provided in the current path of another energy storage unit, and the external output signal for turning on the other switch may be output from the external output terminal when the one switch provided in the current path of the one energy storage unit is turned on, and the external output signal for turning off the other switch may be output from the external output terminal when the one switch is turned off.

As a result, when the switch corresponding to one energy storage unit is turned off, the other switches corresponding to the other energy storage units are also turned off in conjunction therewith. Alternatively, when the switch corresponding to one energy storage unit is turned on, the other switches corresponding to the other energy storage units are also turned on in conjunction therewith. Therefore, since all the energy storage units can charge or discharge in conjunction with one another, it is possible to reduce the occurrence of malfunction in the energy storage unit. In other words, according to this configuration, since the other switches provided in the current path of the other energy storage units can be controlled by the external output signal, installation work at an installation site can be easily and reliably performed.

Further, when a voltage of any one of the one or more energy storage units is equal to or less than an end-of-discharge voltage, a signal for turning off the switch may be input as the external input signal.

As a result, when the voltage of any one of the energy storage units becomes equal to or lower than the end-of-discharge voltage, the switches provided in the respective current paths are turned off all at once. Therefore, since the respective energy storage units are disconnected from the load all at once, it is possible to reduce the occurrence of the malfunction in the energy storage unit.

Further, when a power system connected to the one or more energy storage units is restored, a signal for turning on or off the switch may be input as the external input signal.

As a result, the switches provided in the respective current paths are turned on all at once or turned off all at once at the time of the power restoration. Accordingly, the respective energy storage units are connected to the power system all at once or are disconnected from the power system all at once. Therefore, it is possible to reduce the occurrence of the malfunction in the energy storage unit at the time of the power restoration.

Further, when permission is given to turn on the switch after turning on power of the controller, a signal for turning on the switch may be input as the external input signal.

As a result, when permission is given to turn on the switch after turning on power, the switches provided in the respective current paths are turned on all at once, and accordingly, the respective energy storage units are connected to the power system all at once. Therefore, it is possible to reduce the occurrence of the malfunction of the energy storage unit at the time of maintenance or initial setting.

Further, when any one of the one or more energy storage units enters a test mode, the switches provided in the current paths of the respective energy storage unit in the test mode may be turned on.

In general, in view of ensuring safety and the like, except during charge or discharge, the voltage of the energy storage unit is not output to an external connection terminal of a housing, which houses the energy storage unit 40 therein. Therefore, it is difficult to acquire the voltage of the energy storage unit in advance before charge or discharge of the energy storage unit.

Meanwhile, in the energy storage unit in the test mode, the switch of the current path is turned on, whereby the voltage of the energy storage unit can be measured at the external connection terminal connected to the energy storage unit via the switch.

Moreover, when abnormality occurs in any one of the one or more energy storage units, the switch provided in the current path of the energy storage unit in which the abnormality has occurred may be turned off.

As a result, the energy storage unit in which the abnormality has occurred can be disconnected from the power supply or the load. That is, even when abnormality occurs in some of the energy storage units, the other energy storage units continuously charge or discharge power, and redundant design of N+1 is achieved.

Further, the present invention may be realized as a moving object including the controller.

In this way, a moving object that can suppress the occurrence of the malfunction caused by a flow of an overcurrent through the energy storage device is realized.

Further, the present invention may be realized not only as the controller but also as an energy storage apparatus.

That is, an energy storage apparatus according to an aspect of the present invention includes: an energy storage unit including an energy storage device; a switch provided in a charge or discharge current path of the energy storage unit; a control part that supplies a control signal to the switch; and an external input terminal that supplies an external input signal to the switch, wherein the switch has at least one of an OFF function to turn off the switch when at least one of the control signal and the external input signal is a signal for turning off the switch and an ON function to turn on the switch when both of the control signal and the external input signal are signals for turning on the switch.

Further, the present invention may be realized as a moving object including the energy storage apparatus.

In this way, a moving object that can suppress the occurrence of the malfunction caused by a flow of an overcurrent through the energy storage device is realized.

Further, a controller according to another aspect of the present invention is a controller that controls charge or discharge of an energy storage unit including an energy storage device, the controller including: a switch provided in a charge or discharge current path of the energy storage unit; a control part that supplies a control signal to the switch; an external input terminal that supplies an external input signal to the switch; and an external output terminal that outputs an external output signal to another controller including another switch, wherein the switch is turned off when at least one of the control signal and the external input signal is a signal for turning off the switch, or is turned on when both of the control signal and the external input signal are signals for turning on the switch, and the external output signal for turning on the other switch is output from the external output terminal when the switch is turned on, and the external output signal for turning off the other switch is output from the external output terminal when the switch is turned off.

Further, the present invention may be realized as an energy storage apparatus including such a controller, and further as an energy storage system.

That is, an energy storage apparatus according to an aspect of the present invention includes the above-described controller and an energy storage unit whose charge or discharge is controlled by the controller.

Further, an energy storage system according to an aspect of the present invention is an energy storage system including a plurality of the above-described energy storage apparatuses, wherein a plurality of the energy storage units included in the plurality of energy storage apparatuses are connected in parallel to one another, the plurality of controllers are daisy-chain connected in a loop shape, and each of the plurality of controllers receives the external output signal output as the external input signal from the controller at a preceding stage.

Further, the present invention may be realized as a moving object including the energy storage system.

In this way, a moving object that can suppress the occurrence of the malfunction caused by a flow of an overcurrent through the energy storage device is realized.

Further, the present invention may be realized as a control method for controlling charge or discharge of one or more energy storage units each of which includes an energy storage device, in which a switch is provided in a charge or discharge current path of each of the one or more energy storage units, the control method including: a step of supplying a control signal to the switch; a step of supplying an external input signal to the switch; and a step of executing at least one of an OFF function to turn off the switch when at least one of the control signal and the external input signal is a signal for turning off the switch, and an ON function to turn on the switch when both of the control signal and the external input signal are signals for turning on the switch.

Further, heretofore, in such an energy storage apparatus including a plurality of energy storage devices, a configuration in which the plurality of energy storage devices are connected in parallel to one another has been known (see, for example, Patent Document 2: JP-A-2013-240142). In this energy storage apparatus, resistors which are selectively connected or disconnected are provided between energy storage devices connected in parallel to one another.

Here, when the plurality of energy storage devices are connected in parallel to one another, a current (a cross current) may sometimes flow between the energy storage devices. In particular, when the cross current is large, a malfunction such as a deterioration of the energy storage device may occur.

In the above-described conventional configuration, when the voltages of the energy storage devices are not equal to each other, the energy storage devices are connected to one another via the resistors provided between the energy storage devices, whereby, for example, it is possible to equalize the voltages of the energy storage devices (so-called precharge to the energy storage devices). Therefore, it is possible to suppress an excessive cross current when connecting the plurality of energy storage devices in parallel to one another.

However, in the above conventional configuration, it is necessary to additionally provide, for example, a bypass circuit, which has a resistor for the precharge, in parallel to the charge or discharge current path of the energy storage devices when connecting the energy storage apparatus to the load. Therefore, there is a problem that the configuration becomes complicated.

A controller according to an aspect of the present invention is a controller that controls charge or discharge of a plurality of energy storage devices provided in parallel to one another (that is, a plurality of energy storage units provided in parallel to one another), the controller including: a current limiting part that is provided in a charge or discharge current path of the power storage devices and limits a passing current; and a control part that controls the current limiting part so that a current passing through the current limiting part is equal to or less than a predetermined amount by using an amount of a current in the current path, the amount being obtained from information different from a voltage of the current path.

As described above, the current passing through the current limiting part provided in the charge or discharge current path is controlled so as to be equal to or less than the predetermined amount, whereby it is possible to suppress the excessive cross current without providing, for example, such a bypass circuit, which has the resistor for the precharge, in parallel to the current path. Hence, with a simple configuration, it is possible to suppress the excessive cross current from flowing when connecting the plurality of energy storage devices in parallel to one another.

Further, the control part may acquire an amount of a current in the current path, the amount being obtained by a non-contact current sensor, and may control the current limiting part by using the obtained amount of the current in the current path.

As described above, by using the non-contact current sensor, it is possible to acquire the amount of the current in the current path while suppressing a loss of the current flowing through the current path. Therefore, it is possible to increase the output of the energy storage devices.

Further, the control part may determine whether or not the amount of the current in the current path exceeds the predetermined amount, and may control the current passing through the current limiting part to be equal to or less than the predetermined amount when the amount of the current exceeds the predetermined amount.

In this way, it is possible to suppress excessive current restriction by the current limiting part. Therefore, it is possible to shorten the time (the time required for precharge) required for equalizing the voltages of the energy storage devices connected in parallel to one another.

Further, the controller may further include a switch that is provided in series with the current limiting part in the current path and is switchable between ON and OFF.

As described above, the switch provided in series with the current limiting part in the current path is provided, and accordingly, the redundant design for overcharge protection or overdischarge protection is achieved. That is, the configuration for ensuring the safety of the energy storage devices can be configured in a redundant configuration.

The control part may further turn off the switch when a temperature of the current limiting part exceeds a predetermined temperature.

As described above, the switch is turned off when the temperature of the current limiting part exceeds the predetermined temperature, whereby it is possible to cut off the cross current, for example, even when abnormality occurs in the current limiting part. Therefore, safety can be further ensured.

In addition, the control part may perform control so that the current passing through the current limiting part becomes a constant current equal to or less than the predetermined amount.

Here, the cross current flowing between the energy storage devices connected in parallel to one another gradually decreases as the voltages between the energy storage devices become uniform. Therefore, for example, a voltage change in the precharged energy storage device gradually becomes dull. In contrast, the current passing through the current limiting part is controlled so as to be a constant current, whereby it is possible to constantly maintain the voltage change in the precharged energy storage devices until completion of the precharge. Therefore, the time required for the precharge can be shortened.

Further, the current limiting part may include a semiconductor device provided in the current path, and the control part may perform control so that the current passing through the current limiting part becomes equal to or less than the predetermined amount by operating the semiconductor device in a linear region.

As described above, the semiconductor device is operated in the linear region, whereby the current is controlled to be equal to or less than the predetermined amount. Therefore, it is not necessary to provide a dedicated resistor for the precharge, for example. In this way, the configuration can be simplified.

In addition, the semiconductor device may be an FET (Field Effect Transistor).

As described above, the FET is used as the semiconductor device, whereby it is possible to suppress the excessive cross current with a simple configuration.

Further, the present invention may be realized as a moving object including the controller.

In this way, a moving object that can suppress the occurrence of the malfunction caused by a flow of an overcurrent through the energy storage device is realized.

Further, the present invention may be realized not only as the controller but also as an energy storage apparatus including the controller.

That is, an energy storage apparatus according to an aspect of the present invention includes the above-described controller and an energy storage device whose charge or discharge is controlled by the controller.

Further, the present invention may be realized as a control method for controlling charge or discharge of a plurality of energy storage devices provided in parallel to one another (that is, a plurality of energy storage units provided in parallel to one another), the control method including: a step of acquiring an amount of a current in a current path, the amount being obtained from information different from a voltage of a charge or discharge current path of the energy storage devices; and a step of limiting the current passing through the current path to a predetermined amount or less by using the acquired amount of the current.

Hereinafter, a controller according to an embodiment of the present invention, which controls charge or discharge, will be described with reference to the drawings. It is to be noted that the embodiment to be described below shows one specific example of the present invention. Numeric values, shapes, materials, constituent elements, arrangement positions and connection modes of constituent elements, steps, an order thereof, and the like, which will be shown in the following embodiment, are merely examples and are not intended to limit the present invention. Further, among the constituent elements according to the following embodiment, constituent elements which are not described in the independent claims showing a top level concept are described as arbitrary constituent elements. Further, each of the figures is a diagram for describing an energy storage apparatus, and is not necessarily strictly illustrated.

Moreover, in the following description, an energy storage system including a plurality of energy storage apparatuses, on each of which a controller is mounted, will be described. Note that, in the following description, charge or discharge is referred to as "charge-discharge", and a charge current path or a discharge current path is sometimes referred to as a "charge-discharge current path" or simply as a "current path". In other words, hereinafter, the "charge-discharge" means at least one of charge and discharge, and the "charge-discharge current path" or the "current path" means a current path of at least one of a charge current and a discharge current.

First Embodiment

First, a configuration of an energy storage system according to a first embodiment will be described with reference to FIG. 1 and FIG. 2.

FIG. 1 is a perspective view showing an overall external view of an energy storage system 1000 according to this embodiment. FIG. 2 is a block diagram showing a functional configuration of the energy storage system 1000 according to this embodiment.

Note that, in FIG. 1, a Z-axis direction is shown as a vertical direction, and the Z-axis direction will be described as the vertical direction in the following description. However, the Z-axis direction may not be vertical depending on a mode of use. Accordingly, the Z-axis direction is not limited to the vertical direction. For example, an X-axis direction may be vertical. The same applies to the following figures.

The energy storage system 1000 is a system that can charge electricity from the outside and discharge electricity to the outside. In this embodiment, the energy storage system 1000 is connected to a power system such as a power supply 2000 and to a load 3000, charges electricity from the power supply 2000, and discharges electricity to the load 3000. The energy storage system 1000 includes a plurality of energy storage apparatuses 1 (three energy storage apparatuses 1A to 1C in this embodiment), and is used for power storage applications, and power supply applications, for example. Specifically, the energy storage system 1000 is used for moving objects such as automobiles, motorcycles, trains, ships, AGVs (automatic guided vehicles), snowmobiles, agricultural machines, construction machines, and for example, is used as an engine starting battery of each of the moving objects. Note that the number of energy storage apparatuses 1 may be any number as long as the number is two or more.

Each of the energy storage apparatuses 1 is, for example, an energy storage module that can charge electricity from the outside and discharge electricity to the outside. Among energy storage apparatuses, the energy storage apparatus 1 according to this embodiment is suitably used as a stationary power supply apparatus. This energy storage apparatus 1 includes an energy storage unit 40 and a controller 90 that controls charge or discharge of the energy storage unit 40. That is, in this embodiment, the controller 90 controls the charge or discharge of one energy storage unit 40 of one energy storage unit among the one or more energy storage units 40 (three energy storage units 40 in this embodiment). In other words, the controller 90 is provided for each of the one or more energy storage units 40.

The energy storage unit 40 is a battery unit that can charge or discharge electric power. In this embodiment, the energy storage unit 40 includes one or more energy storage devices 41 connected in series to one another. The plurality of energy storage units 40 included in the plurality of energy storage apparatuses 1 are connected in parallel to one another by a power supply line 3.

The controller 90 has a switch 91 provided in a charge or discharge current path for the energy storage unit 40, and controls the charge or discharge of the energy storage unit 40 by turning on and off the switch 91. The plurality of controllers 90 included in the plurality of energy storage apparatuses 1 are daisy-chain connected in a loop shape by communication lines 2 such as RS-232 cables and RS-485 cables. Note that a standard of the communication lines 2 is not particularly limited, and the communication lines 2 may be cables for serial communication or cables for parallel communication. A detailed functional configuration of the controller 90 will be described later.

Next, a configuration of the energy storage apparatus 1 will be described with reference to FIG. 3 while referring to FIG. 1.

Figure 3:
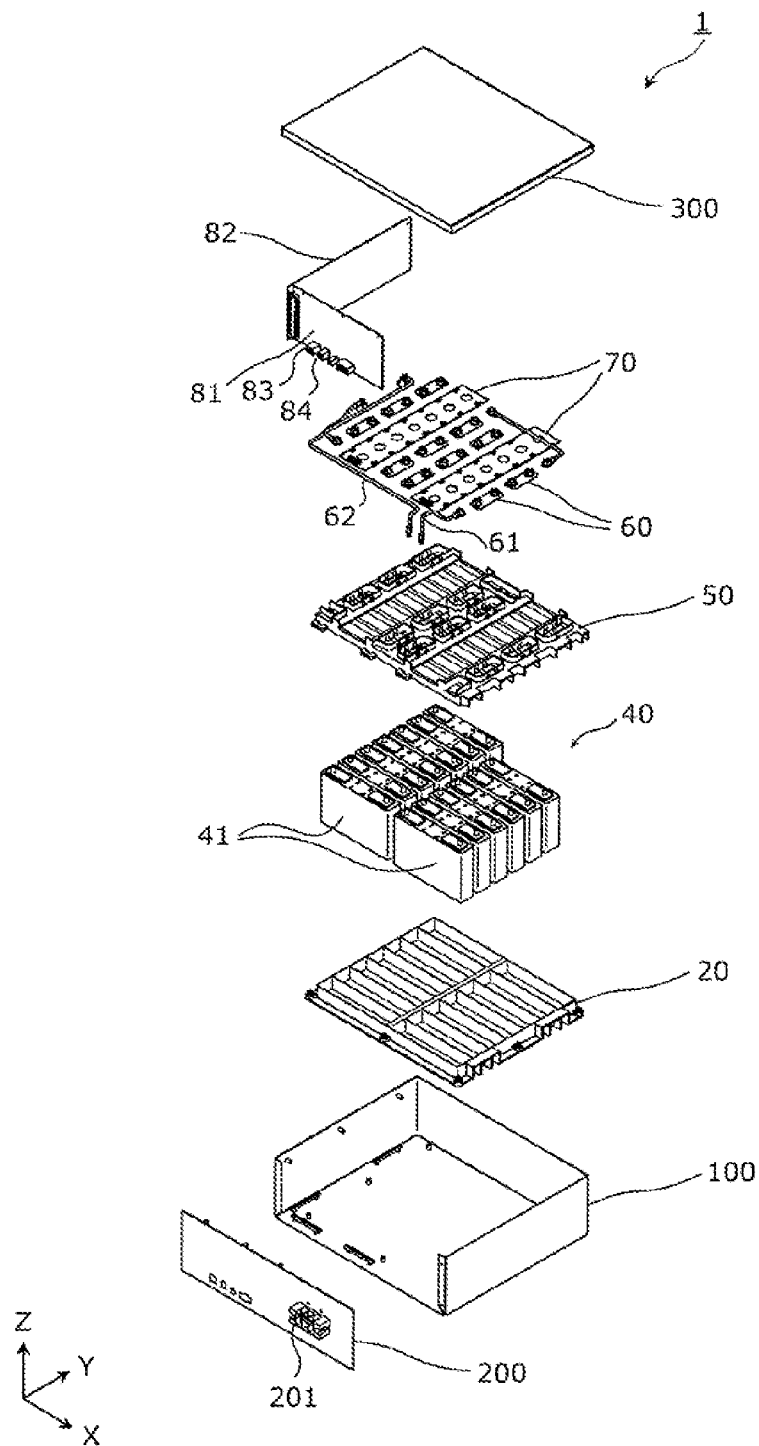
FIG. 3 is an exploded perspective view showing respective constituent elements when an energy storage apparatus according to the first embodiment is disassembled.

FIG. 3 is an exploded perspective view showing respective constituent elements when the energy storage apparatus 1 according to this embodiment is disassembled.

As shown in FIGS. 1 and 3, the energy storage apparatus 1 includes an outer case 10 including an outer case main body 100, a front wall portion 200, and an upper wall portion 300. Moreover, as shown in FIG. 3, inside the outer case 10, the energy storage apparatus 1 includes a bottom-side arrangement member 20, an energy storage device 41, a terminal-side arrangement member 50, bus bars 60, a wiring board 70, a measurement board 81, and a main circuit board 82.

The outer case 10 is a rectangular (box-shaped) container (module case) constituting an outer case of the energy storage apparatus 1. In the outer case 10, the energy storage devices 41 and boards (the wiring boards 70, the measurement board 81, and the main circuit board 82) and the like are arranged at predetermined positions, whereby the outer case 10 protects the energy storage devices 41, the boards, and the like from impacts and the like. The outer case 10 is made of a highly rigid material, for example, metal such as aluminum and iron. Note that the outer case 10 may be made of a resin material such as polypropylene (PP), polycarbonate (PC), polybutylene terephthalate (PBT), and ABS resin.

The outer case main body 100 is a member constituting a main body of the outer case 10, and has a rectangular bottom wall and three rectangular side walls erected from the bottom wall. The outer case main body 100 has a shape obtained by bending a plate-shaped member. Moreover, the front wall portion 200 is a rectangular and plate-shaped member constituting another side wall of the outer case 10. That is, a member having a bottomed, rectangular and tubular shape is formed of the outer case main body 100 and the front wall portion 200. The front wall portion 200 is provided with external connection terminals 201 (a terminal block) of the energy storage apparatus 1. Note that a handle may be provided on an outer surface of the front wall portion 200. In this way, the energy storage apparatus 1 can be easily removed, moved (carried), and so on.

The upper wall portion 300 is a member constituting an upper wall (a lid) of the outer case 10, and is a rectangular and plate-shaped member that closes an opening of the bottomed, rectangular and tubular member formed of the outer case main body 100 and the front wall portion 200. That is, in a state in which the energy storage devices 41, the boards (the wiring boards 70, the measurement board 81, and the main circuit board 82) and the like are arranged inside the outer case main body 100 and the front wall portion 200, the opening portion is closed by the upper wall portion 300.

The bottom-side arrangement member 20 is a flat rectangular member disposed on a bottom side of the energy storage devices 41, and supports the energy storage devices 41 from below. That is, the bottom-side arrangement member 20 is mounted on a bottom wall of the outer case main body 100 and is attached and fixed to the bottom wall, and supports the energy storage devices 41 at predetermined positions with respect to the outer case 10.

Specifically, the bottom-side arrangement member 20 is made of an insulating material, and fixes the energy storage devices 41 inside the outer case 10 in such a manner that the energy storage devices 41 are inserted into recesses formed on an upper surface of the bottom-side arrangement member 20. In this way, the bottom-side arrangement member 20 prevents the energy storage devices 41 and the like from making contact with a conductive member such as the outer case 10, and in addition, protects the energy storage devices 41 and the like from vibrations, impacts, and the like.

Although the bottom-side arrangement member 20 may be formed of any insulating material, it is preferable that the bottom-side arrangement member 20 be formed of, for example, resin having high heat resistance, such as polybutylene terephthalate (GF-reinforced PBT) reinforced with glass fiber and polyphenylene sulfide (PPS). In this way, even when the energy storage device 41 generates heat, it is possible to suppress the bottom-side arrangement member 20 from being damaged and affecting the other energy storage devices 41. Note that, as long as insulation properties of the energy storage devices 41 can be ensured, the bottom-side arrangement member 20 does not need to be formed of the insulating material.

The energy storage devices 41 are secondary batteries (battery cells) which can charge electricity and discharge electricity, and more specifically, are nonaqueous electrolyte secondary batteries such as lithium ion secondary batteries. In this embodiment, thirteen energy storage devices 41 are housed in the outer case 10; however, another energy storage device 41 may be added to an empty space to house fourteen energy storage devices 41. Alternatively, the number of energy storage devices 41 may be plural other than the above-described numbers, or the outer case 10 only needs to house one energy storage device 41. In addition, the energy storage devices 41 are not limited to the nonaqueous electrolyte secondary batteries, and may be secondary batteries other than the nonaqueous electrolyte secondary batteries, or may be capacitors.

The terminal-side arrangement member 50 is a flat rectangular member disposed on an electrode terminal side of the energy storage devices 41, and supports the energy storage devices 41 from above. That is, the terminal-side arrangement member 50 is disposed above the energy storage devices 41, and sandwiches the energy storage devices 41 from upper and lower sides (in the Z-axis direction) together with the bottom-side arrangement member 20, thereby supporting the energy storage devices 41 at predetermined positions with respect to the outer case 10.

Specifically, the terminal-side arrangement member 50 is made of an insulating material, and fixes the energy storage devices 41 inside the outer case 10 in such a manner that the energy storage devices 41 are inserted into recesses formed on a lower surface of the terminal-side arrangement member 50. In this way, the terminal-side arrangement member 50 prevents the energy storage devices 41 from making contact with the conductive member such as the outer case 10, and in addition, protects the energy storage devices 41 and the like from vibrations, impacts, and the like.

Moreover, the bus bars 60 and the wiring boards 70 are mounted on the terminal-side arrangement member 50. That is, the terminal-side arrangement member 50 also has a function to position the bus bars 60 and the wiring boards 70 with respect to the energy storage devices 41 when the bus bars 60 and the wiring boards 70 are attached to the energy storage device 41. Note that, although the terminal-side arrangement member 50 may be formed of any insulating material, it is preferable that the terminal-side arrangement member 50 be formed of resin, for example, such as polypropylene (PP), polycarbonate (PC), and ABS resin in terms of cost and the like. Note that, as long as insulation properties of the energy storage devices 41, the bus bars 60, and the like can be ensured, the terminal-side arrangement member 50 does not need to be formed of the insulating material.

The bus bars 60 are conductive plate-shaped members made of metal or the like, which are disposed above the terminal-side arrangement member 50 and electrically connect the plurality of energy storage devices 41 to one another. Specifically, in the adjacent energy storage devices 41, each of the bus bars 60 connects a positive electrode terminal or a negative electrode terminal of one energy storage device 41 to a negative electrode terminal or a positive electrode terminal of another energy storage device 41. In this embodiment, the bus bars 60 connect thirteen energy storage devices 41 in series to one another. In this way, the energy storage unit 40 is configured by one or more energy storage devices 41 (thirteen energy storage devices 41 in this embodiment) connected in series to one another by the bus bars 60.

The wiring boards 70 are arranged above the terminal-side arrangement member 50. Further, in order to detect voltages of the energy storage devices 41, the wiring boards 70 have wiring whose one end is connected to the electrode terminal of at least one energy storage device 41 among the energy storage devices 41 included in the energy storage apparatus 1 (in this embodiment, to positive electrode terminals of all the energy storage devices 41). Moreover, the wiring boards 70 have a rectangular shape, and are disposed between the positive electrode terminals and negative electrode terminals of the energy storage devices 41. In this embodiment, two wiring boards 70 are disposed; however, the number of wiring boards 70 is not limited. In place of the wiring boards 70, a harness or the like can be used. However, the electrode terminals and the measurement board 81 are connected to each other by using the wiring boards 70, whereby the wiring can be easily routed, and assembling properties are improved. Note that the wiring boards 70 may have a configuration in each of which a thermistor is mounted to be capable of detecting temperature of the energy storage devices 41.

The measurement board 81 and the main circuit board 82 are circuit boards constituting the controller 90 mentioned above. The measurement board 81 and the main circuit board 82 are disposed between the energy storage devices 41 and the side walls of the outer case 10, and are connected to at least one energy storage device 41 among the energy storage devices 41 included in the energy storage apparatus 1. In this way, the measurement board 81 and the main circuit board 82 measure and control the state of the energy storage devices 41.

Specifically, the main circuit board 82 is a board on which main circuit components having a large current flowing therethrough are mounted, and is fixed to an inner surface of the side wall of the outer case 10, which is opposed to short side faces of containers of the energy storage devices 41. The above-mentioned switch 91 is mounted on the main circuit board 82. In this embodiment, the switch 91 is connected to a negative power supply line 62 between a positive power supply line 61 and the negative power supply line 62, which form the charge-discharge current path for the energy storage unit 40. Here, the positive power supply line 61 is a power supply line electrically connected to the positive electrode terminals of the energy storage devices 41 at one end, and the negative power supply line 62 is a power supply line connected to the negative electrode terminals of the energy storage devices 41 at the other end.

Moreover, the measurement board 81 is a board on which peripheral circuit components having a small current flowing therethrough are mounted, and is fixed to an inner surface of the side wall of the outer case 10, which is opposed to long side faces of the containers of the energy storage devices 41. The measurement board 81 is connected to the energy storage devices 41 via the wiring boards 70, and is connected to the main circuit board 82 and an external instrument. The measurement board 81 is provided with an external input terminal 83 and an external output terminal 84.

The external input terminal 83 is a connector that supplies an external input signal to the switch 91. In this embodiment, when the voltage of any one of the three energy storage units 40 is equal to or lower than the end-of-discharge voltage, a signal for turning off the switch 91 is input to the external input terminal 83 as an external input signal. Moreover, a signal for turning on the switch 91 is input as an external input signal to the external input terminal 83 when the power system (the power supply 2000 in this embodiment) connected to the three energy storage units 40 is restored.

The external output terminal 84 is a connector that outputs an external output signal to another controller 90 including another switch 91. From the external output terminal 84, an external output signal for turning on the other switch 91 (the switch 91 of another controller 90) is output when one switch 91 (the switch 91 of the subject controller 90) is turned on, and an external output signal for turning off the other switch 91 is output when the one switch 91 is turned off.

In this embodiment, when a voltage of the one energy storage unit 40 (the energy storage unit 40 corresponding to the subject controller 90) is equal to or lower than the end-of-discharge voltage, the external output signal for turning off the other switches 91 is output from the external output terminal 84. Moreover, when the power supply 2000 connected to the energy storage unit 40 is restored, the external output signal for turning on the other switch 91 is output from the external output terminal 84. Moreover, when abnormality occurs in the energy storage unit 40, the external output signal for turning on the other switch 91 is output from the external output terminal 84.

The external input terminal 83 and the external output terminal 84 are connected to the external input terminal 83 and external output terminal 84 of another energy storage apparatus 1 via the communication line 2 for daisy chain-connecting the plurality of controllers 90 of the plurality of energy storage apparatuses 1 in a loop shape. Specifically, the external input terminal 83 of one energy storage apparatus 1 is connected to the external output terminal 84 of the energy storage apparatus 1 at a preceding stage via the communication line 2. Moreover, the external output terminal 84 of the one energy storage apparatus 1 is connected to the external input terminal 83 of the energy storage apparatus 1 at a subsequent stage via the communication line 2.

Therefore, the external output signal output from the controller 90 at the preceding stage is input as an external input signal to each of the controllers 90.

Next, a detailed configuration of the controller 90 will be described.

Figure 4:
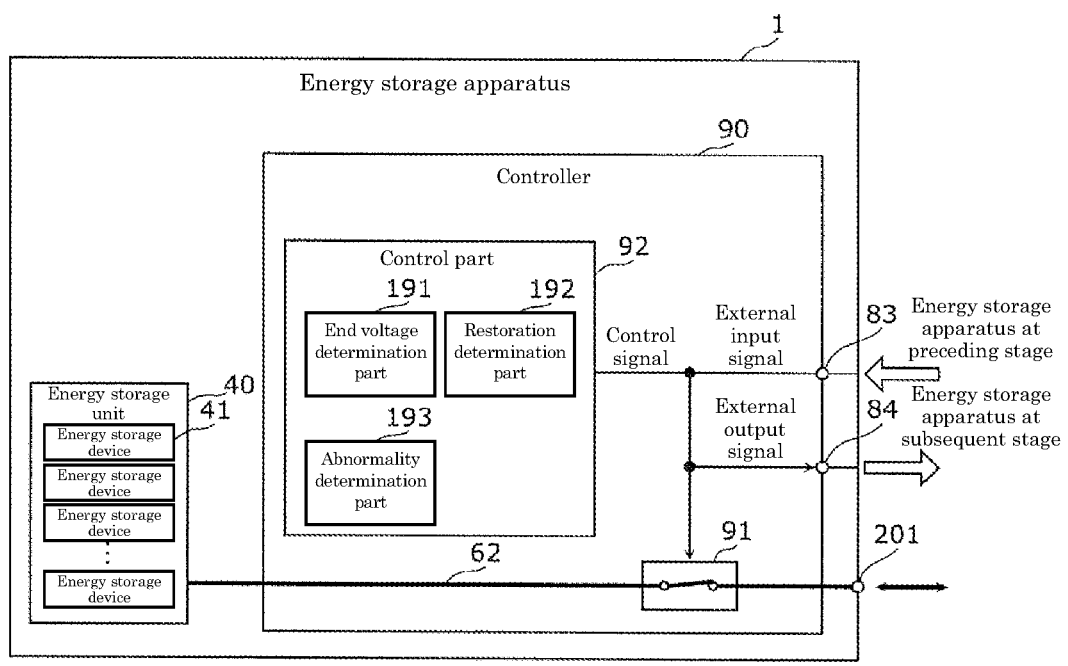
FIG. 4 is a block diagram showing a functional configuration of a controller according to the first embodiment.
Figure 5:
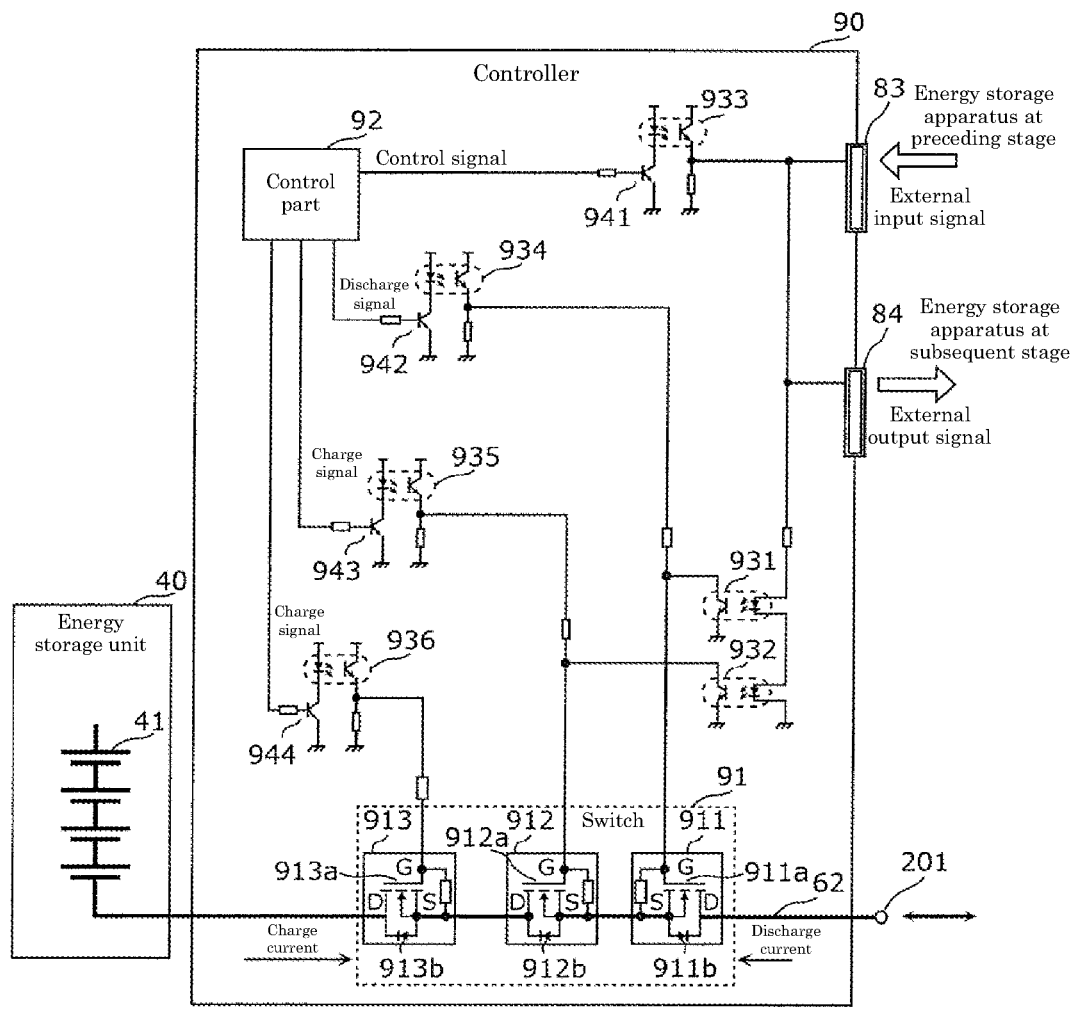
FIG. 5 is a circuit diagram showing an example of a specific circuit configuration of the controller according to the first embodiment.

FIG. 4 is a block diagram showing a functional configuration of the controller 90 according to this embodiment. FIG. 5 is a circuit diagram showing an example of a specific circuit configuration of the controller 90 according to this embodiment. Note that FIGS. 4 and 5 also illustrate the energy storage unit 40.

The controller 90 is a device that controls charge or discharge of the energy storage unit 40 including the energy storage devices 41. As shown in FIG. 4, the controller 90 includes the switch 91, a control part 92, the external input terminal 83, and the external output terminal 84. Further, as shown in FIG. 5, in this embodiment, the controller 90 further includes: photocouplers 931 to 936 for transmitting signals while ensuring insulation properties from the main circuit component side through which a large current flows; and transistors 941 to 944 for causing light emitting diodes of the photocouplers 933 to 936 to emit light.

The switch 91 is provided on a charge-discharge current path for the energy storage unit 40, which is the power supply line 62 connected to the power supply line 3 via an external connection terminal 201. The switch 91 has at least one (both in this embodiment) of an OFF function to turn off the switch 91 when at least one of the control signal and the external input signal is a signal for turning off the switch 91 and an ON function to turn on the switch 91 when both of the control signal and the external input signal are signals for turning on the switch 91. The OFF function and the ON function are realized by, for example, a circuit configuration around the switch 91 shown in FIG. 5. Moreover, in this embodiment, when abnormality occurs in any one of the three energy storage units 40, the switch 91 provided in the charge or discharge current path of each of the energy storage units 40 in which the abnormality has occurred is turned off Hereinafter, a signal for turning on the switch 91 is referred to as an ON signal, and a signal for turning off the switch 91 is referred to as an OFF signal.

As shown in FIG. 5, for example, the switch 91 includes switches 911 to 913 inserted in series to the power supply line 62. Therefore, when at least one of the switches 911 to 913 is turned off, the switch 91 is turned off, and when all the switches 911 to 913 are turned on, the switch 91 is turned on.

Each of the switches 911 to 913 is configured by, for example, an FET (Field Effect Transistor) that is turned on and off according to a voltage supplied to a gate thereof, and a diode that is connected in parallel to the FET.

The switch 911 is a discharge switch that is turned off when at least one of the control signal, the external input signal, and the discharge signal is an OFF signal, and is turned on when all of the signals are ON signals. Specifically, the switch 911 includes an n-type FET 911a and a diode 911b connected between a source and drain of the FET 911a in a direction opposite to the discharge current.

The switch 912 is a charge switch that is turned off when at least one of the control signal, the external input signal, and the charge signal is an OFF signal, and is turned on when all of the signals are ON signals. Specifically, the switch 912 includes an n-type FET 912a and a diode 912b connected between a source and drain of the FET 912a in a direction opposite to the charge current.

The switch 913 is a charge switch that is turned off when the charge signal is an OFF signal and turned on when the charge signal is an ON signal. The switch 913 is configured similarly to the switch 912, and is a charge switch having an n-type FET 913a and a diode 913b.

In this embodiment, the charge switches (the switches 912 and 913) are redundantly provided as compared with the discharge switch (the switch 911). Generally, in view of ensuring safety, it is important to suppress overcharge of the energy storage devices in the energy storage apparatus. Therefore, the overcharge of the energy storage devices 41 can be suppressed by providing the charge switches redundantly. Note that the charge switches may not be provided redundantly, and the charge switches and the discharge switch may be provided integrally with each other. In addition, each of the discharge switches and the charge switch may be configured by one FET, or may be configured by a plurality of FETs (for example, five FETs) connected in parallel to one another.

Note that the switch 91 only needs to be capable of cutting off the charge current and the discharge current, and does not need to be configured by the n-type FET. For example, the switch 91 may be configured by a p-type FET, may be configured by a bipolar transistor that is turned on and off by a current, or may be configured by a relay contact or a MCCB (Molded Case Circuit Breaker: wiring breaker). However, in view of reducing power consumption of the control part 92 and the like during normal charge and discharge, it is preferable that the switch 91 be turned on in the case of a low voltage.

Here, in this embodiment, a positive electrode side of the energy storage unit 40 is grounded, and among the positive power supply line 61 and the negative power supply line 62 which are connected to the energy storage unit 40, the switch 91 is provided on the negative power supply line 62. Therefore, the energy storage system 1000 according to this embodiment is useful as an energy storage system for communication, such as a base station for mobile communication, whose positive electrode side is grounded. Note that the switch 91 only needs to be provided in the charge-discharge current path for the energy storage unit 40, and may be provided on the positive power supply line 61.

The control part 92 supplies the control signal to the switch 91. In this embodiment, as shown in FIG. 5, the control part 92 supplies the control signal, a discharge signal, and the charge signals to the switches 911 to 913. At least a part of the control part 92 is, for example, a single chip microcomputer including: a memory such as a ROM (Read Only Memory) that holds a control program; and a processor that executes the control program.

In this embodiment, as shown in FIG. 4, the control part 92 includes an end voltage determination part 191, a power restoration determination part 192, and an abnormality determination part 193.

When the end voltage determination part 191 determines that the voltage of the energy storage unit 40 is equal to or less than the end-of-discharge voltage, the control part 92 outputs a control signal to turn off the switch 91. In this embodiment, in this case, the control part 92 turns each of the control signal, the discharge signal, and the charge signals to an OFF signal, whereby light emitting diodes of the photocouplers 931 to 936 emit light to allow flows of current. In this way, the switches 911 to 913 are turned off. Moreover, in this case, the external output signal output from the external output terminal 84 is an OFF signal.

Further, when the power restoration determination part 192 determines that the power system connected to the energy storage unit 40 is restored, the control part 92 outputs a control signal to turn on the switch 91. In this embodiment, in this case, the control part 92 turns on each of the control signal, the discharge signal and the charge signals, whereby the light emitting diodes of the photocouplers 933 to 936 emit light to allow flows of current. Therefore, the switch 913 is turned on. Moreover, in this case, if the external input signal is an ON signal, the light emitting diodes of the photocouplers 931 and 932 emit light and allow flows of current. Therefore, the switches 911 and 912 are also turned on, and the external output signal output from the external output terminal 84 is also turned on. On the other hand, in this case, if the external input signal is an OFF signal, since the light emitting diodes of the photocouplers 931 and 932 do not emit light, the switches 911 and 912 are turned OFF, and the external output signal output from the external output terminal 84 also becomes the OFF signal.

Further, when the abnormality determination part 193 determines that abnormality has occurred in the energy storage unit 40, the control part 92 outputs a control signal to turn off the switch 91. In this embodiment, in this case, while turning the control signal to an ON signal, the control part 92 turns each of the discharge signal and the charge signals to an OFF signal, whereby the light emitting diodes of the photocouplers 933 and 934 do not emit light. Therefore, all of the switches 911 to 913 are turned off. Moreover, in this case, the external output signal depends only on the external input signal between the control signal and the external input signal. In other words, if the external input signal is an OFF signal, the external output signal is also an OFF signal, and if the external input signal is an ON signal, the external output signal is also an ON signal.

The end voltage determination part 191 determines whether or not the voltage of the energy storage unit 40 is equal to or lower than the end-of-discharge voltage. Here, the end-of-discharge voltage is a minimum voltage of the energy storage unit 40, at which the discharge can be performed safely. For example, the end voltage determination part 191 measures the voltage of the energy storage unit 40 by detecting the voltages of the energy storage devices 41 via the wiring boards 70. Note that a method for measuring the voltage of the energy storage unit 40 is not particularly limited, and the voltage of the external connection terminal 201 may be measured.

The power restoration determination part 192 determines whether or not the power system connected to the energy storage unit 40 is restored. For example, the power restoration determination part 192 measures the voltage of the external connection terminal 201, and determines that the power system is restored when the measured voltage is equal to or higher than a predetermined voltage. Note that a method for determining the power restoration is not particularly limited, and the power restoration may be determined by detecting the cutting off and opening of the MCCB provided in the system.

The abnormality determination part 193 determines whether or not abnormality has occurred in the energy storage unit 40. Here, the abnormality that occurs in the energy storage unit 40 is, for example, an overcurrent due to an overload, a short circuit or the like, heat generation above an allowable temperature of the energy storage devices 41, and the like. For example, the abnormality determination part 193 detects an amount of the current, which flows through the power supply line 62, by using a Hall element (not shown) provided on the power supply line 62, and determines that abnormality has occurred in the energy storage unit 40 when the detected amount of the current is equal to or larger than a predetermined amount. Moreover, for example, the abnormality determination part 193 detects the temperature of the energy storage devices 41 by using a thermistor (not shown) mounted on the wiring board 70, and determines that abnormality has occurred in the energy storage unit 40 when the detected temperature is equal to or higher than the predetermined temperature.

Figure 6A:
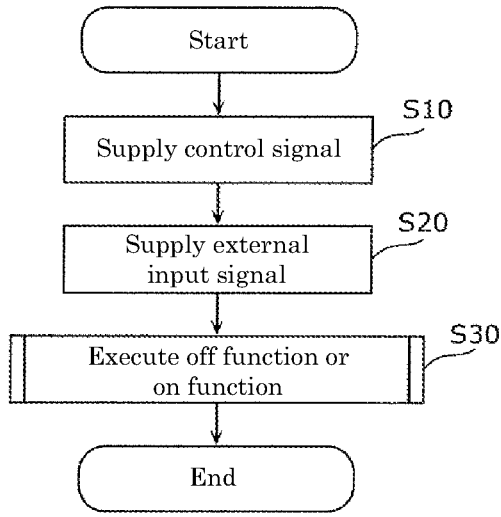
FIG. 6A is a flowchart showing operations of the controller according to the first embodiment.
Figure 6B:
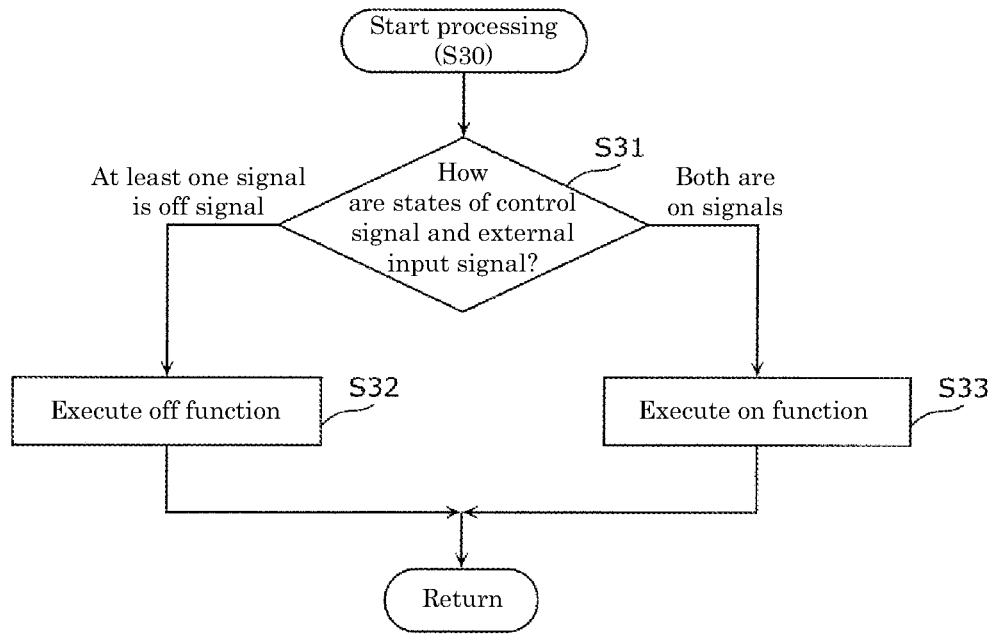
FIG. 6B is a flowchart showing detailed operations in output processing of FIG. 6A.

Next, operations of the controller 90 according to this embodiment will be described with reference to FIGS. 6A and 6B. FIG. 6A is a flowchart showing the operations of the controller 90 according to this embodiment. FIG. 6B is a flowchart showing detailed operations in Step S30 of FIG. 6A.

As shown in FIG. 6A, first, the control signal is supplied to the switch 91 (S10). In this embodiment, the control part 92 supplies the control signal, the discharge signal, and each of the charge signals to the switch 91.

Then, the external input signal is supplied to the switch 91 (S20). In this embodiment, the external input terminal 83 connected to the external output terminal 84 of the energy storage apparatus 1 at the preceding stage via the communication line 2 supplies the external input signal to the switch 91.

Thereafter, at least one of the OFF function to turn off the switch 91 and the ON function to turn on the switch 91 is executed (S30). Specifically, as shown in FIG. 6B, in Step S30, when at least one of the control signal and the external input signal is the signal for turning off the switch 91 (in the case where "at least one signal is the OFF signal" in S31), the OFF function to turn off the switch 91 is executed (S32). At this time, the OFF signal is output as the external output signal from the external output terminal 84. On the other hand, when both of the control signal and the external input signal are the signals for turning on the switch 91 (in the case where "both signals are the ON signals" in S31), the ON function to turn on the switch 91 is executed (S33). At this time, the ON signal is output as the external output signal from the external output terminal 84.

Hereinafter, effects obtained by the controller 90 of each of the energy storage apparatuses 1 in the energy storage system 1000 according to this embodiment will be described with reference to FIGS. 7 to 11 while mentioning specific examples. Note that, in these figures, in order to facilitate an intuitive understanding of the charge current and the discharge current, the description will be made on the assumption that the controller 90 is provided on the positive power supply line 61 of the energy storage unit 40. Therefore, in these figures, the flowing directions of the charge current and the discharge current are opposite to those in FIG. 5.

First, effects obtained by the energy storage system 1000 at the time of a power failure of the power supply 2000 (power supply system) will be described.

Figure 7:
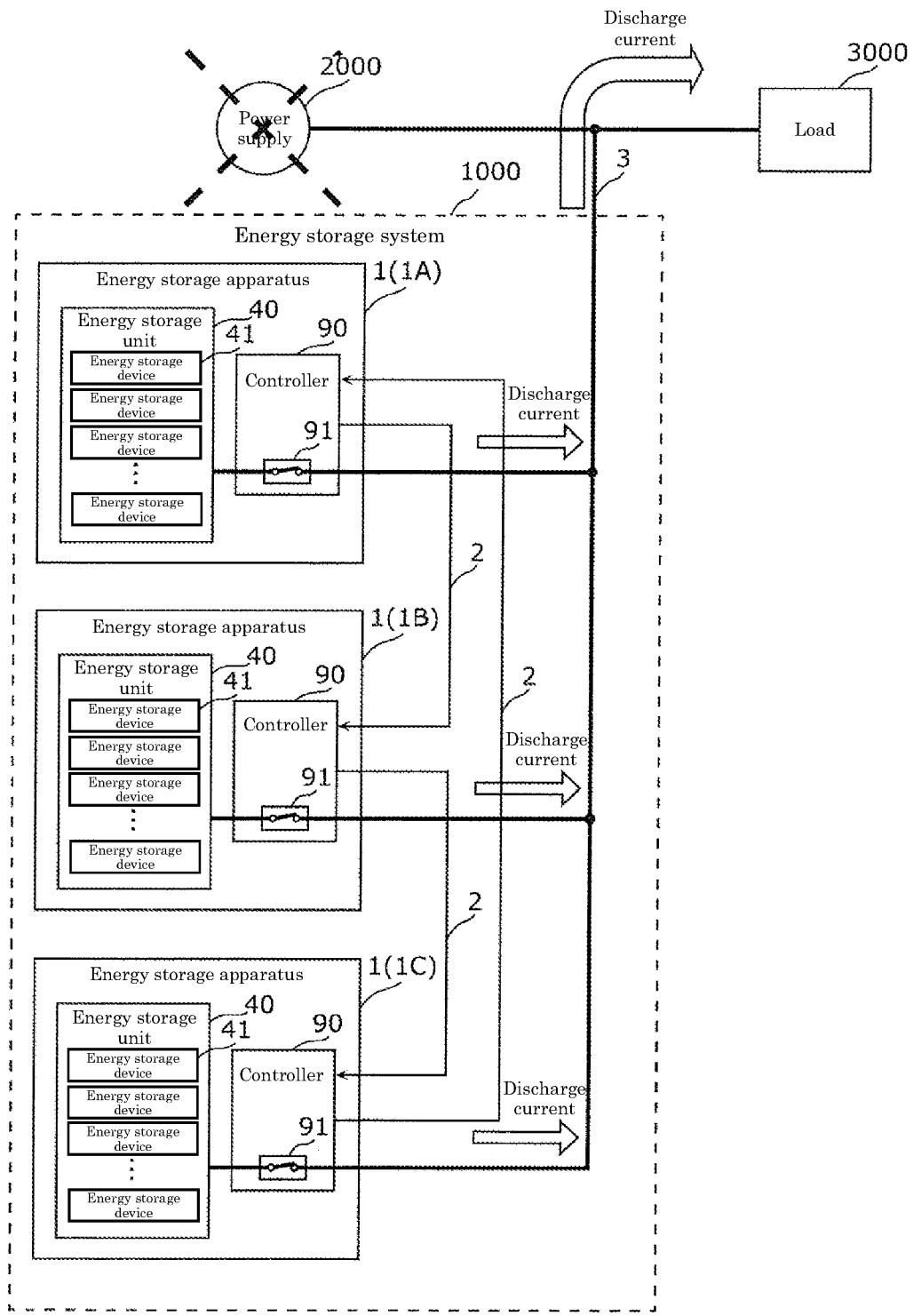
FIG. 7 is a diagram schematically showing a state of the energy storage system at the time of a power failure in the first embodiment.
Figure 8:
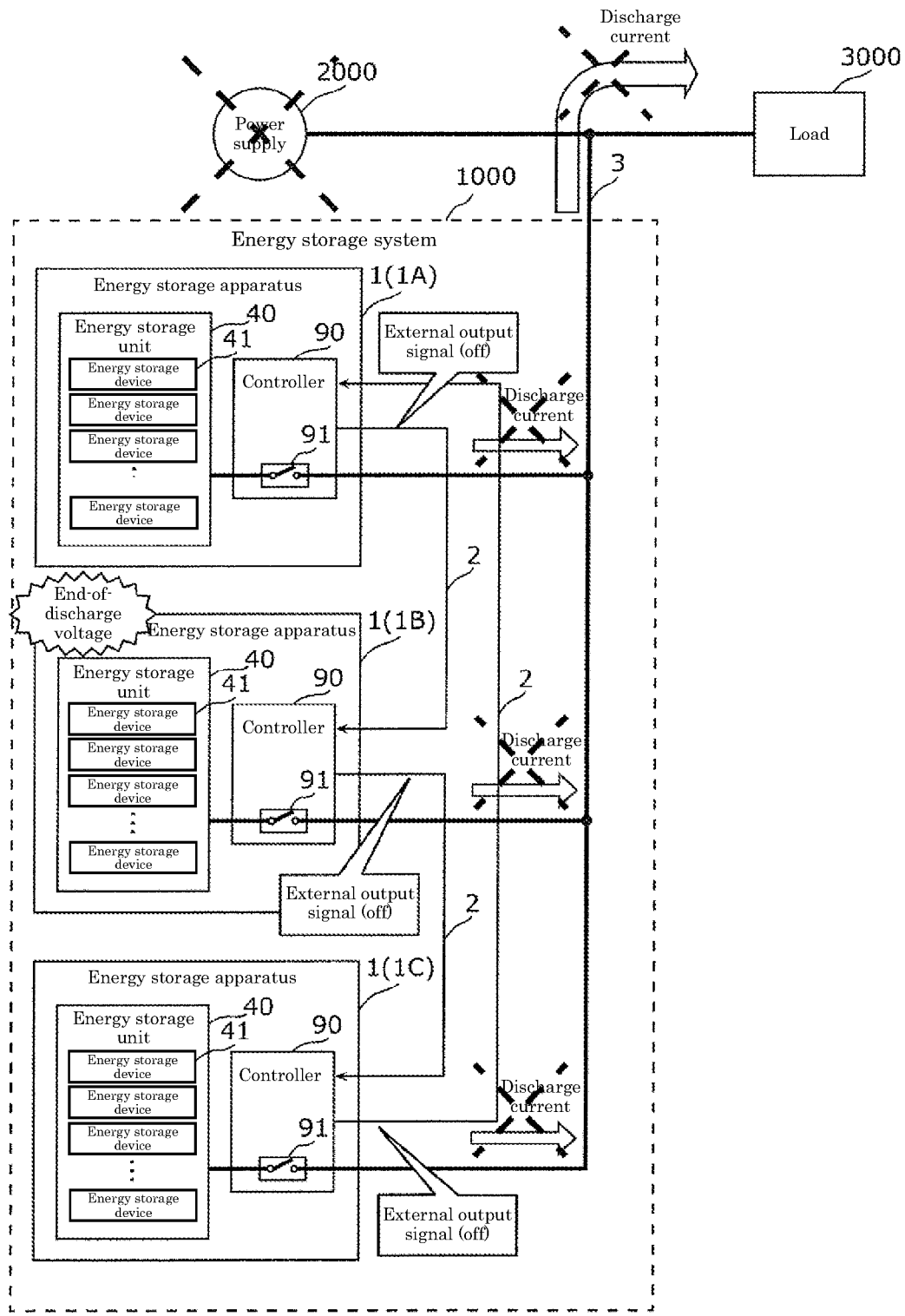
FIG. 8 is a diagram schematically showing a state of the energy storage system at the time of the power failure in the first embodiment.

FIGS. 7 and 8 are diagrams schematically showing states of the energy storage system 1000 at the time of the power failure in this embodiment.

As shown in FIG. 7, when the power supply 2000 fails, the energy storage system 1000 supplies power to the load 3000. That is, the energy storage system 1000 backs up power when the power supply 2000 fails. At this time, since the switch 91 of each of the plurality of energy storage apparatuses 1 is turned on, the discharge current flows from each of the plurality of energy storage units 40, which are connected in parallel to one another, to the load 3000.

Thereafter, when the supply of power to the load 3000 continues, as shown in FIG. 8, an energy storage apparatus 1 (the energy storage apparatus 1B in this case) appears, in which the voltage of the energy storage unit 40 becomes equal to or lower than the end-of-discharge voltage. At this time, in the controller 90 of the energy storage apparatus 1B, the switch 91 is turned off, and in addition, the OFF signal is output as the external output signal.

As a result, the switch 91 is turned off in the controller 90 of the energy storage apparatus 1C to which the external output signal output from the controller 90 of the energy storage apparatus 1B is input as the external input signal. Moreover, in the controller 90 of the energy storage apparatus 1C, the OFF signal is output as the external output signal.

In this way, also in the energy storage apparatus 1A to which the external output signal output from the energy storage apparatus 1C is input, the switch 91 is turned off, and the OFF signal is output as the external output signal.

Therefore, in the energy storage system 1000 according to this embodiment, if there is one energy storage apparatus 1 in which the voltage of the energy storage unit 40 becomes equal to or lower than the end-of-discharge voltage among the plurality of energy storage apparatuses 1, the discharge currents from the energy storage units 40 of all the energy storage apparatuses 1 are stopped in conjunction with one another.

Here, timings at which the voltages of the plurality of energy storage units 40 become equal to or lower than the end-of-discharge voltage may be different from one another due to an influence of variations among capacities of the energy storage units 40, and the like. Therefore, when the discharge currents from the plurality of energy storage units 40 do not stop in conjunction with one another but stop at independent timings at which the voltages of the respective energy storage units 40 become equal to or lower than the discharge current, the following problem may occur.

That is, when the discharge currents from the respective energy storage units 40 stop at the independent timings, the discharge currents sequentially stop in order from the energy storage unit 40 having a smaller capacity. Here, since it is preferable that the current supplied to the load 3000 be constant, as the number of energy storage units 40 in each of which the discharge current is stopped increases, current shares of the other energy storage units 40 connected in parallel to the energy storage units 40 with the stopped discharge currents are increased. That is, amounts of the discharge currents from the other energy storage units 40 increase.

Therefore, among the plurality of energy storage units 40, in the energy storage unit 40 in which the timing at which the voltage becomes equal to or lower than the end-of-discharge voltage is latest, a very large current (overcurrent) corresponding to a total amount of the discharge currents supplied by the other energy storage units 40 flows therethrough, and a malfunction due to the overcurrent may occur.

For example, in an energy storage system in which ten energy storage units are connected in parallel to one another, when a discharge current of 40 A flows per parallel at the time of rating, in the energy storage unit in which the timing at which the voltage becomes equal to or lower than the end-of-discharge voltage is the latest, a discharge current (overcurrent) of 400 A flows, which exceeds a maximum current (for example, 80 A) allowable in the energy storage unit.

On the other hand, according to this embodiment, if there is the energy storage apparatus 1 in which the voltage of the energy storage unit 40 is equal to or lower than the end-of-discharge voltage, the discharge currents from all the energy storage apparatuses 1 are stopped in conjunction with one another. Therefore, it is possible to reduce the occurrence of malfunction due to the overcurrent.

Further, in the controller 90 according to this embodiment, the external input signal supplied from the external input terminal 83 is not input to the control part 92 or the like, but becomes a signal for turning on and off the switch 91. As a result, a time required after switching of the external input signal from the ON signal to the OFF signal until switching of the switch 91 from ON to OFF can be set to a very short time (for example, on the order of several tens of microseconds). Note that the same applies when switching from OFF to ON.

Specifically, for example, when the external input signal is input to the CPU or the like and is supplied as a signal for turning on and off the switch 91 after some processing is performed on a computer, the time required after the switching of the external input signal until the switching of the switch 91 is a relatively long time (for example, on the order of several tens of milliseconds).

In contrast, in this embodiment, since the external input signal is a signal for turning on and off the switch 91 without being processed on the computer, the time required after the switching of the external input signal until the switching of the switch 91 can be made very short. Therefore, it is possible to greatly shorten a time during which the overcurrent can flow. Therefore, it is possible to greatly reduce the occurrence of the malfunction due to the overcurrent.

Next, effects obtained by the energy storage system 1000 at the time of the power restoration of the power supply 2000 (power supply system) will be described.

Figure 9:
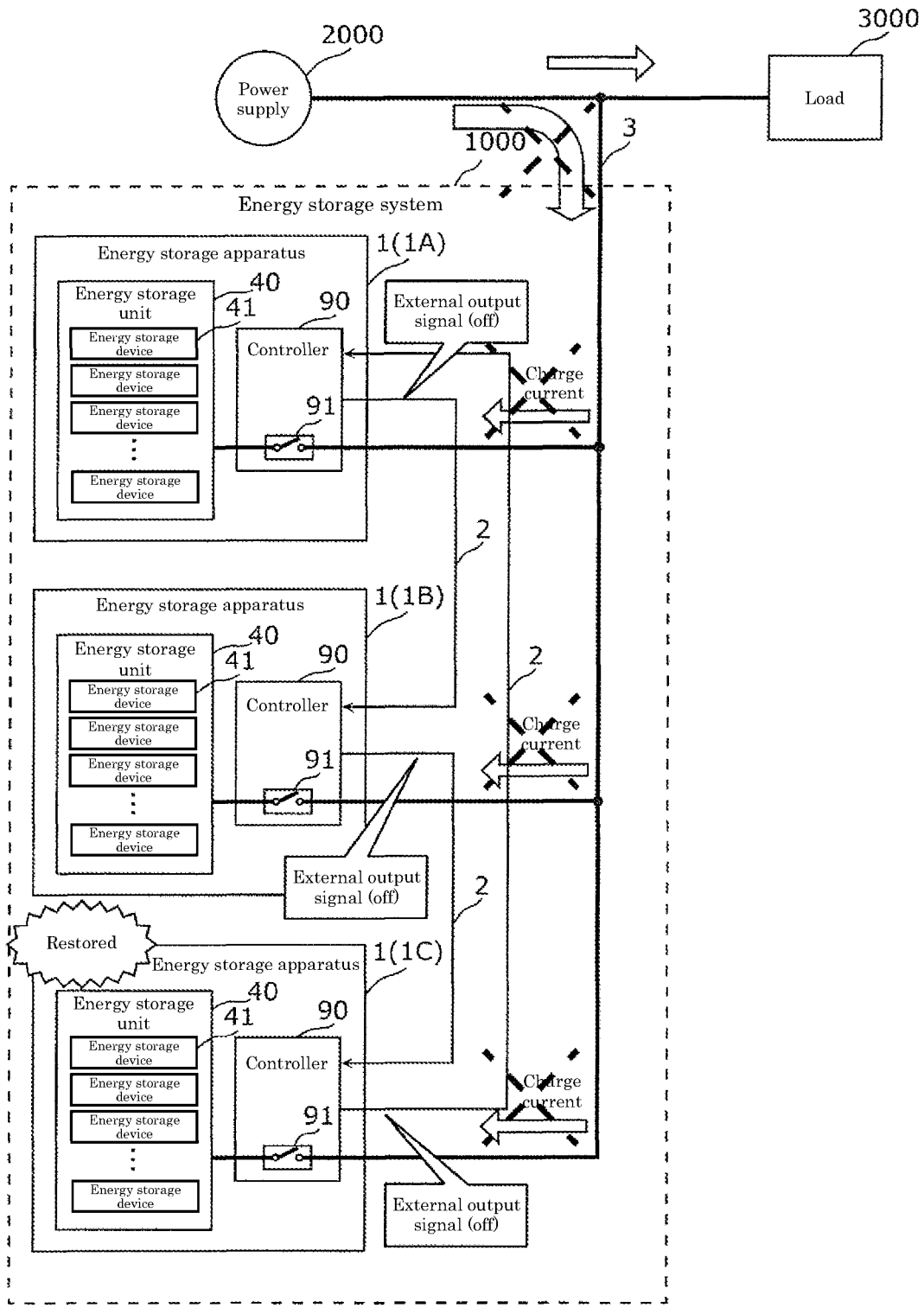
FIG. 9 is a diagram schematically showing a state of the energy storage system at the time of a power restoration in the first embodiment.
Figure 10:
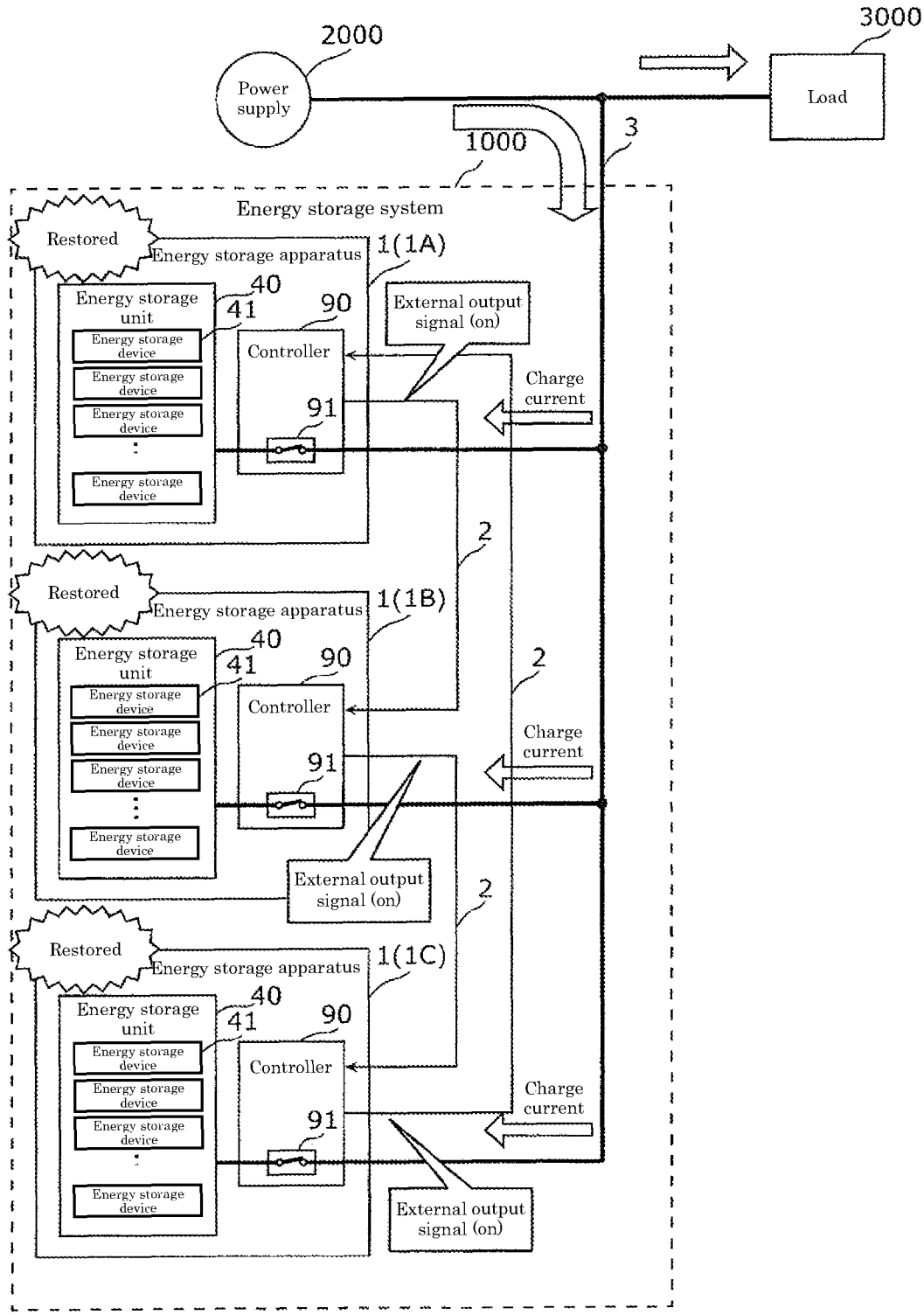
FIG. 10 is a diagram schematically showing a state of an energy storage system at the time of the power restoration in the first embodiment.

FIGS. 9 and 10 are diagrams schematically showing states of the energy storage system 1000 at the time of the power restoration in this embodiment.

First, in a state before the power restoration, the respective switches 91 of the plurality of energy storage apparatuses 1 are turned off. Thereafter, as shown in FIG. 9, when the power supply 2000 is restored from the power failure, there appears an energy storage apparatus 1 (the energy storage apparatus 1C in this case) determined to be restored by the controller 90. Here, in the energy storage apparatus 1C, the external output signal output from the energy storage apparatus 1B is input as the external input signal, and the external output signal is an OFF signal. Therefore, the switch 91 remains off also for the energy storage apparatus 1C detected to be restored.

Thereafter, as shown in FIG. 10, when it is determined that all the controllers 90 of the other energy storage apparatuses (the energy storage apparatuses 1A and 1B in this case) are restored, the external output signal output from each of all the energy storage apparatuses 1 becomes an ON signal, whereby the switches 91 of all the energy storage apparatuses 1 are turned on.

As described above, in the energy storage system 1000 according to this embodiment, at the time of the power restoration, supply of the charge current is started in conjunction with one another among the energy storage units 40 of all the energy storage apparatuses 1.

Here, with regard to the plurality of energy storage units 40, the timings at which determination is made that the power system connected thereto is restored may be different from one another due to an influence of variations in characteristics of analog devices which constitute the energy storage apparatus 1. Therefore, when the supply of the charge current to the plurality of energy storage units 40 are not started in conjunction with one another, but are started at independent timings at which determination is made that the power system connected to each of the energy storage units 40 is restored, the following problem may occur.

That is, when the supply of the charge current to each of the energy storage units 40 is started at the independent timing, in the energy storage unit 40 in which the timing at which determination is made that power is restored is earliest among the plurality of energy storage units 40, a very large current (overcurrent) will flow, which corresponds to a total amount of the charge currents to be supplied to the other energy storage units 40. Therefore, the malfunction due to the overcurrent may occur.

In contrast, according to this embodiment, the supply of the charge current is stopped until it is determined that power is restored in all the energy storage apparatuses 1, and the supply of the charge current is started in conjunction with one another when it is determined that power is restored in all the energy storage apparatuses 1. Therefore, it is possible to reduce the occurrence of the malfunction due to overcurrent.

Next, effects obtained by the energy storage system 1000 at the time of the abnormality occurrence in the energy storage apparatus 1 will be described. Note that, in the following description, a case where abnormality occurs in the energy storage apparatus 1A at the time of the power failure of the power supply 2000 will be described. However, similar effects are obtained also in a case where abnormality occurs when the power supply 2000 is not in power failure or abnormality occurs in another energy storage apparatus 1.

Figure 11:
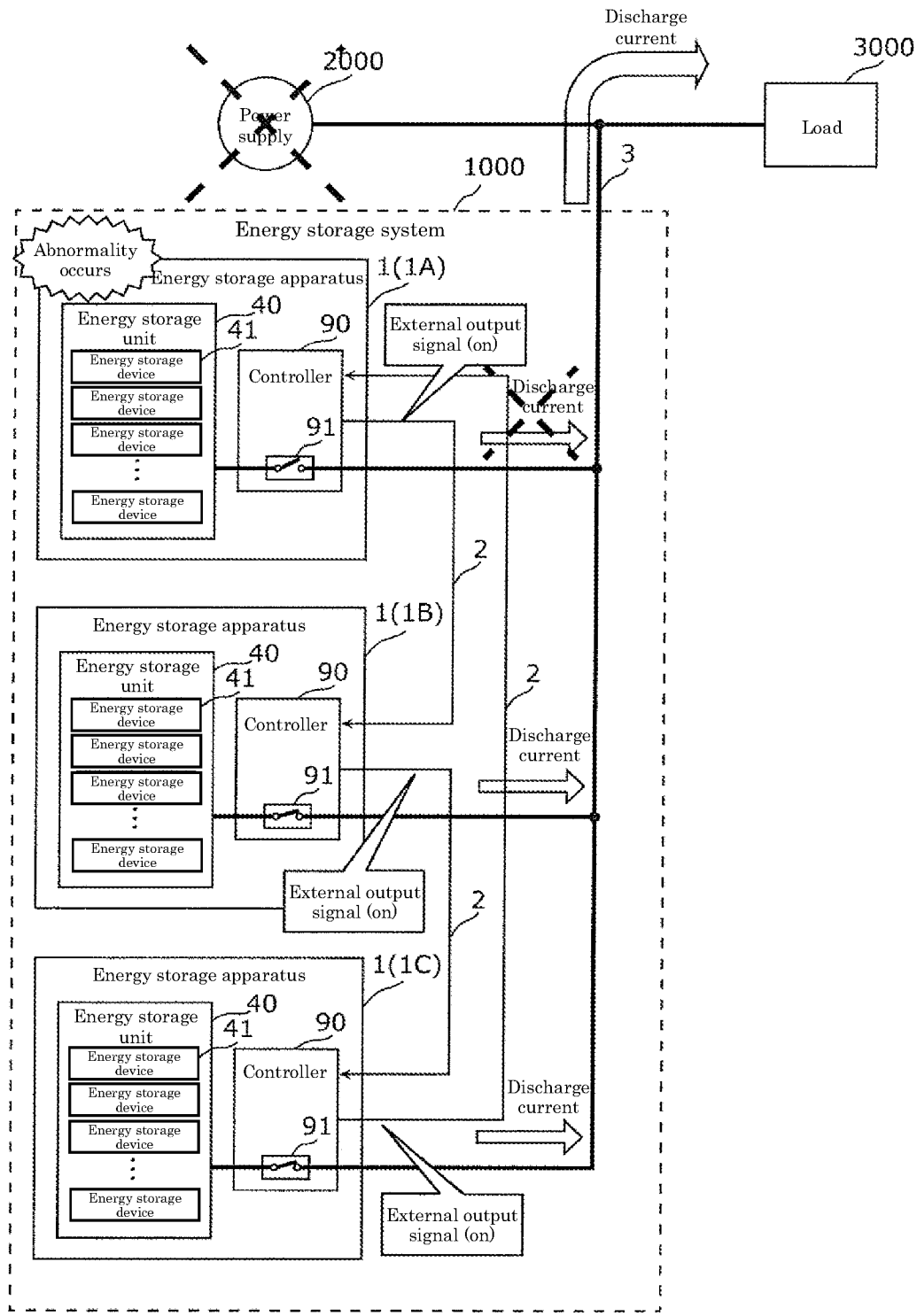
FIG. 11 is a diagram schematically showing a state of the energy storage system at the time of an abnormality occurrence in the first embodiment.

FIG. 11 is a diagram schematically showing a state of the energy storage system 1000 at the time of the abnormality occurrence in this embodiment.

In the energy storage apparatus 1 (the energy storage apparatus 1A in this case) in which the controller 90 determines that abnormality has occurred, the switch 91 is turned off, and the external output signal becomes the ON signal. Therefore, in the energy storage apparatus 1B to which the external output signal output from the energy storage apparatus 1A is input as the external input signal, the switch 91 remains on and the external output signal also remains as the ON signal. Therefore, in the energy storage apparatuses 1B and 1C other than the energy storage apparatus 1A, the switches 91 remain turned on. Therefore, it is possible to stop the discharge current only in the energy storage unit 40 in which abnormality has occurred.

As described above, in the energy storage system 1000 according to this embodiment, power can be continuously discharged by the other energy storage units 40 while disconnecting the energy storage unit 40, in which abnormality has occurred, from the load 3000.

As described above, in this embodiment, the switch 91 provided in the charge or discharge current path (the negative power supply line 62 in this embodiment) of the energy storage unit 40 has at least one (both in this embodiment) of the OFF function to turn off the switch 91 when at least one of the control signal and the external input signal is the signal for turning off the switch 91 and the ON function to turn on the switch 91 when both of the control signal and the external input signal are the signals for turning on the switch 91.

Accordingly, the switches 91 provided in the respective charge or discharge current paths are turned off all at once by the external input signal or are turned on all at once by the external input signal. Therefore, all the energy storage units 40 start or stop charge or discharge all at once, and accordingly, it is possible to reduce the occurrence of the malfunction of the energy storage units 40.

Further, in this embodiment, the controller 90 controls the charge or discharge of one energy storage unit 40, and from the external output terminal 84, an external output signal for turning on the switches 91 of the other controllers 90 is output when the switch 91 concerned is turned on, and an external output signal for turning off the switches 91 of the other controllers 90 is output when the switch 91 concerned is turned off.

As a result, when the switch 91 corresponding to one energy storage unit 40 is turned off, the other switches 91 corresponding to the other energy storage units 40 are also turned off in conjunction therewith. Alternatively, when the switch 91 corresponding to one energy storage unit 40 is turned on, the other switches 91 corresponding to the other energy storage units 40 are also turned on in conjunction therewith. Therefore, since all the energy storage units 40 can charge or discharge in conjunction with one another, it is possible to reduce the occurrence of malfunction in the energy storage unit 40. In other words, according to this configuration, since the other switches 91 provided in the charge or discharge current path of the other energy storage units 40 can be controlled by the external output signal, installation work at an installation site can be easily and reliably performed.

Specifically, according to this embodiment, the signal for turning off the switches 91 is input as the external input signal when the voltage of any one of one or more energy storage units 40 is equal to or lower than the end-of-discharge voltage. As a result, when the voltage of any one of the energy storage units 40 becomes equal to or lower than the end-of-discharge voltage, the switches 91 provided in the respective charge or discharge current paths are turned off all at once. Therefore, since the respective energy storage units 40 are disconnected from the load 3000 all at once, it is possible to reduce the occurrence of the malfunction in the energy storage unit 40.

Moreover, according to this embodiment, the signal for turning on the switch 91 is input as the external input signal when the power system (the power supply 2000 in this embodiment) connected to one or more energy storage units 40 is restored. As a result, the switches 91 provided in the respective charge or discharge current paths are turned on all at once when the power system is restored. Therefore, the respective energy storage units 40 are connected to the power system all at once. Therefore, it is possible to reduce the occurrence of the malfunction in the energy storage unit 40 at the time of the power restoration.

Note that, when the power system is restored, the signal for turning off the switch 91 may be input as the external input signal. As a result, the switches 91 provided in the respective charge or discharge current paths are turned off all at once when the power system is restored. Therefore, the respective energy storage units 40 are disconnected from the power system all at once. Therefore, it is possible to reduce the occurrence of the malfunction such as the overcharge of the energy storage unit 40, which may occur at the time of the power restoration after a short-period power failure.

Further, according to this embodiment, the switch 91 provided in the charge or discharge current path for the energy storage unit 40 in which abnormality has occurred is turned off. As a result, while disconnecting the energy storage unit 40 in which abnormality has occurred from the power supply 2000 or the load 3000, all the other energy storage units 40 start or stop charge or discharge all at once. Therefore, it is possible to reduce the occurrence of the malfunction in the energy storage unit 40. That is, even when abnormality occurs in some of the energy storage units 40, the other energy storage units 40 continuously charge or discharge power, and redundant design of N+1 is achieved.

Further, in this embodiment, each of the plurality of energy storage apparatuses 1 includes the controller 90 and the energy storage units 40 whose charge or discharge is controlled by the controller 90. Each controller 90 is configured as follows. That is, the controller 90 includes: the switch 91 provided in the charge or discharge current path for the energy storage unit 40; the control part 92 that supplies the control signal to the switch 91; the external input terminal 83 that supplies the external input signal to the switch 91; the external output terminal 84 that outputs the external output signal to the other controllers 90 including the other switches 91. Here, the switch 91 is turned off when at least one of the control signal and the external input signal is a signal for turning off the switch 91, or is turned on when both of the control signal and the external input signal are signals for turning on the switch 91. Moreover, from the external output terminal 84, an external output signal for turning on the other switches 91 is output when the switch 91 is turned on, and an external output signal for turning off the other switches 91 is output when the switch 91 is turned off.

Here, in this embodiment, the plurality of energy storage units 40 included in the plurality of energy storage apparatuses 1 are connected in parallel to one another. In addition, the plurality of controllers 90 are daisy chain-connected in a loop shape, and each of the plurality of controllers 90 receives an external output signal, which is output from the controller 90 at the preceding stage, as an external input signal.

Accordingly, when any one of the switches 91 of the plurality of controllers 90 is turned off, the switches 91 of the other controllers 90 are also turned off in conjunction therewith. Alternatively, when any one of the switches 91 of the plurality of controllers 90 is turned on, the switches 91 of the other controllers 90 are also turned on in conjunction therewith. Therefore, all the energy storage units 40 can start or stop charge or discharge in conjunction with one another, and accordingly, it is possible to reduce the occurrence of the malfunction of the energy storage unit 40.

(Modified Example of Controller)

Note that the configuration of the controller 90 described in the first embodiment is merely an example, and may be different from that in FIGS. 4 and 5. Therefore, a modified example of the controller will be described below.

Figure 12:
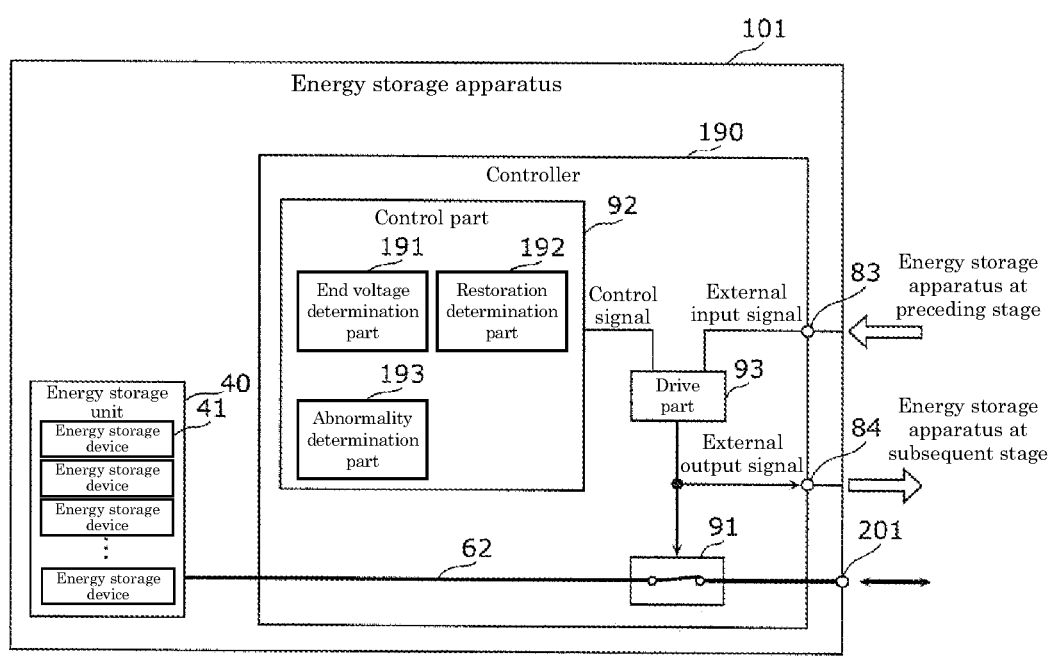
FIG. 12 is a block diagram showing a modified example of the functional configuration of the controller.

FIG. 12 is a block diagram showing a functional configuration of a controller 190 according to the modified example. Note that, FIG. 12 also shows the energy storage unit 40, and shows an energy storage apparatus 101 according to this modified example.

The controller 190 shown in FIG. 12 further includes a drive part 93 as compared with the controller 90 in the first embodiment.

The drive part 93 receives the control signal and the external input signal, and turns off and on the switch 91 according to the control signal and the external input signal. For example, the drive part 93 includes: a logic IC such as an NOR gate to which the control signal and the external input signal are input; and a photocoupler that receives an output of the logic IC.

Even with the controller 190 configured as described above, similar effects to those of the first embodiment are obtained. Furthermore, according to this modified example, the switch 91 can be turned on and off even when driving capabilities of the control signal and the external input signal are small.

For example, when the drive part 93 has a logic IC, the logic IC can output a signal, which has a driving capability larger than the driving capabilities of the control signal and the external input signal, by a power supply supplied thereto. Therefore, since the light emitting diodes of the photocouplers can be caused to emit light with a signal having a large driving capability, it is possible to reliably turn on and off the switch 91 configured by the FETs and the like.

Therefore, according to this modified example, it is possible to reduce the occurrence of the malfunction of the energy storage unit 40 without using an expensive CPU or the like, which has a high driving capability, as the control part 92.

Note that the drive part 93 is not limited to such a configuration, and may have, for example, a configuration using an IC used for a buffer or the like, or may have a configuration using an IC used for a level shifter or the like. In addition, the drive part 93 does not need to have the photocoupler as long as the insulation properties with the main circuit component side through which a large current flows are ensured.

(First Modified Example of First Embodiment)

The configuration, in which the switches 91 of the plurality of energy storage apparatuses 1 described in the first embodiment are turned on and off in conjunction with one another, can also be applied as a configuration for reducing the occurrence of the overcurrent at the time of turning on power of the controller. Therefore, in this modified example, an energy storage system capable of reducing the occurrence of the overcurrent at the time of turning on power will be described.

Figure 13:
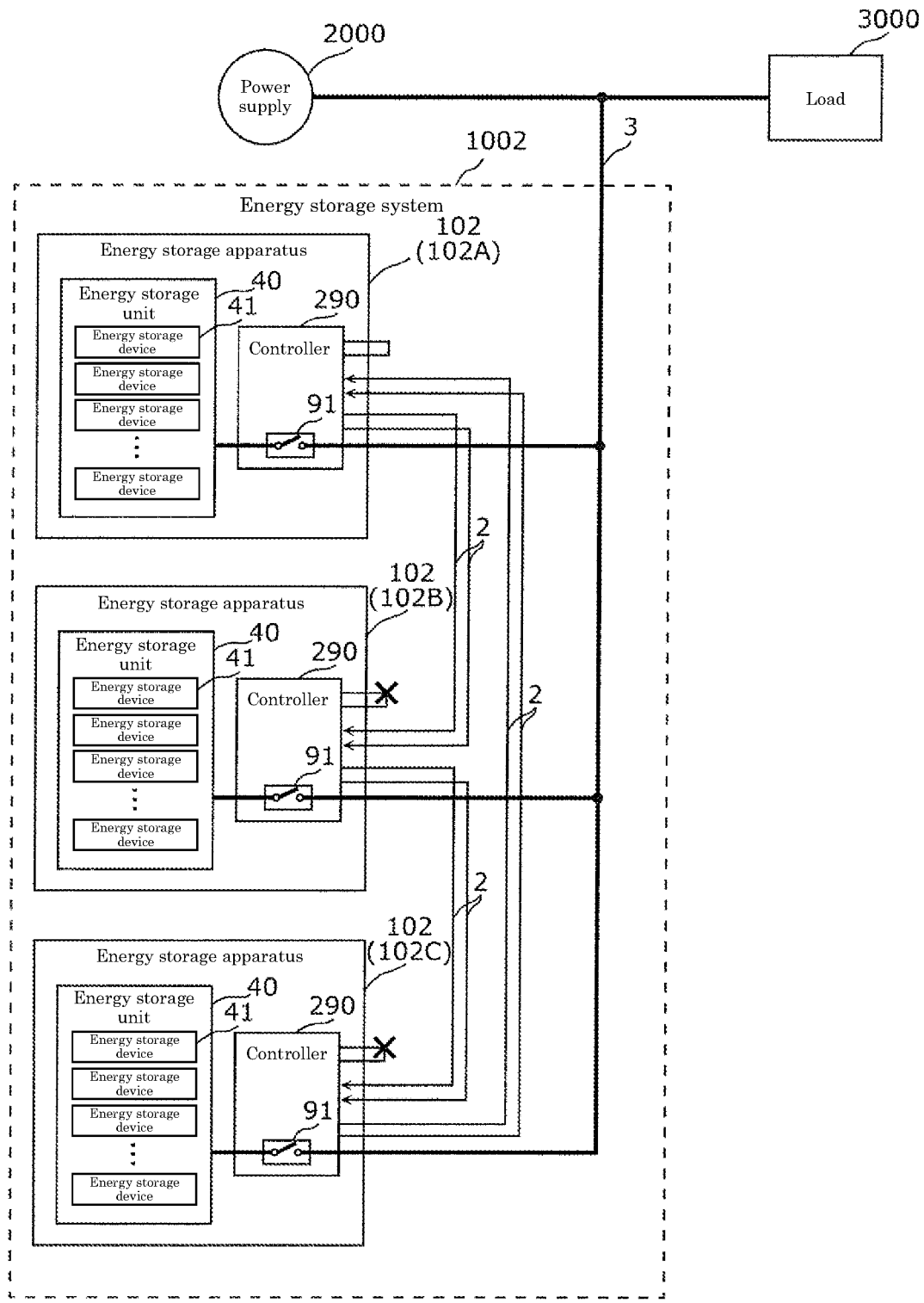
FIG. 13 is a block diagram showing a functional configuration of an energy storage system according to a first modified example of the first embodiment.

FIG. 13 is a block diagram showing a functional configuration of an energy storage system 1002 according to this modified example. As shown in FIG. 13, as compared with the energy storage system 1000 according to the first embodiment, the energy storage system 1002 according to this modified example includes energy storage apparatuses 102 (energy storage apparatuses 102A to 102C), which have controllers 290, in place of the controllers 90.

In this modified example, an arbitrary energy storage apparatus 102 (an energy storage apparatus 102A in this case) among the plurality of energy storage apparatuses 102 is set as a host battery that turns on the switches 91 of the plurality of energy storage apparatuses 1 in conjunction with one another. Further, the other energy storage apparatuses 102 (the energy storage apparatuses 102B and 102C in this case) are set as target batteries (slave batteries) whose switches 91 are turned on under the control of the host battery.

Figure 14:
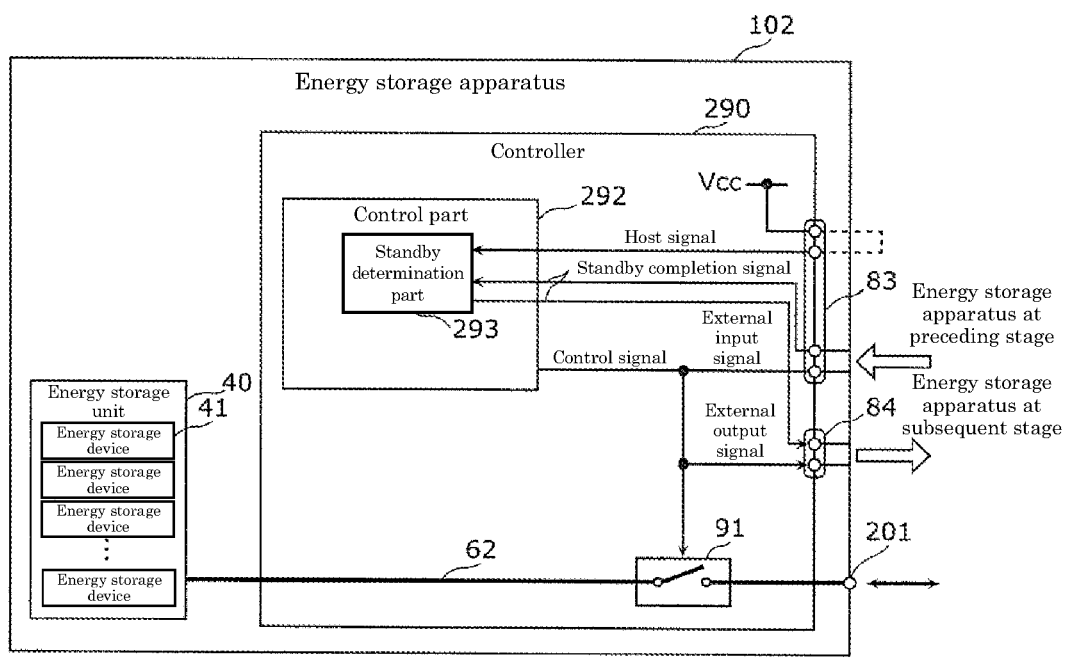
FIG. 14 is a block diagram showing a functional configuration of a controller according to the first modified example of the first embodiment.

FIG. 14 is a block diagram showing a functional configuration of a controller 290 according to this modified example. Note that, FIG. 14 also shows the energy storage unit 40, and shows an energy storage apparatus 102 according to this modified example.

The controller 290 according to this modified example outputs a standby completion signal (to be described later) to an energy storage apparatus 102 at a subsequent stage when permission is given to turn on the switch 91 after turning on power of the energy storage unit 40. As compared with the controller 90, the controller 290 includes a control part 292 in place of the control part 92. Moreover, in this modified example, the controller 290 receives a host signal indicating whether or not the energy storage apparatus 102 is the host battery, and from the energy storage apparatus 102 at the preceding stage, receives the standby completion signal via the communication line 2 and the external input terminal 83. In addition, in this modified example, the controller 290 further outputs the standby completion signal to the energy storage apparatus 102 at the subsequent stage via the external output terminal 84 and the communication line 2.

The host signal is switched, for example, by short-circuiting or opening a connection between predetermined pins of the external input terminal 83. Specifically, in the host battery, a dedicated connector for short-circuiting a connection between predetermined pins of the external input terminal 83 is attached to the external input terminal 83. In the target battery, a normal connector that does not short-circuit the connection between the predetermined pins is attached to the external input terminal 83.

As compared with the control part 92 in the first embodiment, the control part 292 includes a standby determination part 293 in place of the end voltage determination part 191, the power restoration determination part 192, and the abnormality determination part 193. The control part 292 turns on the control signal when the standby determination part 293 determines that the standby is completed.

The standby determination part 293 determines whether or not the standby is completed after turning on power of the controller 290, and outputs a standby completion signal when it is determined that the standby is completed. Specifically, the standby determination part 293 of the host battery performs self-diagnosis after turning on power of the subject controller 290, and when self-diagnosis results in "no abnormality", the standby determination part 293 determines that the standby is completed, and outputs the standby completion signal to the energy storage apparatus 102 at the subsequent stage. Meanwhile, a standby determination part 293 of the target battery also determines the completion of the standby, similarly to the standby determination part 293 of the host battery. However, when the standby determination part 293 of the target battery determines that the standby is completed, and receives a standby completion signal from the energy storage apparatus 102 at the preceding stage, outputs the standby completion signal to the energy storage apparatus 102 at the subsequent stage.

Here, for example, the self-diagnosis is a diagnosis to determine whether or not abnormality is present. Such an abnormality determination diagnosis is executed by an internal BMU (Battery Management Unit) activated by turning on a power switch (not shown) of the subject energy storage apparatus 102.

In addition, in the host battery, when permission is given to turn on the switch 91 after turning on power of the controller 290, a signal for turning on the switch 91 is input as the external input signal. In other words, when permission is given to turn on the switch 91 after turning on power of the energy storage unit 40, the external output terminal 84 of the host battery outputs the external output signal for turning on the switch 91 of the other (subsequent) controller 290. Here, "permission is given to turn on the switch 91" means that the subject standby determination part 293 determines that the standby is completed, and that the standby completion signal is input from the other (preceding) energy storage apparatus 102.

In other words, the host battery outputs the external output signal, which is the ON signal, regardless of the external input signal, when it is determined by the standby determination part 293 of the host battery that the standby is completed and the standby completion signal is input from the energy storage apparatus 102 at the preceding stage.

Figure 15:
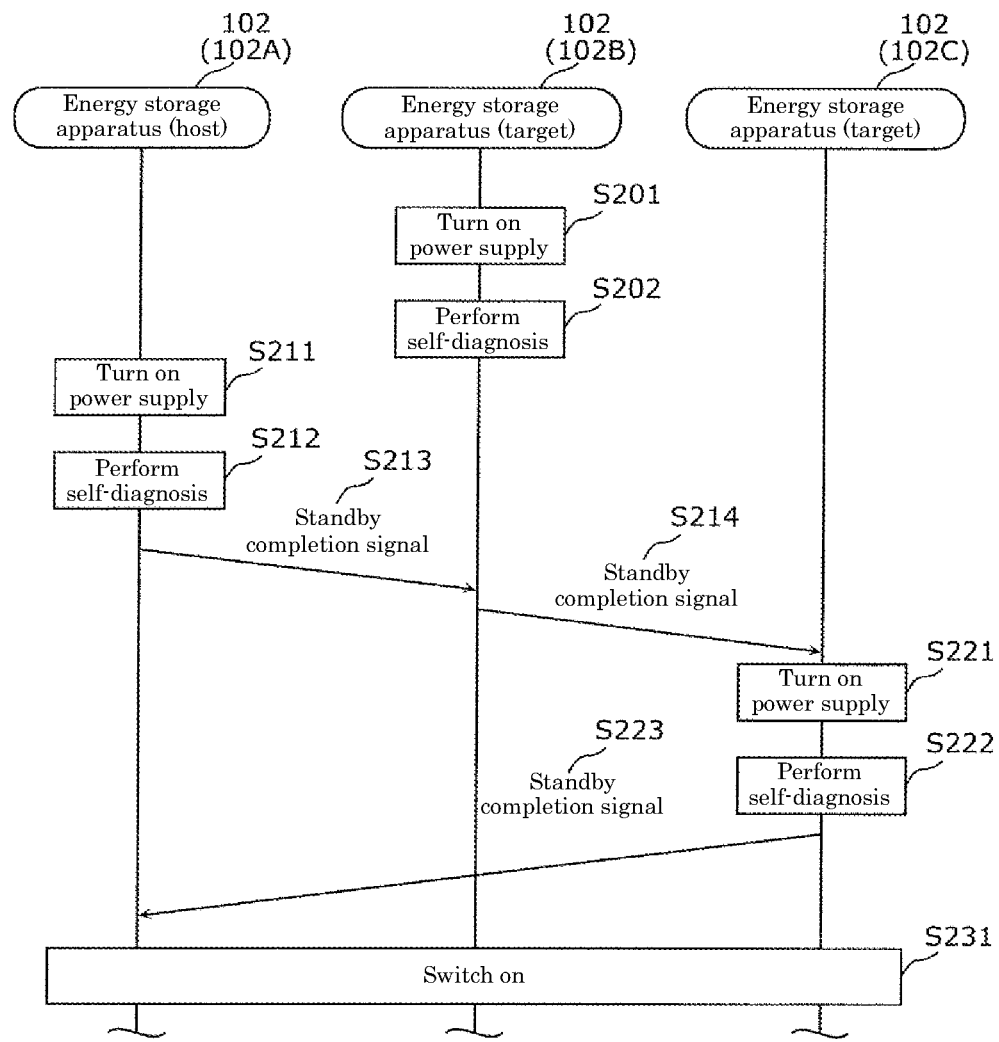
FIG. 15 is a sequence diagram showing exchange between energy storage apparatuses at the time of turning on power of each of the energy storage apparatuses in the first modified example of the first embodiment.

FIG. 15 is a sequence diagram showing exchange between the energy storage apparatuses 102 at the time turning on power of each of the energy storage apparatuses 102 in this modified example. Such exchange is performed, for example, at the time of installation of the energy storage system 1002. In the following, an example will be described, in which powers of the energy storage apparatus 102B, the energy storage apparatus 102A, and the energy storage apparatus 102C are turned on in this order; however, the order of turning on powers is not limited to this, and may be in any order. Alternatively, powers of two or more energy storage apparatuses 102 may be simultaneously turned on.

First, in a state before power is turned on, each switch 91 of the plurality of energy storage apparatuses 102 is turned off.

As shown in FIG. 15, in the energy storage apparatus 102B, for example, when power is turned on by a user pressing a power supply button (S201), the self-diagnosis is performed (S202), and when it is determined that the standby is completed, the control signal becomes the ON signal. However, in the energy storage apparatus 102B, the external output signal output from the energy storage apparatus 102A is input as the external input signal, and the external output signal is the OFF signal. Therefore, in the energy storage apparatus 1B, the switch 91 remains off.

Thereafter, when power is turned on in the energy storage apparatus 102A (S211), the self-diagnosis is performed (S212). When it is determined that the standby is completed, the control signal becomes the ON signal. However, in the energy storage apparatus 102A, the external output signal output from the energy storage apparatus 102C is input as the external input signal, and the external output signal is the OFF signal. Therefore, in the energy storage apparatus 102A, the switch 91 remains off.

Here, the energy storage apparatus 102A is the host battery. Therefore, when it is determined that the standby is completed, the energy storage apparatus 102A outputs the standby completion signal to the energy storage apparatus 102B at the subsequent stage (S213). In the energy storage apparatus 102B to which the standby completion signal is input, it is already determined that the standby is completed, and the standby completion signal is input thereto from the energy storage apparatus 102A at the preceding stage. Therefore, the energy storage apparatus 102B outputs the standby completion signal to the energy storage apparatus 102C at the subsequent stage (S214).

Thereafter, when power is turned on in the energy storage apparatus 102C (S221), the self-diagnosis is performed (S222). When it is determined that the standby is completed, the control signal becomes the ON signal. However, in the energy storage apparatus 102C, since the external output signal output from the energy storage apparatus 102B is the OFF signal, the switch 91 remains off.

Further, in the energy storage apparatus 102C, it is determined that the standby is completed, and the standby completion signal is input thereto from the energy storage apparatus 102B at the preceding stage. Therefore, the standby completion signal is output to the energy storage apparatus 102A at the subsequent stage (S223). That is, the standby completion signal is input to the energy storage apparatus 102A which is the host battery.

Therefore, in the energy storage apparatus 102A, it is determined that the standby is completed, and the standby completion signal is input thereto from the energy storage apparatus 102C at the preceding stage, and accordingly, the external output signal becomes the ON signal. As a result, the external output signal output from each of all the energy storage apparatuses 102 becomes the ON signal, and accordingly, the switches 91 of the respective energy storage apparatuses 102 are turned on in conjunction with one another (S231).

As described above, in the energy storage system 1002 according to this modified example, after it is determined that the standby is completed in all of the plurality of energy storage apparatuses 102, the supply of the charge current starts in the energy storage units 40 of all the energy storage apparatuses 1 in conjunction with one another.

Here, in general, in particular, an energy storage device such as a lithium ion secondary battery is shipped in a state in which a state of charge is low (for example, about 5%) in view of ensuring safety. Further, in general, in the energy storage apparatus, since power is turned on in such a manner that the user presses the power button or the like, powers of the plurality of energy storage apparatuses may be turned on at timings which are different from one another. For these reasons, when connecting the plurality of energy storage units to the power supply or the load at the time of installation of the energy storage system, and the like, the following problem may occur.

That is, in each of the energy storage units of the energy storage apparatus to which power is first turned on, a very large current (overcurrent) will flow, which corresponds to the total amount of the charge currents to be supplied to the other energy storage units. Therefore, the malfunction due to the overcurrent may occur.

In contrast, according to this modified example, when permission is given to turn on the switch 91 after turning on power of the controller 290 in the host battery (the energy storage apparatus 102A in this modified example), the signal for turning on the switch 91 is input as the external input signal. As a result, the switches 91 provided in the respective charge or discharge current paths are turned on all at once. Therefore, the respective energy storage units 40 are connected to the power system all at once. Therefore, it is possible to reduce the occurrence of the malfunction of the energy storage unit 40 at the time of maintenance or initial setting.

Specifically, in the host battery, when permission is given to turn on the switch 91 after turning on power of the controller 290, the external output signal for turning on the switches 91 of the other controllers 290 is output from the external output terminal 84.

As a result, until permission is given to turn on the switch 91 in the host battery, the switches 91 of the target batteries (the energy storage apparatuses 102B and 102C in this modified example) are not turned on and enter a standby state. Therefore, a predetermined configuration is adopted in which the controller 290 of this configuration is provided so as to correspond to each of the plurality of energy storage units 40 connected in parallel to one another, and the external output terminal 84 of one controller 290 is sequentially connected to the external input terminal 83 of the other controller 290, whereby all the energy storage units 40 are connected to the power supply 2000 or the load 3000 in conjunction with one another after power is turned on, and therefore, it is possible to reduce the occurrence of the malfunction of the energy storage unit 400.

(Second Modified Example of First Embodiment)

Hereinafter, an energy storage system according to a second modified example of the first embodiment will be described. The energy storage system according to this modified example has a normal mode and a test mode as selectable modes of the energy storage apparatus.

Figure 16:
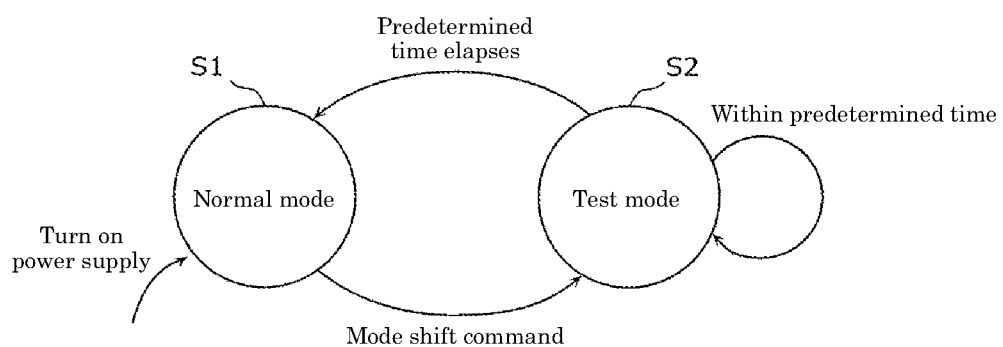
FIG. 16 is a state transition diagram relating to operation modes of an energy storage apparatus according to a second modified example of the first embodiment.

FIG. 16 is a state transition diagram relating to such operation modes of the energy storage apparatus according to this modified example.

The normal mode S1 shown in FIG. 16 is a mode for performing the operations described in the first embodiment. That is, the normal mode S1 is a mode, in which each of the switches 91 is turned off when at least one of the control signal and the external input signal is the OFF signal, or the switch 91 is turned on when both of the control signal and the external input signal are the ON signals, and further, the external output signal becomes the ON signal when the switch 91 is turned on, and the external output signal becomes the OFF signal when the switch 91 is turned off. In other words, the normal mode S1 is a mode in which the switches 91 of the plurality of energy storage apparatuses are turned on or off in conjunction with one another.

Meanwhile, the test mode S2 is a mode, in which the switch 91 is turned on, and the switch 91 of the subject energy storage apparatus is turned on even when the switches 91 of the other energy storage apparatuses are turned off.

For example, when a mode shift command instructing a shift to the test mode S2 is input from the user, the energy storage apparatus according to this modified example shifts from the normal mode S1 to the test mode S2. In the test mode S2, the switch 91 is turned on continuously for a predetermined time (for example, one minute). Thereafter, when the predetermined time elapses in the test mode S2, the energy storage apparatus shifts from the test mode S2 to the normal mode S1. Note that the normal mode S1 and the test mode S2 do not need to shift from each other. In that case, for example, the power storage device operates in the test mode S2 when the test mode command is input at the time of turning on power, and operates in the normal mode S1 when the command is not yet input.

Figure 17:
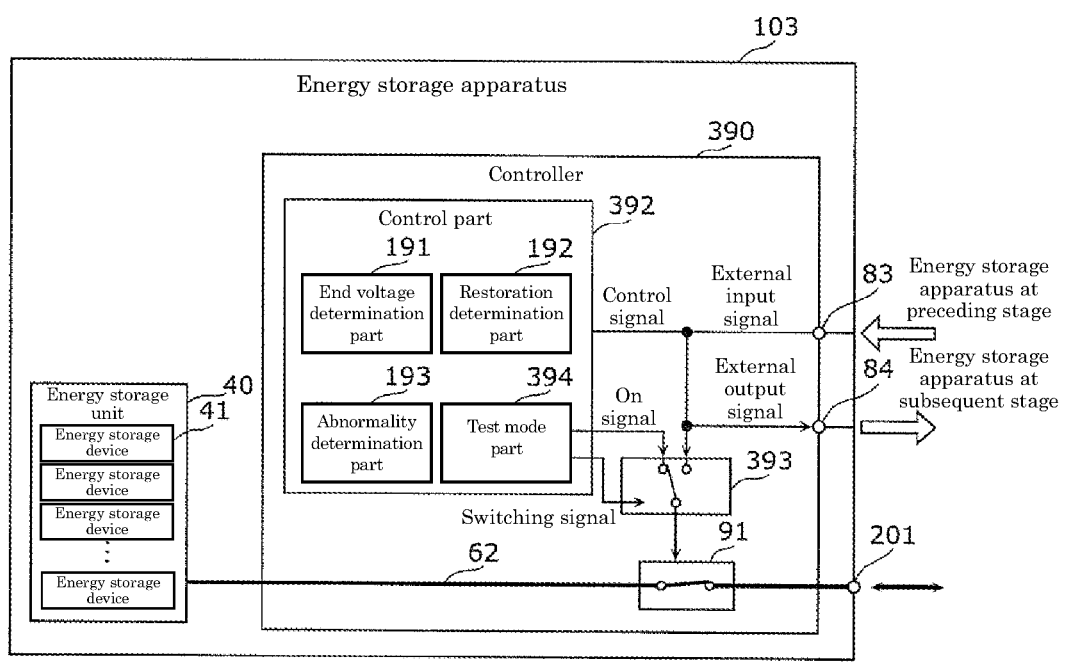
FIG. 17 is a block diagram showing a functional configuration of a controller according to the second modified example of the first embodiment.

FIG. 17 is a block diagram showing a functional configuration of a controller 390 according to this modified example. Note that, FIG. 17 also shows the energy storage unit 40, and shows an energy storage apparatus 103 according to this modified example.

As compared with the controller 90 in the first embodiment, the controller 390 shown in FIG. 17 includes a control part 392 in place of the control part 92, and further includes a switch 393.

As compared with the control part 92 in the first embodiment, the control part 392 further includes a test mode part 394. The test mode part 394 outputs an ON signal for turning on the switch 91 when the subject energy storage apparatus 103 enters the test mode S2. That is, in this modified example, when any one of the one or more energy storage units 40 enters the test mode S2, the switch 91 provided in the charge or discharge current path of each of the energy storage units 40 which have entered the test mode S2 is turned on.

Also in the energy storage system including the energy storage apparatus 103 according to this modified example configured as described above, similar effects to those of the first embodiment are obtained.

Here, in view of ensuring safety and the like, except during charge and discharge, the voltage of the energy storage unit 40 is not output to the external connection terminal of the outer case 10 (a housing), which houses the energy storage unit 40 therein. Therefore, it is difficult to acquire the voltage of the energy storage unit 40 in advance before charge-discharge the energy storage unit 40.

On the other hand, according to this modified example, in the energy storage unit 40 in the test mode, the switch 91 is turned on, whereby the voltage of the energy storage unit 40 can be measured at the external connection terminal 201 connected to the energy storage unit 40 via the switch 91. Therefore, for example, the voltage of the energy storage unit 40 can be measured easily at the time of shipment from a factory, or the like.

Further, according to this modified example, since the shift to the normal mode S1 is made when the predetermined time elapses in the test mode S2, overdischarge due to unnecessary turning on of the switch 91 can be reduced.

Note that, in this modified example, the normal mode is described as a mode for performing the operations described in the first embodiment. However, the normal mode may be a mode in which any operation is performed, and for example, may be a mode in which the operation (the standby operation) described in the first modified example of the first embodiment is performed.

Moreover, a first mode after power is turned on may be the test mode. With such a configuration, it is possible to easily measure the voltage of the energy storage unit 40, at the external connection terminal 201, for a predetermined period of time after power is turned on.

(Third Modified Example of First Embodiment)

Figure 18:
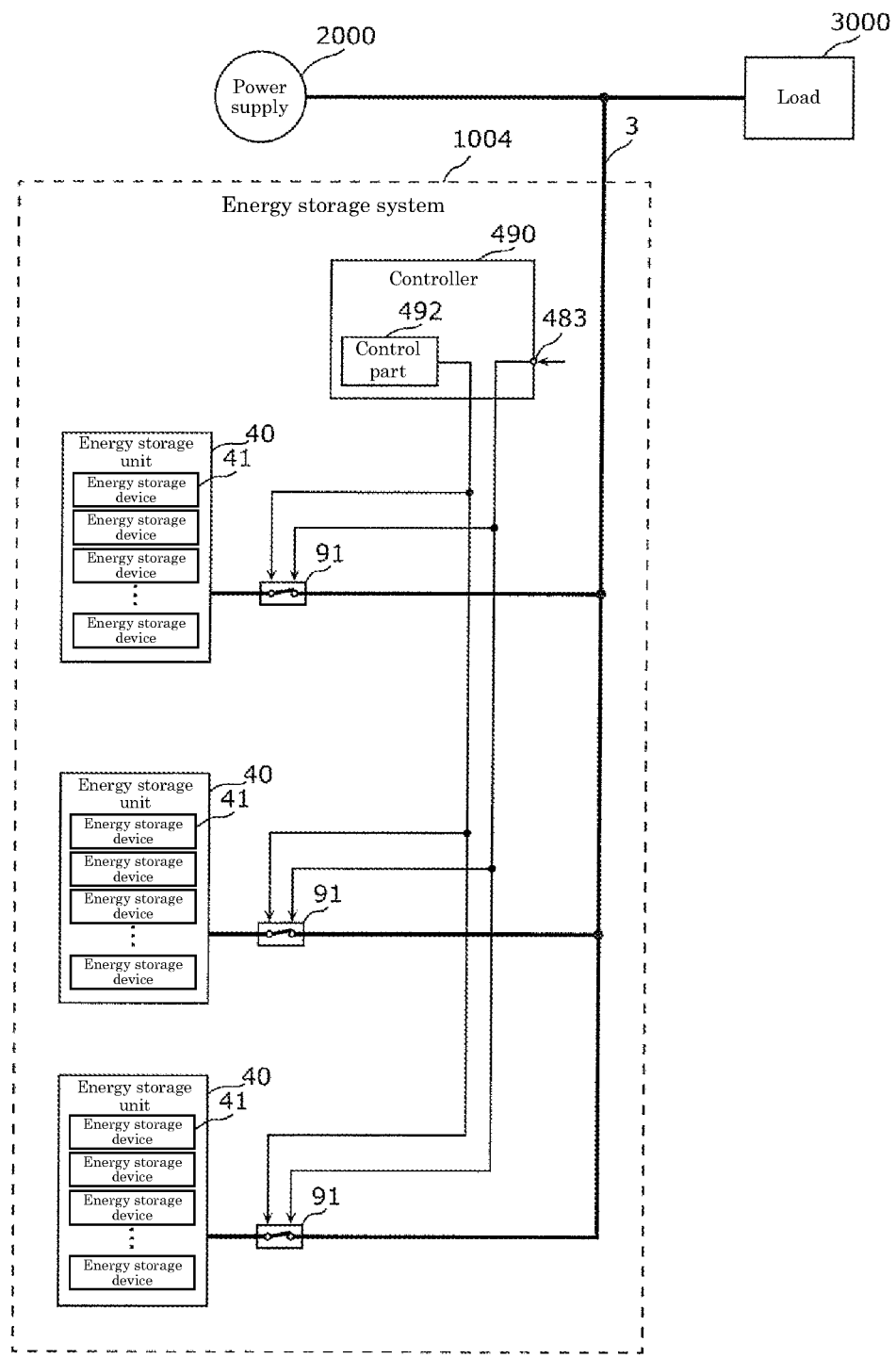
FIG. 18 is a block diagram showing a functional configuration of an energy storage system according to a third modified example of the first embodiment.

In the first embodiment and the first and second modified examples thereof, it is assumed that the controller is provided for each of the one or more energy storage units 40. That is, it is assumed that each of the plurality of energy storage apparatuses includes the controller. However, as shown in FIG. 18, one controller 490 may be provided for the one or more energy storage units 40. That is, the controller may be provided as an external device of the plurality of energy storage apparatuses.

FIG. 18 is a block diagram showing a functional configuration of an energy storage system 1004 according to this modified example. As shown in FIG. 18, the controller 490 may include: a control part 492 that supplies the control signal to the switch 91 provided in the charge or discharge current path of each of the one or more energy storage units 40; and an external input terminal 483 that supplies the external input signal to the switch 91.

Even with such a configuration, the respective switches 91 are turned off all at once by the external input signal, or are turned on all at once by the external input signal. Therefore, similarly to the above-described embodiment, it is possible to reduce the occurrence of the malfunction of the energy storage unit 40 due to the overcurrent.

Second Embodiment

Next, a configuration of an energy storage system according to a second embodiment will be described with reference to FIG. 19.

Figure 19:
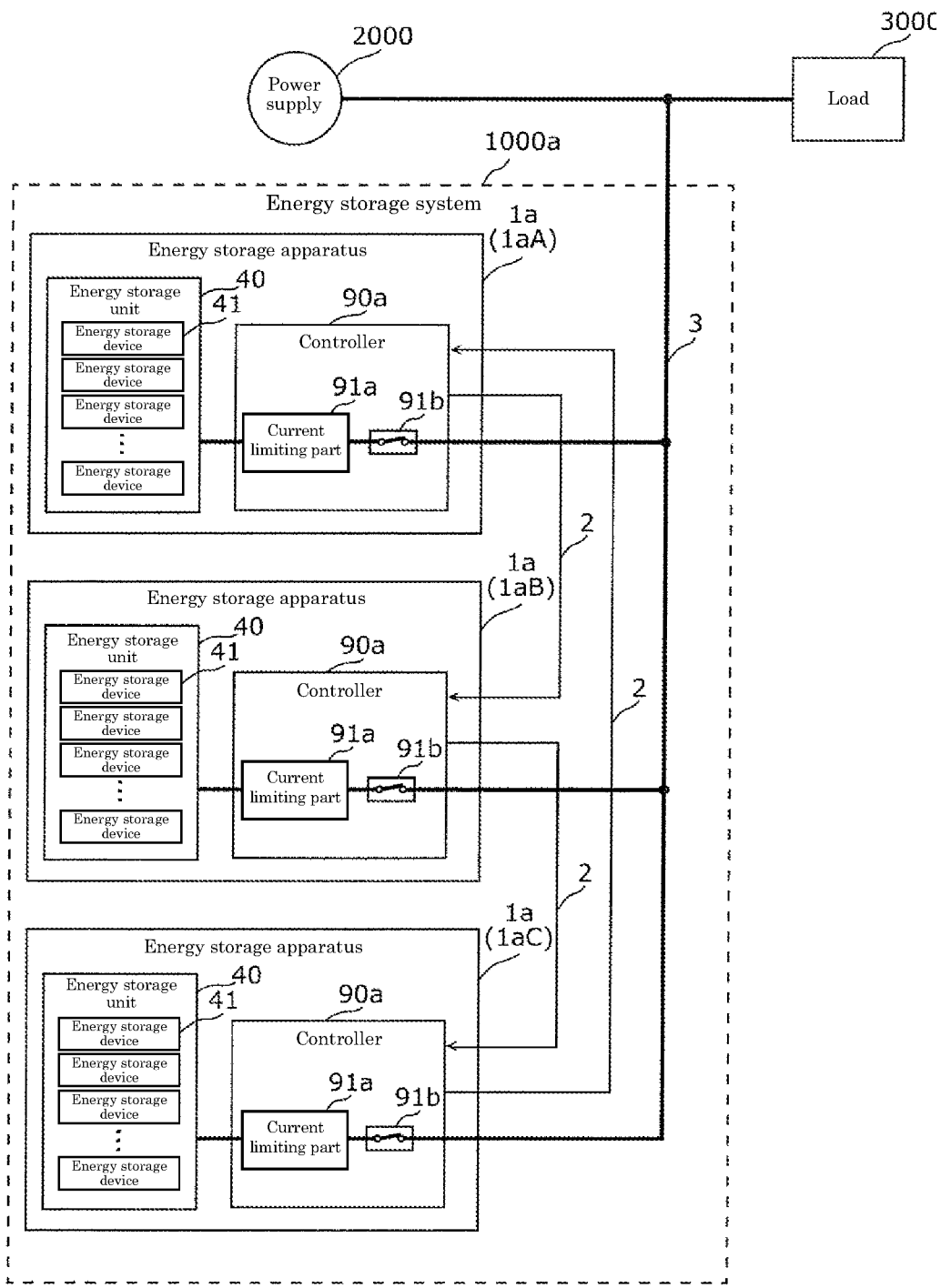
FIG. 19 is a block diagram showing a functional configuration of an energy storage system according to a second embodiment.

FIG. 19 is a block diagram showing a functional configuration of an energy storage system 1000a according to this embodiment.

Figure 2:
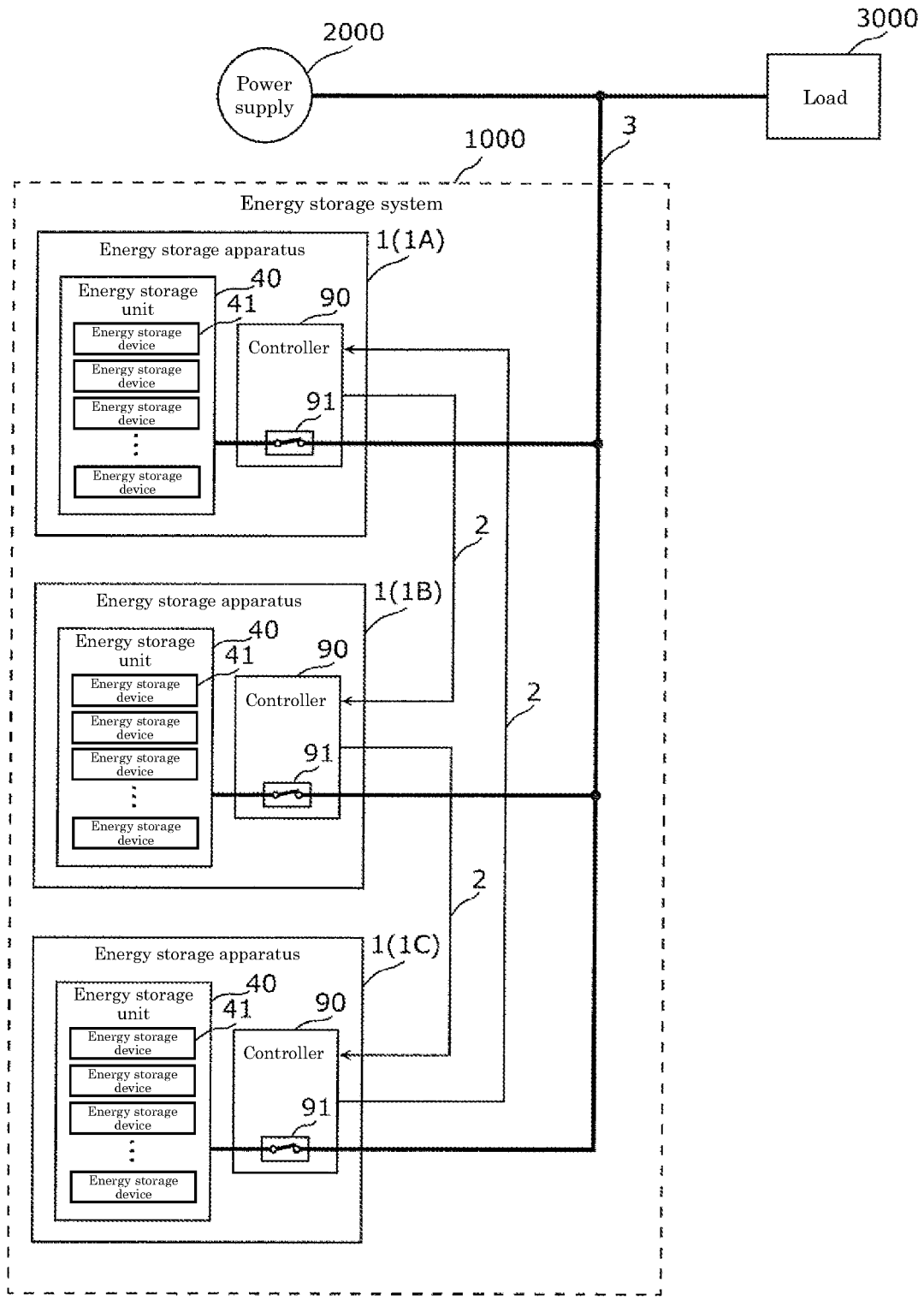
FIG. 2 is a block diagram showing a functional configuration of the energy storage system according to the first embodiment.

As compared with the energy storage system 1000 shown in FIG. 2, the energy storage system 1000a includes energy storage apparatuses 1a each of which includes a controller 90a, in place of the energy storage apparatuses 1 each of which includes the controller 90. In the energy storage system 1000a, a plurality of (three in this embodiment) energy storage devices 41 (each including a plurality of energy storage units 40 in this embodiment) are provided in parallel to one another.

The controller 90a is provided in the charge or discharge current path of the energy storage unit 40, and controls charge or discharge of one or more energy storage devices 41 which constitute the energy storage unit 40. The controller 90a includes a current limiting part 91a provided in the current path, and a current is limited by the current limiting part 91a, whereby it is possible to suppress an excessive cross current when the plurality of energy storage devices 41 are connected in parallel to one another. Hereinafter, in this embodiment, an example will be described in which the controller 90a suppresses, as the cross flow, an excessive charge current at the time of precharge.

Further, in this embodiment, the controller 90a further includes a switch 91b provided in series with the current limiting part 91a in the current path. In this embodiment, the controller 90a turns on and off the switch 91b at the time of normal use after the precharge, thereby controlling charge and discharge of the energy storage unit 40. That is, as compared with the controller 90 according to the first embodiment, the controller 90a according to this embodiment further includes the current limiting part 91a, which is provided in the current path and limits a current passing therethrough.

Next, a detailed configuration of the controller 90a will be described.

Figure 20:
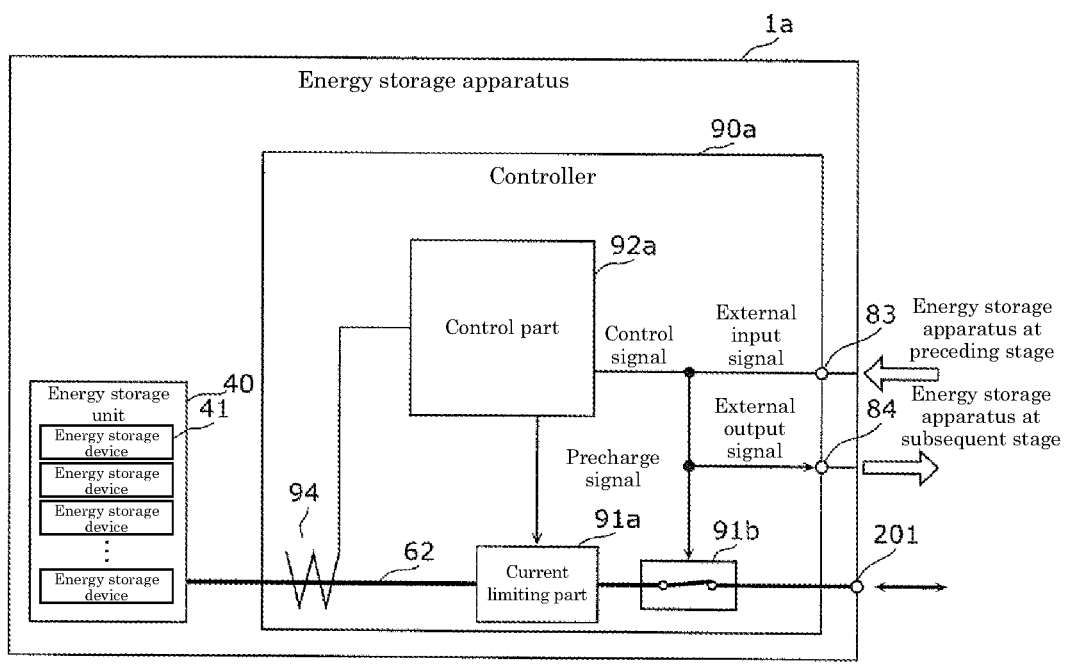
FIG. 20 is a block diagram showing an example of a functional configuration of a controller according to the second embodiment.

FIG. 20 is a block diagram showing a functional configuration of the controller 90a according to this embodiment. Note that FIGS. 20 and 21 also illustrate the energy storage unit 40.

As shown in FIG. 20, the controller 90a includes the current limiting part 91a, the switch 91b, a control part 92a, a current sensor 94, the external input terminal 83, and the external output terminal 84.

The current limiting part 91a is provided in the charge or discharge current path of the energy storage device 41, and limits the current passing therethrough. In this embodiment, the current limiting part 91a is provided on the charge-discharge current path for the energy storage unit 40, which is the power supply line 62 connected to the power supply line 3 via the external connection terminal 201. A specific configuration of the current limiting part 91a will be described later together with a specific configuration of the switch 91b with reference to FIG. 21.

The switch 91b is a switch provided in series with the current limiting part 91a in the charge or discharge current path (the power supply line 62 in this case) of the energy storage devices 41. The switch 91b is a switch that is switched between on and off. The switch 91b has at least one of an OFF function to turn off the switch 91b when at least one of the control signal and the external input signal is a signal for turning off the switch 91b and an ON function to turn on the switch 91b when both of the control signal and the external input signal are signals for turning on the switch 91b. The OFF function and the ON function are realized by, for example, a circuit configuration (see FIG. 21) around the switch 91b. A specific configuration of the switch 91b will be described later with reference to FIG. 21.

The control part 92a controls the current limiting part 91a so that the current passing through the current limiting part 91a becomes equal to or less than a predetermined amount by using an amount of the current in the charge or discharge current path (the power supply line 62 in this case) of the energy storage devices 41, the amount of the current being obtained from information different from the voltage of the charge or discharge current path. Specifically, in this embodiment, the control part 92a determines whether or not the amount of the current in the current path exceeds the predetermined amount, and controls the current passing through the current limiting part 91a to be equal to or less than the predetermined amount when the amount of the current exceeds the predetermined amount. In this embodiment, the control part 92a performs control so that the current passing through the current limiting part 91a becomes a constant current equal to or less than the predetermined amount.

Here, the predetermined amount is a predetermined arbitrary amount of the current, and is not particularly limited. However, for example, the predetermined amount is: a rated current determined by ratings of the circuit elements or the like, which constitute the energy storage apparatus 1a; a maximum current which is a maximum current that can safely be charged and discharged even if continuously flowing for a fixed time (for example, 10 sec.); an instantaneous resistance which is a maximum current that can safely be charged and discharged for a relatively short time (for example, several tens of milliseconds); or the like.

Further, the amount of the constant current is not particularly limited as long as the amount is a first amount of the current, which is equal to or less than the predetermined amount. However, for example, the amount of the constant current is the rated current described above. Moreover, a period during which the control part 92a performs the control so that the current passing through the current limiting part 91a becomes the constant current equal to or less than the predetermined amount is not particularly limited, either. However, in view of shortening a time required for precharge when the energy storage apparatus 1a is exchanged, it is preferable to ensure a long time for the period described above. Further, from a similar viewpoint, after the switch 91b is switched from OFF to ON, a second amount of the current, which is smaller than the first amount of the current, may be raised to the first amount of the current, to maintain the constant current.

Further, in this embodiment, the control part 92a further supplies the control signal to the switch 91b.

Moreover, in this embodiment, the control part 92a controls the current limiting part 91a by using the amount of the current, which is acquired by the next current sensor 94. Note that the control part 92a does not need to use the amount of the current, which is directly acquired by the current sensor 94, but may indirectly acquire the amount of the current. For example, the control part 92a may acquire or store in advance a voltage value or SOC (State Of Charge) of each of the energy storage devices 41 (or the energy storage unit 40), a resistance value of each of the energy storage devices 41, and the like, and may acquire the amount of the current by performing calculation from these values.

The current sensor 94 is a sensor that detects a charge current or a discharge current, which flows through the current path. In this embodiment, the current sensor 94 is a non-contact current sensor provided in the power supply line 62, and is, for example, an HCT (Hall-effect Current Sensor) that outputs a current signal indicating the amount of the charge current or the discharge current. That is, the control part 92a acquires the amount of the current in the current path, which is obtained by the non-contact current sensor 94, and controls the current limiting part by using the acquired amount of the current in the current path. For example, when the current sensor 94 is the HCT, the control part 92a acquires the amount of the current in the power supply line 62 from information (a current signal) indicating a magnetic field around the power supply line 62.

Note that the current sensor 94 only needs to be a sensor that indicates the amount of the current in the current path (the power supply line 62 in this embodiment) by the information different from the voltage of the current path. The current sensor 94 may be a thermoelectric ammeter that indicates the amount of the current by Joule heat of the current path. Alternatively, the current sensor 94 may be a contact current sensor such as an ammeter that indicates the amount of the current in the current path by using the amount of the current flowing through a shunt (a flow divider).

Figure 21:
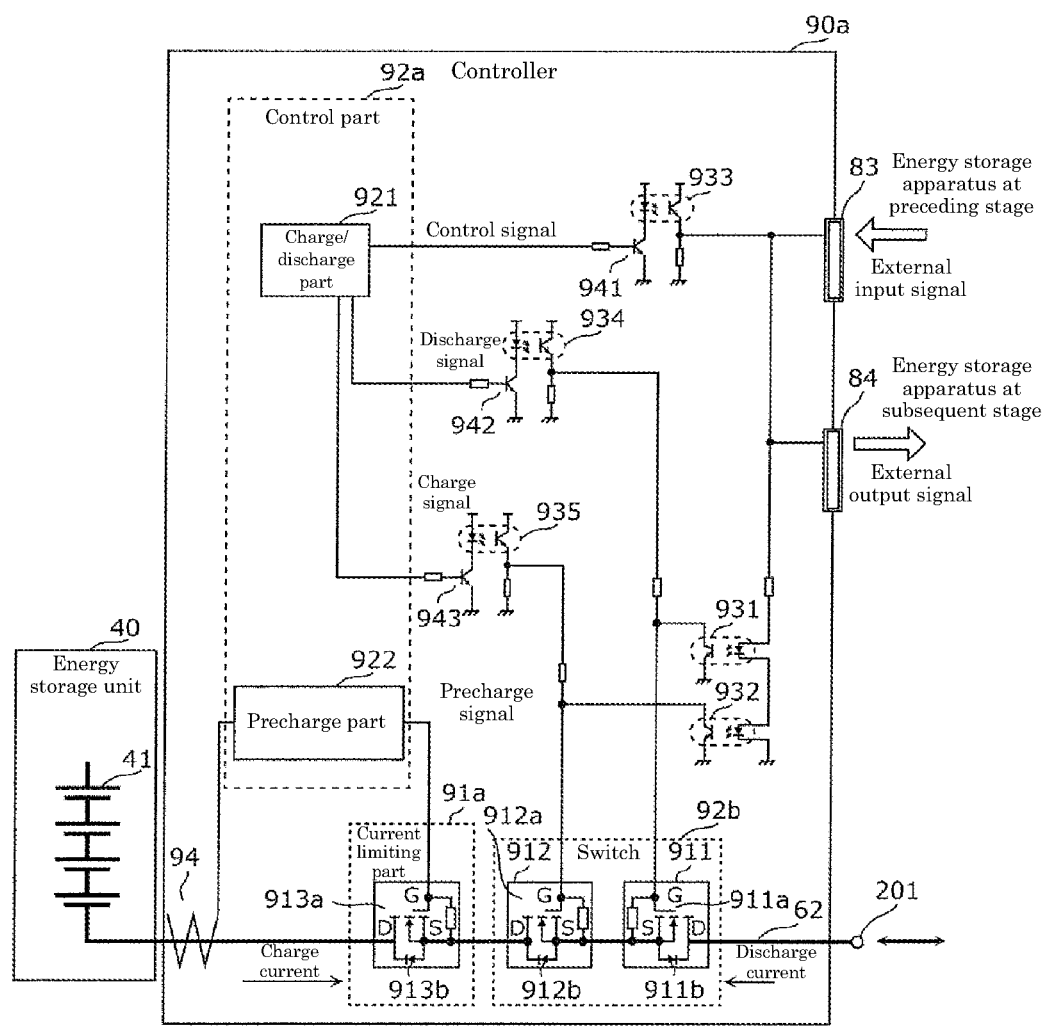
FIG. 21 is a circuit diagram showing an example of a specific circuit configuration of the controller according to the second embodiment.

Such a controller 90a is realized by a circuit configuration as shown in FIG. 21 in more detail. FIG. 21 is a circuit diagram showing an example of a specific circuit configuration of the controller 90a according to this embodiment.

As shown in FIG. 21, in this embodiment, the controller 90a further includes: photocouplers 931 to 935 for transmitting signals while ensuring insulation properties from the main circuit component side through which a large current flows; and transistors 941 to 943 for causing light emitting diodes of the photocouplers 933 to 935 to emit light. Further, the control part 92a includes: a charge-discharge part 921 that supplies a discharge signal and a power reception signal to the switch 91b in addition to the control signal; and a precharge part 922 that supplies a precharge signal to the current limiting part 91a.

Here, a specific configuration of the switch 91b and the current limiting part 91a will be described. In this embodiment, the switch 91b and the current limiting part 91a have a similar configuration to that of the switch 91 shown in FIG. 5.

As shown in FIG. 21, in this embodiment, the switch 91b includes: a discharge switch 911 for cutting off or passing the discharge current; and a charge switch 912 for cutting off or passing the charge current. The discharge switch 911 includes an n-type FET 911a and a diode 911b connected between a source and drain of the FET 911a in a direction opposite to the discharge current. The discharge switch 911 is turned off when any one of the control signal, the external input signal, and the discharge signal is an OFF signal, and is turned on when all of the signals are ON signals. The charge switch 912 includes an n-type FET 912a and a diode 912b connected between a source and drain of the FET 912a in a direction opposite to the charge current. The charge switch 912 is turned off when any one of the control signal, the external input signal, and the charge signal is an OFF signal, and is turned on when all of the signals are ON signals. Note that the "ON signal" refers to a signal for turning on the switch, and the "OFF signal" refers to a signal for turning off the switch.

Note that, in the switch 91b, the discharge switch 911 and the charge switch 912 do not need to be provided independently of each other, and the switch 91b can be configured by a relay contact or MCCB (Molded Case Circuit Breaker: wiring breaker), which can cut off or pass both of the discharge current and the charge current.

In the embodiment, the current limiting part 91a includes a semiconductor device provided on the charge or discharge current path (the power supply line 62 in this case). Specifically, in this embodiment, an FET is provided as the semiconductor device. More specifically, in this embodiment, the current limiting part 91a is configured similarly to the charge switch 912, and includes an n-type FET 913a and a diode 913b connected between a source and drain of the FET 913a in the direction opposite to the charge current. That is, in this embodiment, the current limiting part 91a limits the current, which passes through the current path, by using a circuit configuration that can be configured as a switch that is switched between ON (conductive state) and OFF (non-conductive state). Note that the FETs 911a to 913a may be p-type FETs.

Here, the FET 913a passes, as the charge current, a current corresponding to the precharge signal supplied to a gate thereof from the precharge part 922. In other words, the FET 913a can limit the current, which passes through the power supply line 62, to the current corresponding to the precharge signal.

Figure 22:
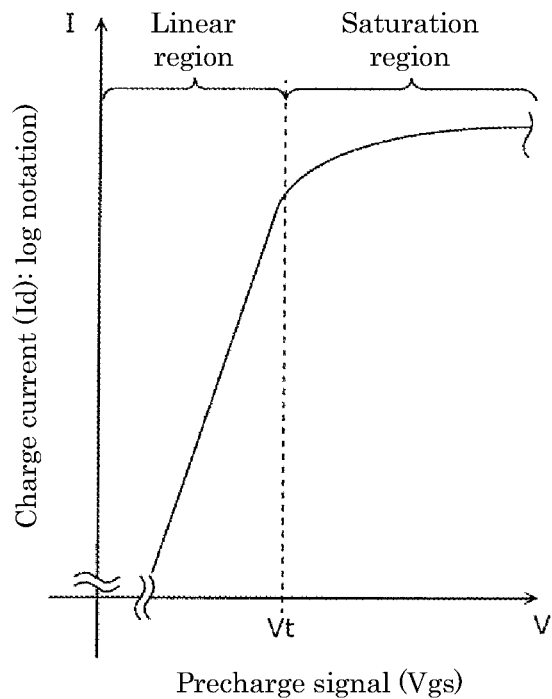
FIG. 22 is a graph showing an example of characteristics of an FET according to the second embodiment.

FIG. 22 is a graph showing an example of characteristics of the FET 913a for use in the current limiting part 91a. Specifically, FIG. 22 shows a drain current Id (that is, the charge current) of the FET 913a with respect to a gate-source voltage Vgs of the FET 913a, which is determined by the precharge signal.

As shown in FIG. 22, in a saturation region where Vgs is equal to or higher than a threshold voltage Vt, the FET 913a passes such a (saturated) charge current in which no significant change is observed even if the Vgs rises. Meanwhile, in a linear region where the Vgs is less than the threshold voltage Vt, the FET 913a passes a charge current that linearly changes in logarithmic notation in accordance with the Vgs.

That is, by operating the FET 913a in the linear region, the precharge part 922 can control the charge current, which is flown by the FET 913a, to be equal to or less than a predetermined amount. That is, the control part 92a operates a semiconductor device (the FET 913a in this case) in the linear region, thereby performing control so that the current passing through the current limiting part 91a is reduced to the predetermined amount or less.

Note that that the semiconductor device included in the current limiting part 91a only needs to have characteristics as shown in FIG. 22, and is not limited to the FET. For example, a bipolar transistor, an IGBT (Insulated Gate Bipolar Transistor), or the like may be used as the semiconductor device.

Figure 23:
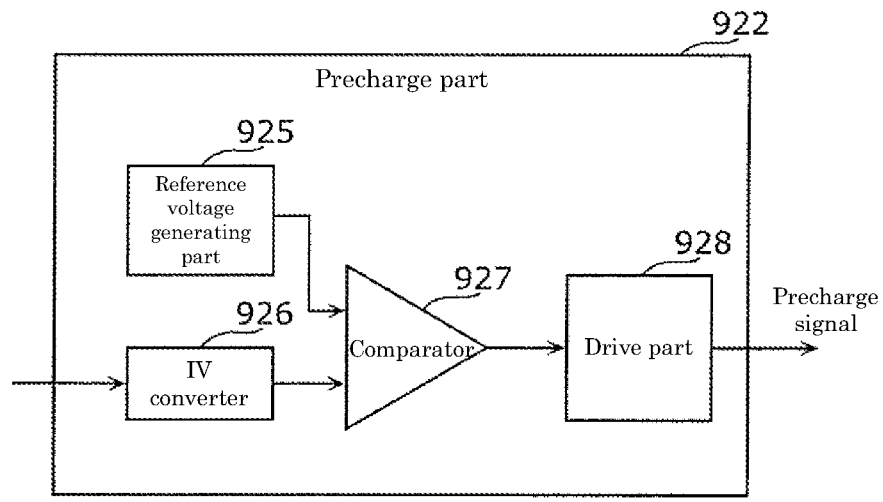
FIG. 23 is a block diagram showing an example of a functional configuration of a precharge part according to the second embodiment.

Next, a specific configuration of the precharge part 922 that performs such control will be described with reference to FIG. 23. FIG. 23 is a block diagram showing an example of a functional configuration of the precharge part 922 according to this embodiment.

As shown in FIG. 23, the precharge part 922 includes, for example, a reference voltage generating part 925, an IV converter 926, a comparator 927, and a drive part 928. The precharge part 922 outputs the precharge signal which is a voltage signal corresponding to a current signal from the current sensor 94.

In the precharge part 922, the reference voltage generating part 925 generates a reference voltage which serves as a reference for determining whether or not the amount of the current in the power supply line 62 exceeds the predetermined amount. The reference voltage generating part 925 generates a voltage, which corresponds to the current from the current sensor 94, for example, when the current passing through the current path (the power supply line 62 in this case) is the predetermined amount, as the reference voltage. The reference voltage generating part 925 generates the voltage, which corresponds to the current signal, for example, by resistance-dividing the power supply of the control part 92a.

The IV converter 926 performs IV conversion (current-voltage conversion) for the current signal from the current sensor 94, thereby generating a voltage signal corresponding to the current signal. That is, when the current signal fluctuates, the voltage signal fluctuates similarly.

The comparator 927 compares the reference voltage, which is generated by the reference voltage generating part 925, and the voltage signal, which is generated by the IV converter 926, with each other, and generates a voltage signal corresponding to a differential voltage between the reference voltage and the voltage signal. For example, when a difference obtained by subtracting the reference voltage from the voltage signal is larger than 0, the comparator 927 outputs a positive voltage whose absolute value increases as the difference becomes larger. Meanwhile, when the difference is 0 or less, the comparator 927 outputs a negative voltage whose absolute value decreases as the difference becomes larger.

The drive part 928 converts the voltage signal, which is output from the comparator 927, into a voltage signal having a large driving capability, thereby generating a precharge signal for controlling the current limiting part 91$a$. For example, the drive part 928 includes: a photocoupler that transmits a signal while ensuring insulation properties from the current limiting part 91$a$ through which a large current flows; and a transistor that amplifies the voltage signal output from the comparator 927, and causes a light emitting diode of the photocoupler to emit light.

For example, when the current passing through the power supply line 62 exceeds the predetermined amount, the precharge part 922 configured in this way lowers the voltage of the precharge signal, thus making it possible to perform control so that the current passing through the current limiting part 91$a$ becomes less than the predetermined amount. More specifically, in this embodiment, in that case, the precharge part 922 lowers the voltage of the precharge signal and operates the FET 913$a$ in the linear region, thus making it possible to suppress the current to the predetermined amount or less.

In addition, the precharge part 922 can change the voltage of the precharge signal in accordance with the fluctuation of the current signal from the current sensor 94. That is, the precharge part 922 can adjust the current, which passes through the power supply line 62, by feedback control. Therefore, the precharge part 922 can perform control so that the current passing through the current limiting part 91$a$ becomes a constant current of the predetermined amount or less.

The controller 90$a$ configured as described above operates as follows.

Hereinafter, a description will be made of operations (a control method) of the controller 90$a$ when the energy storage devices 41 are exchanged or added in the energy storage system 1000$a$ in which a plurality of (in this embodiment, three) the energy storage devices 41 (the plurality of energy storage units 40 in this embodiment) are connected in parallel to one another.

In addition, hereinafter, the operations of the controller 90$a$ will be described by taking as an example the case where one energy storage unit 40 (the energy storage unit 40 of the energy storage apparatus 1$a$C) among the plurality of energy storage units 40 is exchanged. However, the number of energy storage units 40 to be exchanged only needs to be smaller than the number of all the energy storage units 40, and may be two. Moreover, also in the case where the energy storage unit 40 is added, the controller 90$a$ operates similarly to the case where the energy storage unit 40 is exchanged.

Further, in this embodiment, it is assumed that the entire energy storage apparatus 1$a$ including the energy storage unit 40 is exchanged when the energy storage unit 40 is exchanged. That is, the operations of the controller 90$a$, which will be described below, are executed in the controller 90$a$ of the exchanged energy storage apparatus 1$a$. Further, in this embodiment, it is assumed that the entire energy storage system 1000$a$ is not charged/discharged when the energy storage unit 40 is exchanged. That is, for example, it is assumed that the MCCB (not shown) between the energy storage system 1000$a$ and the power supply 2000 and the MCCB (not shown) between the energy storage system 1000$a$ and the load 3000 are off.

Hereinafter, the operations of the controller 90$a$ will be described with reference to FIGS. 24 to 30.

Figure 24:
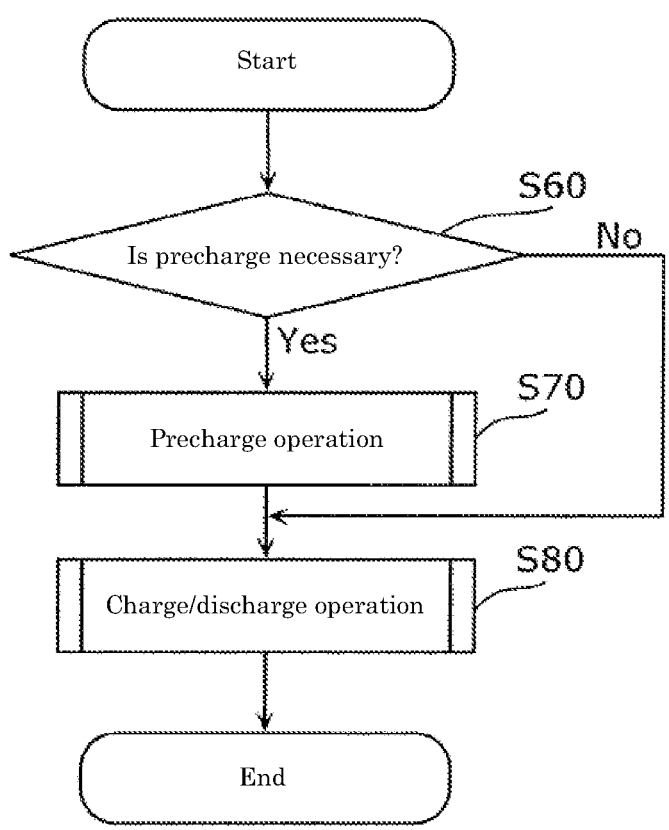
FIG. 24 is a flowchart showing operations of the controller according to the second embodiment.

FIG. 24 is a flowchart showing operations of the controller 90$a$ according to the embodiment. Specifically, FIG. 24 shows an example of the operations of the controller 90$a$ of the exchanged energy storage apparatus 1$a$.

As shown in FIG. 24, first, the controller 90$a$ of the exchanged energy storage apparatus 1$a$ (the energy storage apparatus 1$a$C in this case) determines whether or not it is necessary to precharge its own energy storage unit 40 (S60). For example, the controller 90$a$ acquires a voltage Vterm of the external connection terminal 201 and a voltage Vcell of the energy storage unit 40 via the measurement board 81 (see FIG. 3) or the like. Then, when a differential voltage |Vterm−Vcell| is larger than a set value, the controller 90$a$ determines that precharge is necessary (Yes in S60). Meanwhile, when the differential voltage |Vterm−Vcell| is equal to or less than the set value, the controller 90$a$ determines that precharge is unnecessary (No in S60).

Here, the set value is a predetermined arbitrary voltage, and is not particularly limited. For example, the set value is a differential voltage between the voltage of the external connection terminal 201 and the voltage of the energy storage unit 40 when a minimum cross current at which a malfunction may occur in the energy storage device 41 flows therethrough.

Figure 25:
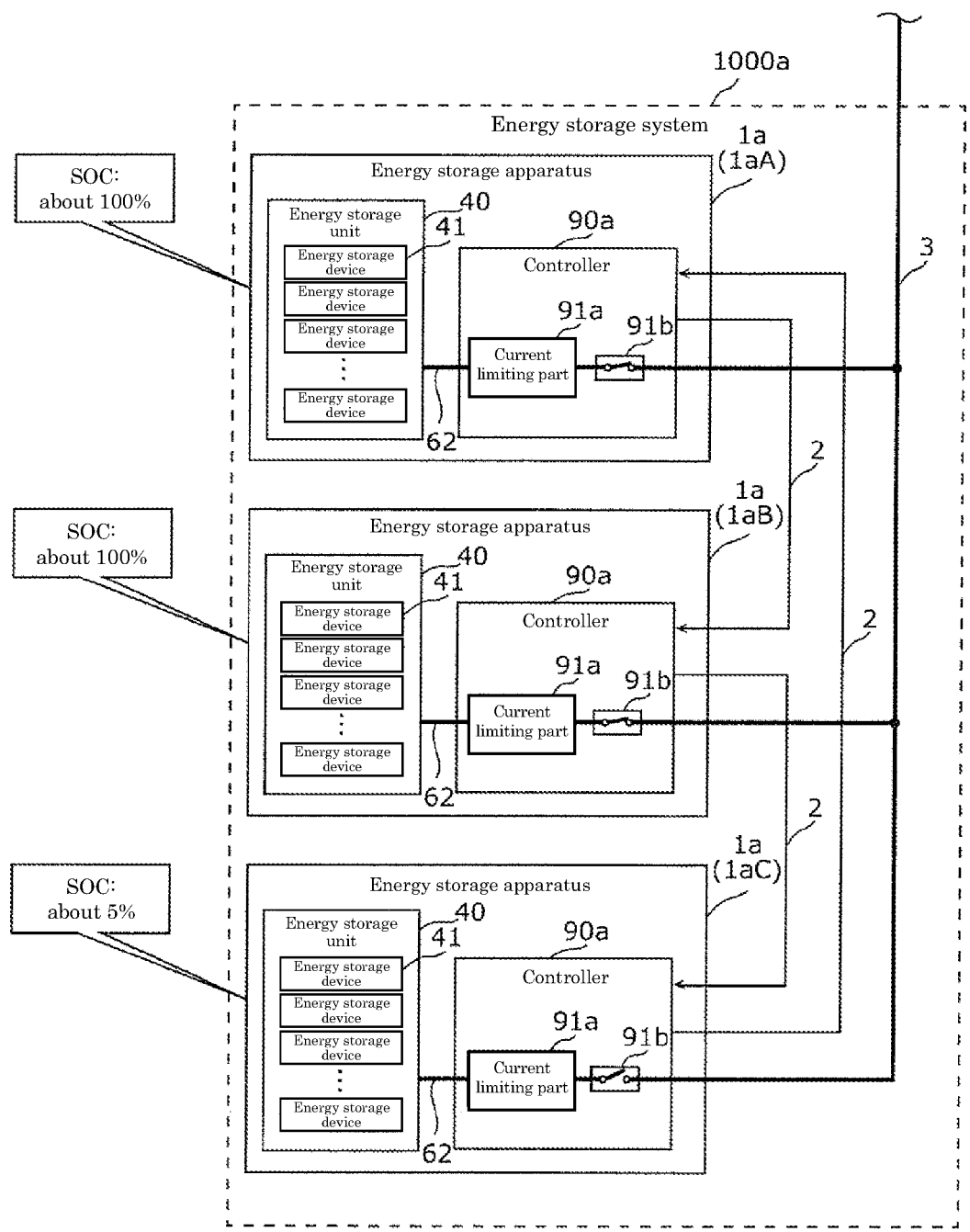
FIG. 25 is a diagram schematically showing a state of the energy storage system before precharge in the second embodiment.

FIG. 25 is a diagram schematically showing a state of the energy storage system 1000$a$ when the energy storage apparatus 1$a$C is exchanged.

As shown in FIG. 25, when the energy storage apparatus 1$a$C is exchanged, the switch 91$b$ of the energy storage apparatus 1$a$C is turned off. Further, the switches 91$b$ of the other energy storage apparatuses 1$a$A and 1$a$B are turned on.

Here, in general, the lithium ion secondary battery is shipped in a state in which an SOC is low (for example, about 5%) in view of ensuring safety. Meanwhile, in the other energy storage apparatuses which are being used without being exchanged (in normal use), the SOC is high (for example, about 100%).

Therefore, the voltage |Vcell| of the energy storage unit 40 of the exchanged energy storage apparatus 1$a$C is small, and meanwhile, the voltage |Vcell| of the energy storage units 40 of the other energy storage apparatuses 1$a$A and 1$a$B which are not exchanged is large. Here, since the switches 91$b$ are on in the energy storage apparatuses 1$a$A and 1$a$B, the voltage |Vterm| of the energy storage apparatuses 1$a$A, 1$a$B is equivalent to the voltage |Vcell| of the energy storage apparatuses 1$a$A and 1$a$B. Therefore, the voltage |Vterm| of the energy storage apparatus 1$a$C connected in parallel to the energy storage apparatuses 1$a$A and 1$a$B is equivalent to the voltage |Vcell| of the energy storage apparatuses 1$a$A and 1$a$B. Therefore, in the energy storage apparatus 1$a$C, since |Vterm−Vcell| becomes larger than the set value, it is determined that precharge is necessary.

When it is determined that precharge is necessary (Yes in S60), the controller 90$a$ performs a precharge operation (S70). Meanwhile, when it is determined that precharge is unnecessary (No in S60), the controller 90a performs the charge-discharge operation without performing the precharge operation (S80).

Here, the precharge operation (S70) of the controller 90a will be specifically described. Note that the charge-discharge operation (S80) of the controller 90a will be described later.

Figure 26:
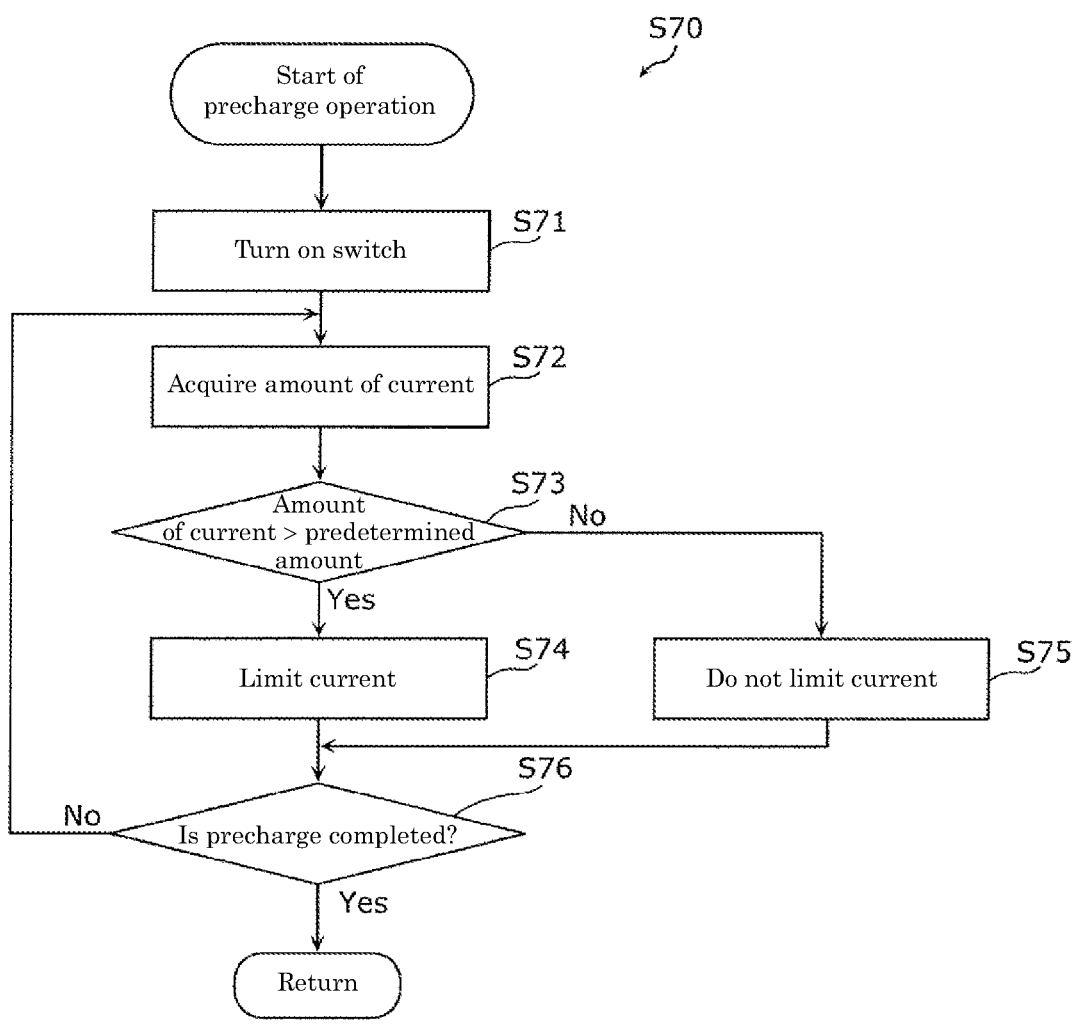
FIG. 26 is a flowchart showing a specific example of a precharge operation in FIG. 24.

FIG. 26 is a flowchart showing a specific example of the precharge operation (S70) in FIG. 24. Specifically, FIG. 26 shows an example of operations of the controller 90a in the precharge operation (S70).

As shown in FIG. 26, first, the controller 90a of the energy storage apparatus 1aC turns on the switch 91b (S71).

Figure 27:
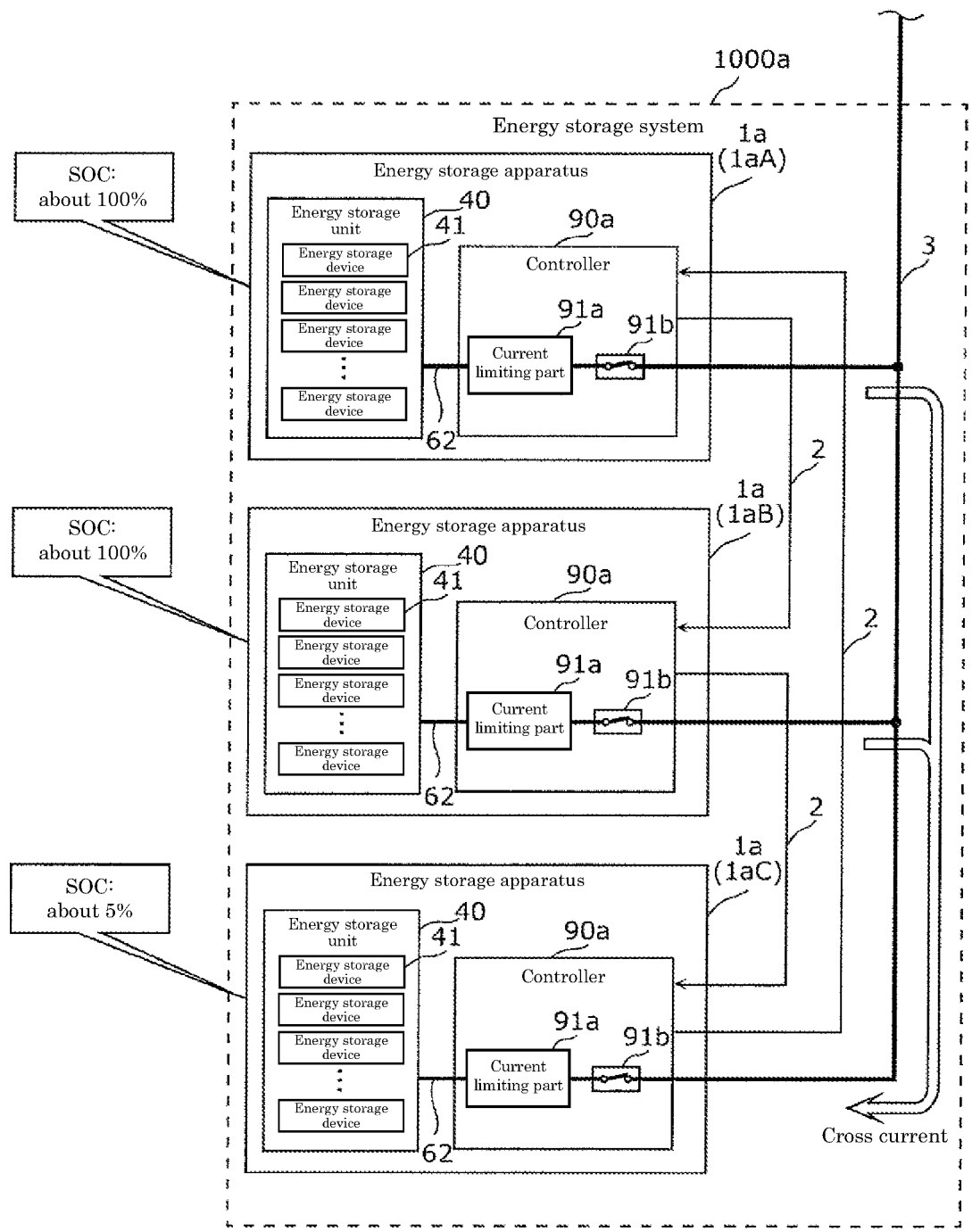
FIG. 27 is a diagram schematically showing a state of the energy storage system during the precharge in the second embodiment.

FIG. 27 is a diagram schematically showing a state of the energy storage system 1000a during the precharge in this embodiment. Specifically, FIG. 27 schematically shows a state of the energy storage system 1000a when the switch 91b of the exchanged energy storage apparatus 1aC is switched from off to on.

Note that, in FIG. 27, in order to facilitate intuitive understanding, a current flow when the controller 90a is provided in the positive power supply line 61 of the energy storage unit 40 is shown as a flowing direction of the cross current (the charge current). Therefore, in FIG. 27, the flowing direction of the charge current is opposite to that in FIG. 21. Likewise, in subsequent similar schematic diagrams, the flowing direction of the discharge current is also opposite to that in FIG. 21.

As shown in FIG. 27, the switch 91b of the energy storage apparatus 1aC is turned on, whereby the cross current (the charge current) flows from the other energy storage apparatuses 1aA and 1aB to the energy storage apparatus 1aC.

At this time, the controller 90a acquires the amount of the current in the current path, which is obtained from information different from the voltage of the charge or discharge current path (the power supply line 62 in this case) of the energy storage device 41 (S72). Specifically, the amount of the current in the current path is acquired by the current signal output from the current sensor 94.

Then, by using the acquired amount of the current, the controller 90a limits the current, which passes through the current path, to the predetermined amount or less. Specifically, the controller 90a determines whether or not the amount of the current in the current path (the power supply line 62 in this case) exceeds the predetermined amount (S73). That is, the controller 90a determines whether or not the cross current flowing into its own energy storage apparatus 1aC exceeds the predetermined value. In the case of determining that the amount of the current exceeds the predetermined amount as a result (Yes in S73), the controller 90a limits the current to the predetermined amount or less (S74). Specifically, the controller 90a sets the voltage of the precharge signal such that the Vgs of the FET 913a is less than the Vt in order that the current becomes the predetermined amount or less, thereby operating the FET 913a in the linear region. Meanwhile, when the amount of the current is equal to or less than the predetermined amount (No in S73), the controller 90a does not limit the current (S75) but allows passage thereof. Specifically, the controller 90a sets the voltage of the precharge signal such that the Vgs of the FET is equal to or more than the Vt, thereby operating the FET 913a in the saturation region. That is, the FET 913a is turned on (conductive state).

The processing from Step S22 to Step S25, which is as described above, is repeated until it is determined that the precharge is completed (Yes in S76). Specifically, when |Vterm−Vcell| is larger than the set value, it is determined that the precharge is not completed (No in S76), and the process returns to Step S72. Meanwhile, when |Vterm−Vcell| is equal to or less than the set value, it is determined that the precharge is completed (Yes in S76), and the precharge operation is completed.

Figure 28:
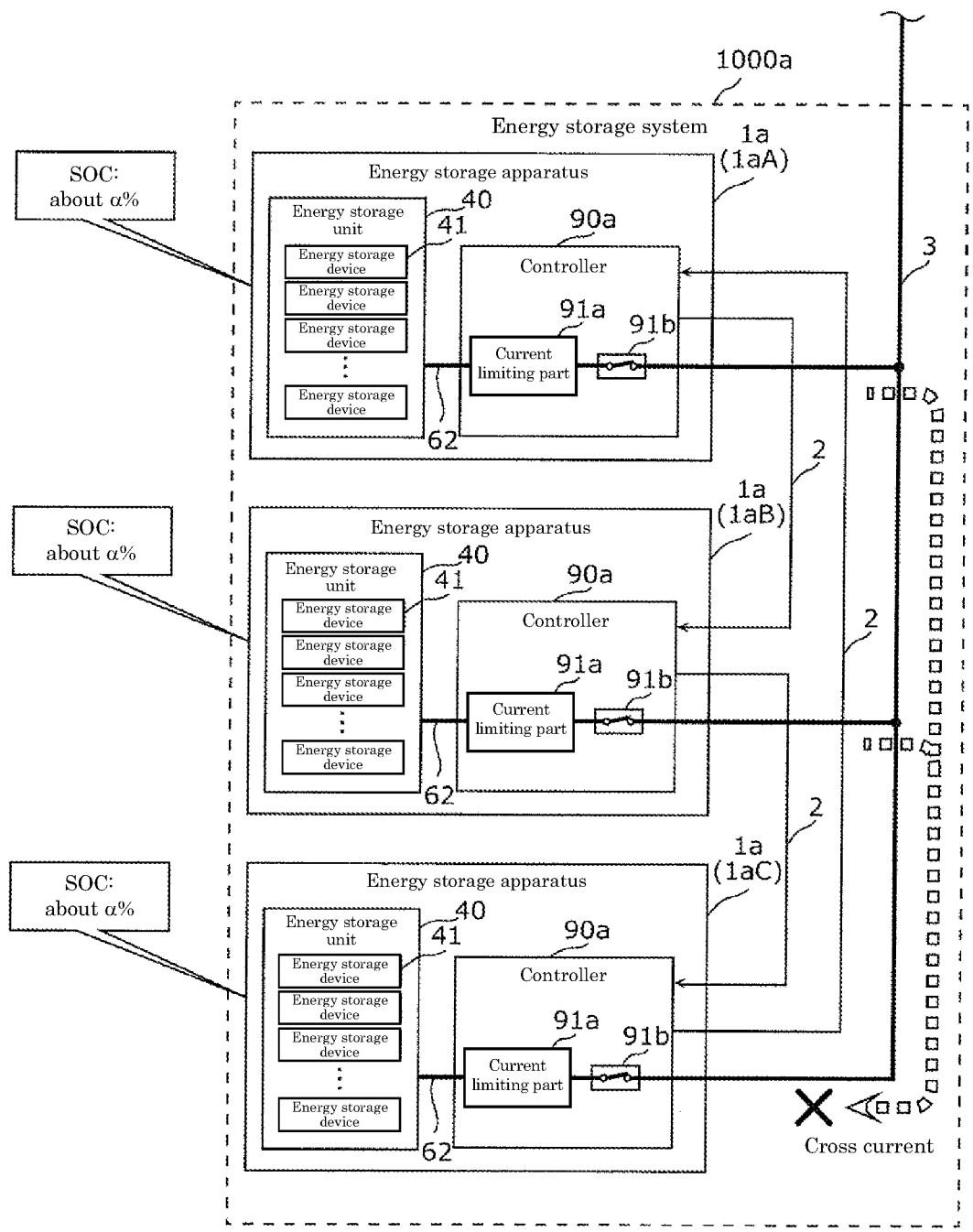
FIG. 28 is a diagram schematically showing a state of the energy storage system at the time of completion of the precharge in the second embodiment.

FIG. 28 is a diagram schematically showing a state of the energy storage system 1000a at the time when the precharge is completed in this embodiment. Specifically, FIG. 28 schematically shows a state of the energy storage system 1000a when the precharge of the exchanged energy storage apparatus 1aC is completed.

As shown in FIG. 28, when the precharge is completed, the cross current stops, and SOCs of the energy storage units 40 connected in parallel to one another are made uniform (for example, α %).

With such a precharge operation, it is possible to suppress the excessive cross current when the plurality of energy storage devices 41 (the plurality of energy storage units 40 in this case) are connected in parallel to one another.

Next, the charge-discharge operation (S80 in FIG. 24) of the controller 90a will be described.

Here, in this embodiment, it is assumed that the entire energy storage system 1000a is in a chargeable/dischargeable state at the time of the charge-discharge operation. That is, for example, it is assumed that the MCCB (not shown) between the energy storage system 1000a and the power supply 2000 and the MCCB (not shown) between the energy storage system 1000a and the load 3000 are on. In this way, for example, at the time of the power failure of the power supply 2000, the energy storage system 1000a can supply power to the load 3000.

In addition, the current limiting part 91a only needs to be in a state other than the off (non-conductive state) state, and may be turned on (conducting state). Specifically, the current limiting part 91a may limit the amount of the current to the predetermined amount or less in such a manner that the FET 913a operates in the linear region, or may be turned on in such a manner that the FET 913a operates in the saturation region. However, in view of increasing the charge current or the discharge current, it is preferable that the current limiting part 91a be turned on. For example, in the charge-discharge operation (S80 in FIG. 24), the controller 90a performs the respective pieces of processing (S10 to S30) shown in FIGS. 6A and 6B while turning on the current limiting part 91a.

By the charge-discharge operation as described above (S30), for example, the following effects are obtained. Hereinafter, effects obtained by the energy storage system 1000a at the time of the power failure of the power supply 2000 (power supply system) will be described.

Figure 29:
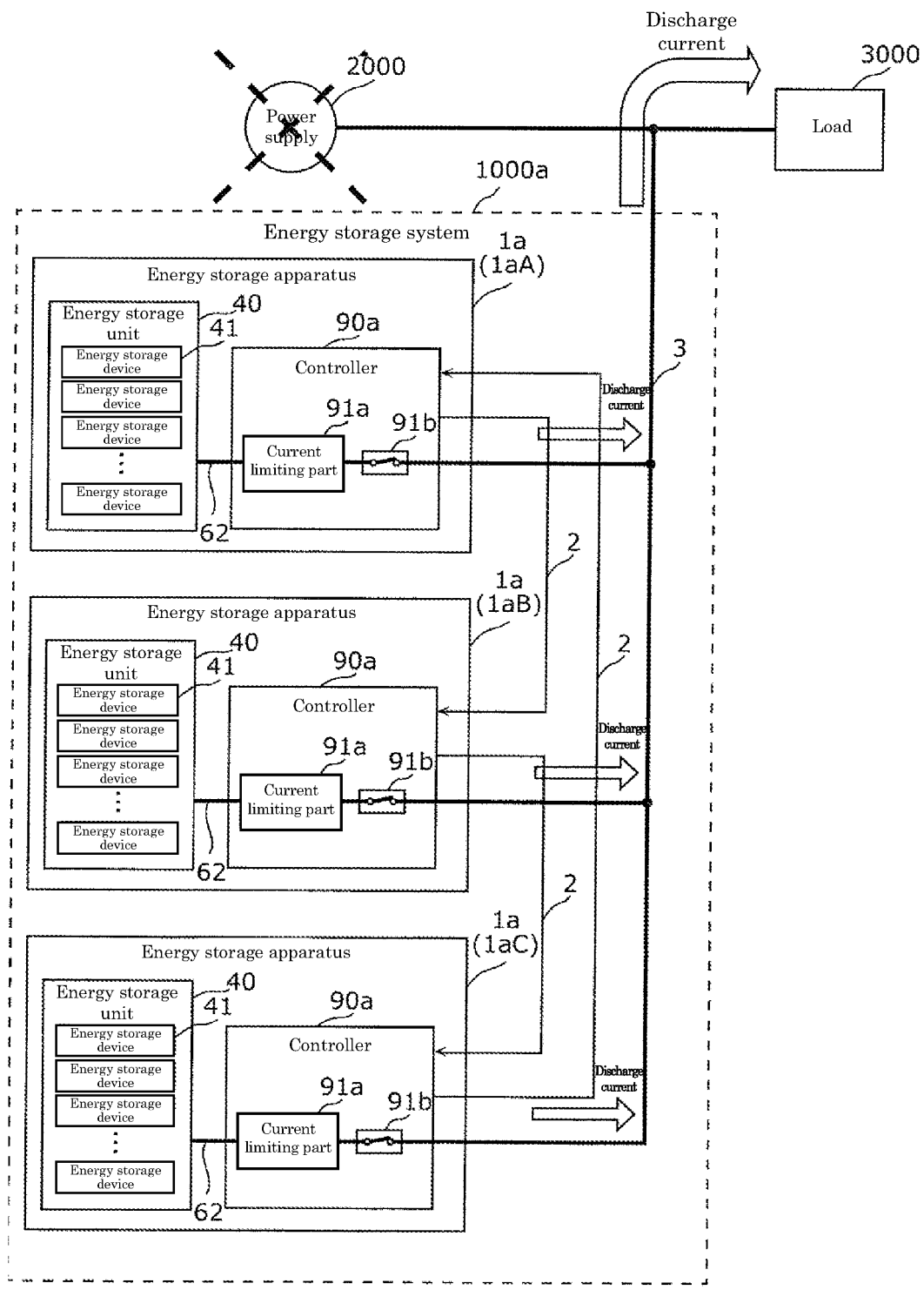
FIG. 29 is a diagram schematically showing a state of the energy storage system at the time of the power failure in the second embodiment.
Figure 30:
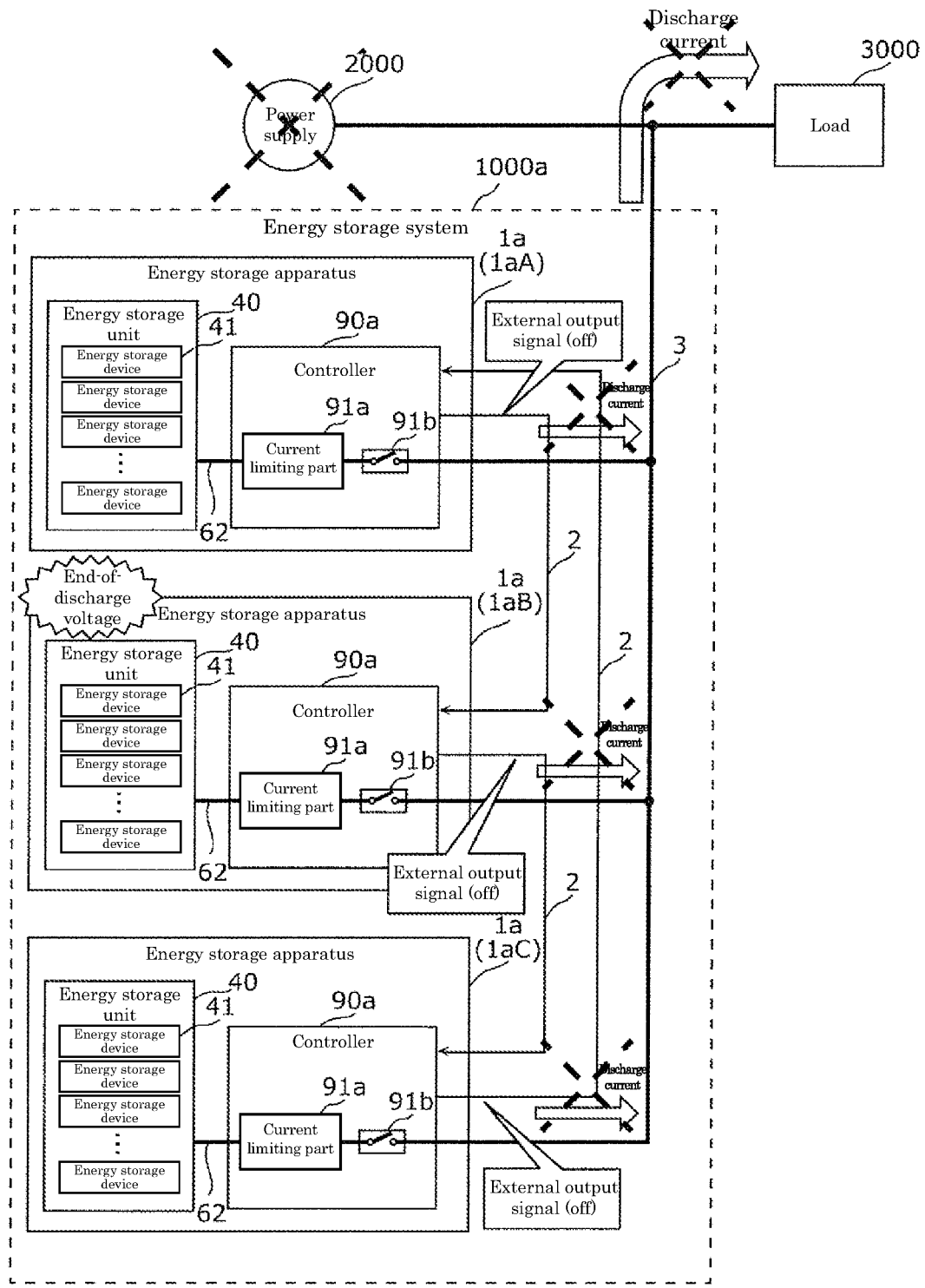
FIG. 30 is a diagram schematically showing a state of the energy storage system at the time of the power failure in the second embodiment.

FIGS. 29 and 30 are diagrams schematically showing states of the energy storage system 1000a at the time of the power failure in this embodiment.

As shown in FIG. 29, similarly to the energy storage system 1000 shown in FIG. 7, the energy storage system 1000a according to this embodiment supplies power to the load 3000 when the power supply 2000 fails. That is, the energy storage system 1000a backs up power when the power supply 2000 fails. At this time, since the switch 91b of each of the plurality of energy storage apparatuses 1a is turned on, the discharge current flows from each of the plurality of energy storage units 40, which are connected in parallel to one another, to the load 3000.

Thereafter, when the supply of power to the load 3000 continues, as shown in FIG. 30, there appears an energy storage apparatus 1 (the energy storage apparatus 1aB in this case), in which the voltage of the energy storage unit 40 becomes equal to or lower than the end-of-discharge voltage. At this time, in the controller 90a of the energy storage apparatus 1aB, the switch 91b is turned off, and in addition, the OFF signal is output as the external output signal.

As a result, the switch 91b is turned off in the controller 90a of the energy storage apparatus 1aC to which the external output signal output from the controller 90 of the energy storage apparatus 1aB is input as the external input signal. Moreover, in the controller 90a of the energy storage apparatus 1C, the OFF signal is output as the external output signal.

In this way, also in the energy storage apparatus 1aA to which the external output signal output from the energy storage apparatus 1aC is input, the switch 91b is turned off, and the OFF signal is output as the external output signal.

Therefore, similarly to the energy storage system 1000 according to the first embodiment, even in the energy storage system 1000a according to this embodiment, if there is one energy storage apparatus 1a, in which the voltage of the energy storage unit 40 is equal to or lower than the end-of-discharge voltage, among the plurality of energy storage apparatuses 1a, the discharge currents from the energy storage units 40 of all the energy storage apparatuses 1a are stopped in conjunction with one another. Therefore, according to this embodiment, similarly to the first embodiment, if there is the energy storage apparatus 1a in which the voltage of the energy storage unit 40 is equal to or lower than the end-of-discharge voltage, the discharge currents from all the energy storage apparatuses 1a are stopped in conjunction with one another.

Note that, when the power system connected to the energy storage apparatus 1a of each controller 90a is restored, each controller 90a may turn the external output signal to the ON signal or the OFF signal. As a result, the switches 91b of the energy storage system 1000a are turned on all at once or turned off all at once at the time of the power restoration. Accordingly, the respective energy storage units 40 are connected to the power system all at once or are disconnected from the power system all at once. Therefore, it is possible to reduce the occurrence of the malfunction in the energy storage unit 40 at the time of the power restoration.

Here, also when the switches 91b of the energy storage system 1000a are turned on all at once or turned off all at once (for example, when the discharge currents are stopped in conjunction with one another, when the power system is restored, and the like), the control part 92a may control the current limiting part 91a so that the current passing through the current limiting part 91a is equal to or less than the predetermined amount. That is, the controller 90a may perform the operations shown in FIG. 24 at the timing when the switches 91b of the energy storage system 1000a are turned on all at once or turned off all at once.

For example, the controller 90a of the energy storage apparatus 1a determines whether or not it is necessary to precharge its own energy storage unit 40 at the timing when its own switch 91b is turned on (specifically, immediately before being turned on) (S60). Then, in the case of determining that precharge is necessary (Yes in S60), the controller 90a performs the charge-discharge operation (S80) after turning on the switch 91b and performing the precharge operation (after S70). Meanwhile, in the case of determining that precharge is unnecessary (No in S60), the controller 90a turns on the switch 91b to perform the charge-discharge operation (S80) without performing the precharge operation.

In this way, when the switches 91b of the energy storage system 1000a are turned on all at once or turned off all at once, it is possible to suppress the cross current while suppressing the overcurrent.

Note that a reference for determining whether or not precharge is necessary is not limited to the voltage (in the above description, the differential voltage |Vterm−Vcell|), but may be a current, for example. For example, the controller 90a of the energy storage apparatus 1a may determine that precharge is necessary when the amount of the current in the current path (the power supply line 62 in this case) exceeds the predetermined amount at the timing when its own switch 91b is turned on (specifically, immediately after being turning on), and may determine that precharge is unnecessary when the amount of the current in the current path does not exceed the predetermined amount.

As described above, in this embodiment, the control is performed so that the current passing through the current limiting part 91a provided in the current path (the power supply line 62 in this embodiment) is equal to or less than the predetermined amount. Therefore, in this embodiment, it is possible to suppress the excessive cross current without providing a bypass circuit having, for example, resistors for precharge in parallel with the current path. Hence, with a simple configuration, it is possible to suppress the excessive cross current from flowing when connecting the plurality of energy storage devices in parallel to one another.

Further, in this embodiment, by using the non-contact current sensor 94, it is possible to acquire the amount of the current in the current path while suppressing a loss of the current flowing through the current path. Therefore, it is possible to increase the output of the energy storage devices 41. Further, by using the non-contact current sensor 94, it is possible to ensure insulation between the main circuit through which a large current flows and the peripheral circuit through which a small current flows.

Further, in this embodiment, the control part 92a determines whether or not the amount of the current in the current path exceeds the predetermined value, and controls the current passing through the current limiting part 91a to be equal to or less than the predetermined amount when the amount of the current exceeds the predetermined amount. In this way, it is possible to suppress excessive current restriction by the current limiting part 91a. Therefore, it is possible to shorten the time (the time required for precharge) required for equalizing the voltages of the energy storage devices 41 connected in parallel to one another.

Further, in this embodiment, by providing the switch 91b provided in series with the current limiting part 91a in the current path, the redundant design of the overcharge protection or the overdischarge protection is achieved. That is, the configuration for ensuring the safety of the energy storage devices 41 can be configured in a redundant configuration. In view of ensuring safety, such a redundant configuration is particularly effective when a lithium ion secondary battery or the like, which has a lower SOC (for example, about 5%) at the time of shipment than a lead battery, which has a high SOC (for example, about 100%) at the time of shipment, is used as each of the energy storage devices 41.

Further, in this embodiment, the current limiting part 91a has a similar configuration to that of the charge switch 912. That is, the current limiting part 91a cuts off, passes, or limits the charge current among the charge current and the discharge current. In the energy storage device 41, the overdischarge tends to cause a more severe malfunction than the overdischarge. Therefore, by making the current limiting part 91a into a configuration capable of cutting off the charge current, and the like, a redundant configuration can be made for protection against the overcharge that is likely to cause such a severe malfunction.

In addition, in this embodiment, the control part 92a controls the current passing through the current limiting part 91a so as to be a constant current, thereby shortening the time required for the precharge, for example. Specifically, the cross current, which flows between the energy storage devices 41 (the energy storage units 40 in this embodiment) connected in parallel to one another, gradually decreases as the voltage between the energy storage devices 41 becomes uniform. Therefore, for example, the voltage change in the precharged energy storage devices 41 (in this embodiment, the energy storage devices 41 of the energy storage apparatus 1aC) gradually becomes dull. In contrast, the current passing through the current limiting part 91a is controlled so as to be a constant current, whereby it is possible to constantly maintain the voltage change in the precharged energy storage devices 41 until completion of the precharge. Therefore, the time required for the precharge can be shortened.

Further, in this embodiment, the semiconductor device (the FET 913a in this embodiment) is operated in the linear region, whereby the current is controlled to be equal to or less than the predetermined amount, whereby, for example, it is not necessary to provide a dedicated resistor for the precharge. In this way, the configuration can be simplified.

In particular, in this embodiment, similarly to the current limiting part 91a, the switch 91b also includes the semiconductor devices (the FETs 911a and 912a in this embodiment). The semiconductor device is turned on when the semiconductor devices operate in the saturation region, and is turned off when the semiconductor devices operate in the cut-off region. In other words, in this embodiment, substantially the same configuration constituted by the semiconductor devices is used as the switch 91b by being operated in the saturation region and the cut-off region, and is used as the current limiting part 91a by being operated in the linear region. Therefore, it is possible to suppress the excessive cross current without using a dedicated configuration for the precharge.

In addition, in this embodiment, by using an FET (the FET 913a in this embodiment) as the semiconductor device, it is possible to suppress the excessive cross current with a simple configuration. Specifically, since the FET is a voltage controlled device, the circuit configuration on the control side can be simplified as compared with a current control-type device such as a bipolar transistor. Further, for a similar reason, it is possible to limit the current passing through the current path with a small driving current. Therefore, low power consumption of the controller 90a can be achieved.

(Modified Example of Second Embodiment)

Further, the control part may further turn off the switch 91b when the temperature of the current limiting part 91a exceeds a predetermined temperature.

Figure 31:
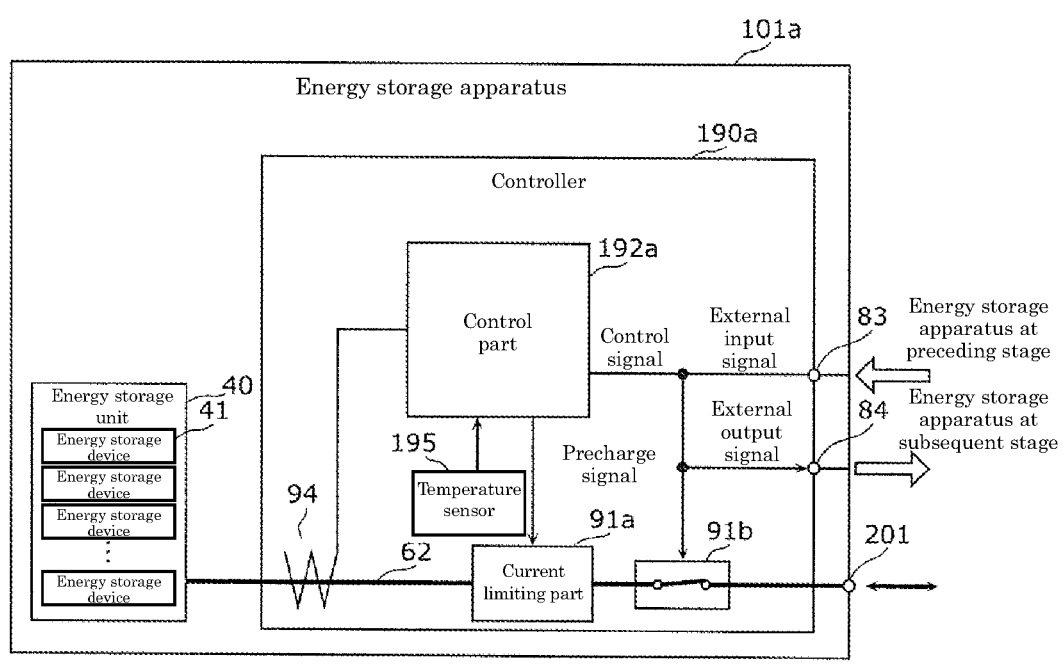
FIG. 31 is a block diagram showing an example of a functional configuration of a controller according to a modified example of the second embodiment.

FIG. 31 is a block diagram showing an example of a functional configuration of a controller 190a according to a modified example of the second embodiment. Note that FIG. 31 also illustrates the energy storage unit 40.

As shown in FIG. 31, as compared with the above-described second embodiment, energy storage apparatus 101a according to this modified example includes a controller 190a in place of the controller 90a. As compared with the second embodiment, the controller 190a includes a control part 192a in place of the control part 92a, and further includes a temperature sensor 195.

Here, when the control of the current limiting part 91a by the control part 192a is not normally performed due to some abnormality, there are problems as below. That is, with regard to the current limiting part 91a, for example, when a current flows exceeding the resistance of the FET 913a, there is a possibility that the FET 913a may be destroyed. In this case, since it is difficult for the current limiting part 91a to limit the current, the excessive cross current will flow in the energy storage unit 40, and a malfunction such as a deterioration of the energy storage device 41 may occur.

The inventors focused on the fact that the current limiting part 91a generates heat more than usual when it is difficult to limit the current by the current limiting part 91a, and obtained an idea of the controller 190a according to this modified example.

That is, in this modified example, the control part 192a turns off the switch 91b when a temperature of the current limiting part 91a exceeds a predetermined temperature. As a result, when abnormality occurs in the current limiting part 91a, it is possible to cut off the cross current, so that safety can be ensured. Here, the predetermined temperature is not particularly limited, but is, for example, a temperature of the FET 913a when minimum current at which the FET 913a is broken is flowed.

In this modified example, the control part 192a controls the current limiting part 91a by using information indicating the temperature acquired by the next temperature sensor 195.

The temperature sensor 195 is a sensor that detects the temperature of the current limiting part 91a. In this modified example, the temperature sensor 195 is, for example, a thermistor provided in the vicinity of the FET 913a of the main circuit board 82 (see FIG. 3) on which the FET 913a is mounted.

The controller 190a configured as described above operates as follows.

Figure 32:
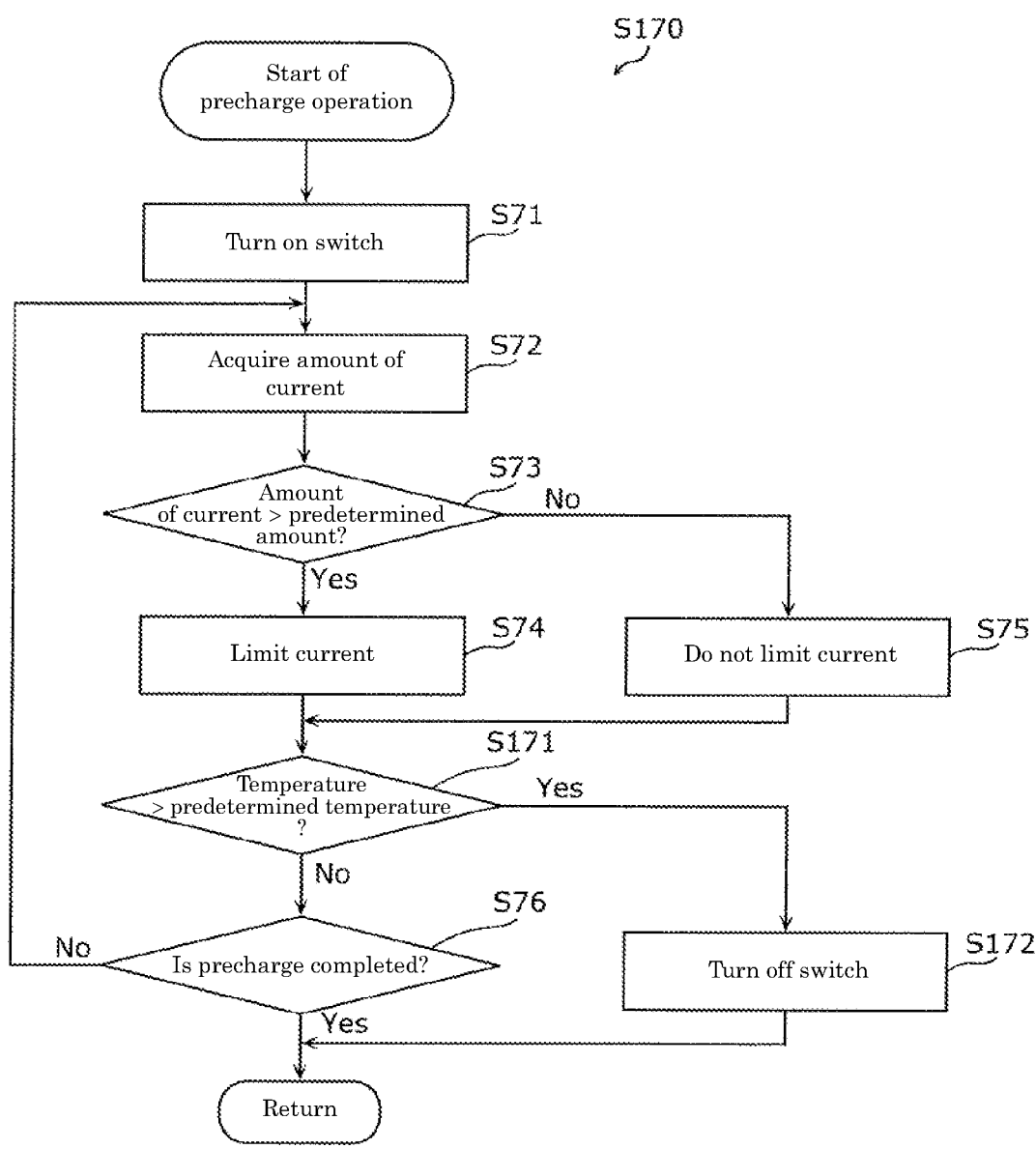
FIG. 32 is a flowchart showing operations of the controller according to the modified example of the second embodiment.

FIG. 32 is a flowchart showing operations of the controller 190a according to this modified example. Specifically, FIG. 32 shows an example of the operations of the controller 190a in the precharge operation (S170).

As shown in FIG. 32, the precharge operation (S170) in the modified example is substantially the same as the precharge operation in the second embodiment (see FIG. 26: S70), but the precharge operation in this modified example further includes temperature determination processing (S121) and processing for turning off the switch 91b (S122).

Specifically, the controller 190a determines whether or not the temperature of the current limiting part 91a exceeds the predetermined temperature in the temperature determination processing (S171) after Steps S74 and S75. Then, when the temperature of the current limiting part 91a does not exceed the predetermined temperature (No in S171), the processing proceeds to Step S76. Meanwhile, when the temperature of the current limiting part 91a exceeds the predetermined temperature (Yes in S171), the controller 190a turns off the switch (S172) to complete the precharge operation.

Also in the controller 190a according to this modified example, which is as described above, similar effects to those of the second embodiment are obtained. That is, with a simple configuration, it is possible to suppress the excessive cross current from flowing when connecting the plurality of energy storage devices 41 (the plurality of energy storage units 40 in this modified example) in parallel to one another.

Further, in this modified example, the switch 91b is turned off when the temperature of the current limiting part 91a exceeds the predetermined temperature, whereby it is possible to cut off the cross current, for example, even when abnormality occurs in the current limiting part 91a. Therefore, safety can be further ensured.

Other Embodiments

Although the energy storage systems according to the embodiments of the present invention have been described above, the present invention is not limited to the above-described embodiments and modified examples. That is, the embodiments and the modified examples, which are disclosed herein, are examples in all respects and should not be considered to be restrictive. The scope of the present invention is defined not by the description made above but by the claims, and it is intended to include all changes within the meanings and the scope, which are equivalent to the scope of claims. Further, configurations constructed by arbitrarily combining the constituent elements included in the above-described embodiments and modified examples are also included within the scope of the present invention.

Further, for example, in the above description, the energy storage system configured by the plurality of energy storage apparatuses, each of which includes the controller, has been described. However, the controller or the energy storage apparatus including the controller and the energy storage unit whose charge or discharge is controlled thereby is also incorporated within the scope of the present invention. Also in such a configuration, both of the energy storage unit and the controller may be mounted on a moving body, or only one of the energy storage unit and the controller may be mounted on the moving object. Further, in the energy storage system configured by the plurality of energy storage apparatuses, each of which includes the controller, only some of the energy storage apparatuses may be mounted on the moving object.

Further, such energy storage apparatuses as below is also incorporated within the scope of the present invention. That is, the energy storage apparatus includes: the energy storage unit 40 including the energy storage devices 41; a switch provided in the charge or discharge current path of the energy storage unit 40; a control part that supplies a control signal to the switch; and an external input terminal that supplies an external input signal to the switch. Here, the switch has at least one of an OFF function to turn off the switch when at least one of the control signal and the external input signal is a signal for turning off the switch and an ON function to turn on the switch when both of the control signal and the external input signal are signals for turning on the switch. Such an energy storage apparatus is mounted on, for example, a moving object.

Further, for example, in the first embodiment and the modified examples thereof, the description has been made on the assumption that the switch has both of the OFF function to turn off the switch when at least one of the control signal and the external input signal is a signal for turning off the switch and the ON function to turn on the switch when both of the control signal and the external input signal are signals for turning on the switch. However, the switch may be configured to satisfy only one of the OFF function and the ON function.

Even in the controller configured as described above, such switches provided in the respective charge or discharge current paths are turned off all at once by the external input signal or are turned on all at once by the external input signal. Therefore, although effects are somewhat inferior, it is possible to reduce the occurrence of the malfunction of the energy storage unit 40 due to the overcurrent similarly to the above-described embodiments.

Further, in a configuration in which an FET is used as the switch, the FET may be used for limiting the charge current or the discharge current, which flows through the charge-discharge current path.

In addition, IDs may be automatically assigned to the respective energy storage apparatuses 102 by using the configuration of the first modified example of the first embodiment. Specifically, the IDs (CAN-IDs) may be automatically assigned to the target batteries with the host battery taken as a starting point. By automatically assigning the IDs as described above, the ID only needs to be assigned only to the host battery, and accordingly, the work process related to the ID assignment can be simplified.

Further, the controller only needs to control at least one of the charge and discharge of the energy storage unit 40, and does not need to control, for example, one of the charge and the discharge. For example, in the second embodiment and the modified example thereof, the description has been made on the assumption that the control part suppresses the excessive charge current as the cross current, but the control part may suppress an excessive discharge current as the cross current.

Further, an energy storage system in which a plurality of energy storage apparatuses, each of which includes any one of the controllers described in the second embodiment and the modified example thereof, and the energy storage device 41 whose charge or discharge is controlled by the controller, are provided in parallel to one another, are also incorporated within the scope of the present invention.

With such a configuration, each of the energy storage apparatuses has the controller, whereby live wire plugging (hot swapping) of the energy storage apparatus is enabled. That is, in the second embodiment and the modified example thereof, the description has been made on the assumption that the MCCB (not shown) between the energy storage system 1000a and the power supply 2000 and the MCCB (not shown) between the energy storage system 1000a and the load 3000 are off. However, these MCCBs may be on. In this way, when some of the plurality of energy storage apparatuses are exchanged, the other energy storage apparatuses continuously charge or discharge power, and the redundant design of N+1 is achieved.

In addition, with such a configuration, since the exchanged energy storage apparatus can be precharged from the other energy storage apparatuses, an external charger becomes unnecessary, and exchange work can be facilitated.

Further, in the second embodiment and the modified example thereof, the description has been made on the assumption that the excessive cross current at the time of the precharge is suppressed. However, the cross current to be suppressed is not limited to that at the time of the precharge, but may be, for example, a cross current at the time of installation of the energy storage apparatus or the energy storage system.

In addition, the configuration of the controller, which is described in the second embodiment and the modified example thereof, can be used not only to suppress the cross current but also to suppress an excessive current during normal charge and discharge.

Further, in the second embodiment and the modified example, the controller is provided (built in) in the energy storage apparatus, but the controller may be provided outside the energy storage apparatus. In addition, one controller may be provided for a plurality of energy storage apparatuses. That is, the controller may include current limiting parts provided individually in the respective charge or discharge current paths of the plurality of energy storage devices 41 connected in parallel to one another, and a control part that controls the plurality of current limiting parts.

Further, in the second embodiment and the modified example thereof, the controller does not need to include the switch 91b. Even with such a configuration, by providing the current limiting part 91a, the excessive cross current can be suppressed. In particular, when the current limiting part 91a includes an FET, in the charge-discharge operation after the precharge, the controller can use the current limiting part 91a as a switch by operating the FET in the saturation region. In other words, the current limiting part 91a can be used for controlling the charge or the discharge during normal charge and discharge.

Further, in the second embodiment and the modified example thereof, the control part only needs to perform control so that the current passing through the current limiting part 91a becomes equal to or less than a predetermined amount, and does not need to perform control so that the current passing through the current limiting part 91a becomes a constant current.

Further, in the second embodiment and the modified example thereof, the control part does not need to determine whether or not the amount of current in the current path of the energy storage device 41 exceeds the predetermined amount. For example, the control part may perform control so that the current limiting part 91a always limits the current passing therethrough, or may perform control so that the current passing through the current limiting part 91a becomes equal to or less than the predetermined amount when a change rate of the amount of the current exceeds a predetermined change rate.

The present invention can be applied to backup power supplies for base stations and the like for mobile communication.

DESCRIPTION OF REFERENCE SIGNS 1, 1A to 1C, 1a, 1aA to 1aC, 101, 102, 102A to 102C, 103, 101a: energy storage apparatus
  2: communication line
  3: power supply line
  10: outer case
  20: bottom-side arrangement member
  40: energy storage unit
  41: energy storage device
  50: terminal-side arrangement member
  60: bus bar
  61, 62: power supply line
  70: wiring board
  81: measurement board
  82: main circuit board
  83, 483: external input terminal
  84: external output terminal
  90, 90a, 190, 190a, 290, 390, 490: controller
  91, 91b, 393, 911 to 913: switch
  91a: current limiting part
  92, 92a, 192a, 292, 392, 492: control part
  93: drive part
  94: current sensor
  100: outer case main body
  191: end voltage determination part
  192: power restoration determination part
  193: abnormality determination part
  195: temperature sensor
  200: front wall portion
  201: external connection terminal
  293: standby determination part
  300: upper wall portion
  394: test mode part
  400: energy storage unit
  911a to 913a: FET
  911b to 913b: diode
  921: charge-discharge part
  922: precharge part
  925: reference voltage generating part
  926: IV converter
  927: comparator
  928: drive part
  931 to 936: photocoupler
  941 to 944: transistor
  1000, 1000a, 1002, 1004: energy storage system
  2000: power supply
  3000: load

The invention claimed is:

1. At least two controllers that each control charge or discharge of one and another of at least two distinct energy storage units each including an energy storage device, the at least two controllers including:
  one switch provided in a charge or discharge current path of one of the energy storage units;
  a control part that supplies a control signal to the one switch;
  an external input terminal that supplies the one switch with an output input signal for turning on or off the one switch when a power system connected to the one of the energy storage units is restored; and
  an external output terminal that outputs an external output signal from one of the at least two controllers to another of the at least two controllers including another switch, wherein:
  the one switch is turned off when at least one of the control signal and the external input signal is a signal for turning off the one switch, or is turned on when both of the control signal and the external input signal are signals for turning on the one switch, and
  the external output signal for turning on the another switch is output from the external output terminal when the one switch is turned on, and the external output signal for turning off the another switch is output from the external output terminal when the one switch is turned off.

2. An energy storage system comprising:
  the at least two controllers according to claim 1; and
  at least two energy storage units whose charge or discharge is controlled by the at least two controllers.

3. An energy storage system according to claim 2, wherein the at least two energy storage unites comprise a plurality of the energy storage units included within a plurality of energy storage apparatuses and connected in parallel to one another, the plurality of controllers are daisy-chain connected in a loop shape, and in each of the plurality of controllers, the external input terminal supplies the external output signal as the external input signal, the external output signal being output from the controller at a preceding stage.

4. A moving object comprising the energy storage system according to claim 3.

5. A backup power supply comprising the controller according to claim 1.

* * * * *